(12) United States Patent
Vidal

(10) Patent No.: US 12,533,823 B1
(45) Date of Patent: Jan. 27, 2026

(54) SELF-FLYING HANDS-FREE SHAVING APPARATUS

(71) Applicant: Natalie Vidal, Jupiter, FL (US)

(72) Inventor: Natalie Vidal, Jupiter, FL (US)

(*) Notice: Subject to any disclaimer, the term of this patent is extended or adjusted under 35 U.S.C. 154(b) by 288 days.

(21) Appl. No.: 18/132,949

(22) Filed: Apr. 10, 2023

(51) Int. Cl.
| | |
|---|---|
| B26B 19/38 | (2006.01) |
| B25J 13/08 | (2006.01) |
| B25J 18/02 | (2006.01) |
| B60L 3/12 | (2006.01) |
| B60L 50/60 | (2019.01) |
| B60L 53/12 | (2019.01) |
| B64U 10/14 | (2023.01) |
| B64U 101/00 | (2023.01) |
| G01S 17/86 | (2020.01) |
| G01S 17/933 | (2020.01) |

(Continued)

(52) U.S. Cl.
CPC .......... B26B 19/388 (2013.01); B25J 13/089 (2013.01); B25J 18/025 (2013.01); B60L 3/12 (2013.01); B60L 50/60 (2019.02); B60L 53/12 (2019.02); B64U 10/14 (2023.01); G01S 17/86 (2020.01); G01S 17/933 (2013.01); G06V 20/40 (2022.01); G06V 20/50 (2022.01); G06V 40/161 (2022.01); G06V 40/45 (2022.01); G10L 15/22 (2013.01); H02J 7/0048 (2020.01); H04N 23/90 (2023.01); H04R 1/028 (2013.01); *B60L 2200/10* (2013.01); *B64U 2101/00* (2023.01); *G10L 2015/223* (2013.01)

(58) Field of Classification Search
CPC ........ B26B 19/388; B60L 53/12; B60L 50/60; B60L 3/12; B60L 2200/10; G01S 17/86; G01S 17/933; H02J 7/0048; G06V 40/161; G06V 20/40; G06V 20/50; G06V 40/45; H04N 23/90; B64U 10/14; B64U 2101/00; B25J 13/089; B25J 18/025; G10L 15/22; G10L 2015/223; H04R 1/028

See application file for complete search history.

(56) References Cited

U.S. PATENT DOCUMENTS

2020/0218288 A1* 7/2020 Johnson ................. B64U 30/26
2022/0379505 A1* 12/2022 Kokozidis ........... B26B 19/3806

(Continued)

OTHER PUBLICATIONS https://youtu.be/RzqaEBpaMnY?si=GP-adWR1p7H9eFX6, UC DroneLab at University of Canturbury, Drone tree pruning, Sep. 2019 (Year: 2019).*

(Continued)

*Primary Examiner* — Navid Z. Mehdizadeh
*Assistant Examiner* — Oliver Tan

(57) ABSTRACT

A self-flying hands-free shaving apparatus includes: a drone configured to autonomously fly and hover in air; video cameras that capture live video of the surroundings; and a processor that performs real-time computer vision analysis of live video, to guide the apparatus at which directions to fly and where to remain hovering. A telescopic arm extends from the hovering apparatus, and pivots or rotates to bring an affixed electric shaver towards a face-region of a human, for shaving it. Tactile sensors detect touch, and assist in confirming to the processor that shaving is indeed performed. Data sensed by LIDAR sensors and thermal imagers assists the processor in commanding the apparatus and its telescopic arm, and augments the data obtained by computer vision analysis of the live video from the video cameras.

20 Claims, 10 Drawing Sheets

(51) Int. Cl.
  *G06V 20/40* (2022.01)
  *G06V 20/50* (2022.01)
  *G06V 40/16* (2022.01)
  *G06V 40/40* (2022.01)
  *G10L 15/22* (2006.01)
  *H02J 7/00* (2006.01)
  *H04N 23/90* (2023.01)
  *H04R 1/02* (2006.01)

(56) References Cited

U.S. PATENT DOCUMENTS

2023/0381988 A1* 11/2023 Alkahtani ................ B26D 5/00
2024/0085928 A1* 3/2024 Uchibori ................ B64C 39/02

OTHER PUBLICATIONS

A review of current mechanical & robotic tree pruning equipment, Holsbeeck et al Mar. 2022 (Year: 2022).*
Assistive mobile manipulation for self-care tasks around the head, Hawkins et al, IEEE 2014 (Year: 2014).*

* cited by examiner

US 12,533,823 B1

SELF-FLYING HANDS-FREE SHAVING APPARATUS

FIELD

Some embodiments of the present invention are related to the field of electric shavers.

BACKGROUND

Millions of men use an electric shaver, every day or every few days. An electric shaver typically has a rotating blade or an oscillating blade, that is electrically powered. Some electric shavers are powered by an internal battery that can be recharged from time to time. Some electric shavers are powered via an electric power cord that connects the shaver to an electric power outlet.

SUMMARY

Some embodiments of the present invention provide a Self-Flying Hands-Free Shaving Apparatus. It includes a drone-like component, similar to a quadra-copter or a small Unmanned Aerial Vehicle (UAV), that is able to autonomously fly and hover in mid-air; and a set of video cameras that capture live video of the surroundings of the self-flying apparatus; and a hardware processor that continuously performs computer vision analysis of the live video that is captured by those cameras, in order to safely and correctly guide the self-flying apparatus in which direction(s) to fly and when to accelerate or decelerate, or when and where to remain hovering in mid-air. The self-flying apparatus remains hovering in mid-air, approximately 50 centimeters away from the face of a human target. A telescopic robotic arm extends, and optionally swivels or pivots or rotates, to bring an electric shaver towards the face of the human target. Touch sensors detect when the electric shaver touches the skin, and the electric shaver performs local shaving of that face-region for a few seconds; and then it is moved via the robotic telescopic arm to nearby face-region(s) to shave them as well. Optionally, data sensed by LIDAR sensors (or other distance sensors, such as ultrasonic distance sensors) and thermal imagers assists the hardware processor in commanding the self-flying apparatus and the robotic telescopic arm, and such data augments the data obtained by computer vision analysis of the live video from the multiple live video cameras.

DETAILED DESCRIPTION OF SOME DEMONSTRATIVE EMBODIMENTS

Figure 1A:
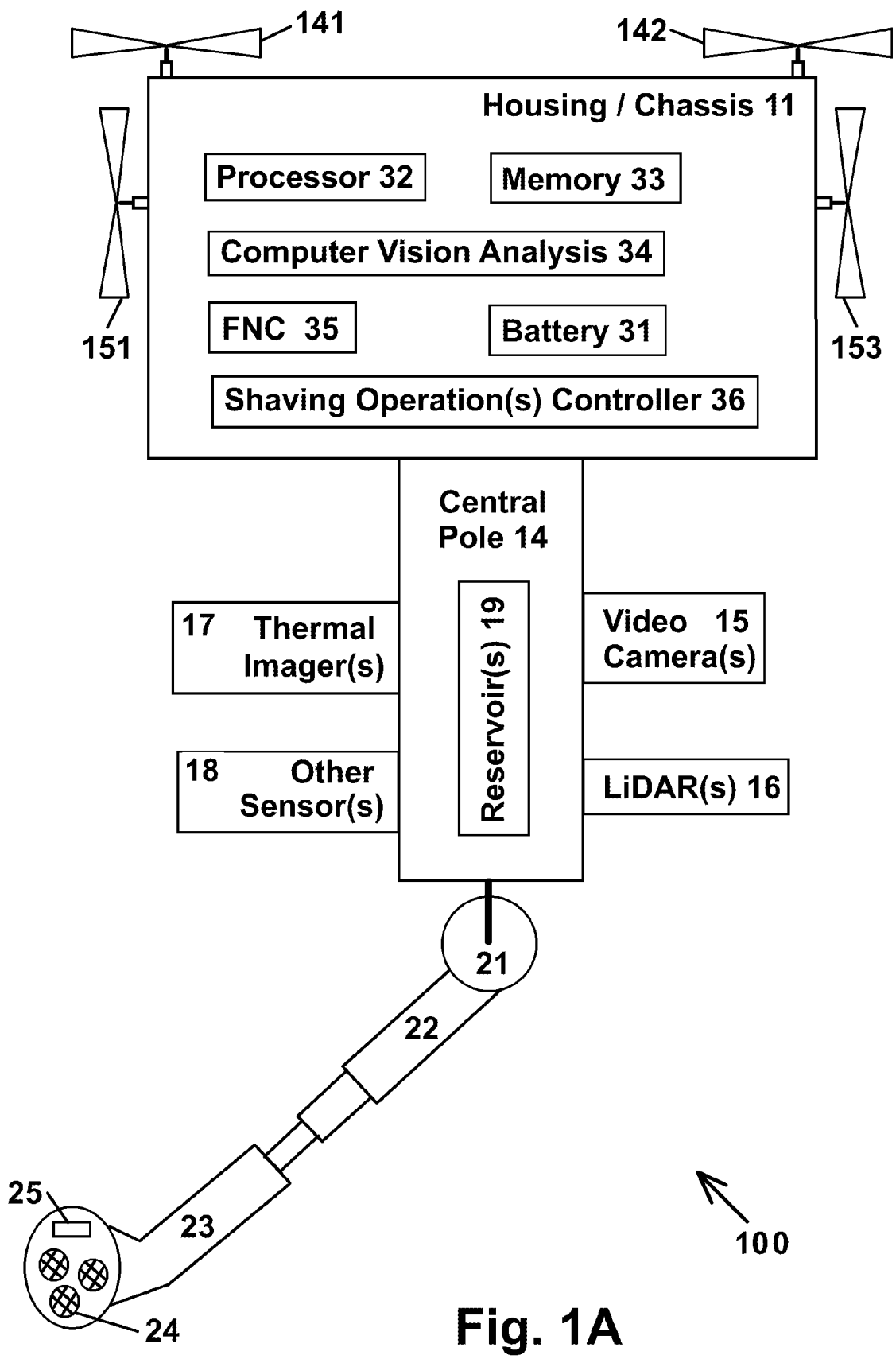
FIG. 1A is a schematic illustration of a side-view of a self-flying hands-free shaving apparatus, in accordance with some demonstrative embodiments of the invention.

The Applicant has realized that shaving can be a tedious and time-consuming task, that occupies a long time of daily habits of many men.

The Applicant has realized that a man can sometimes spend 5 or 10 or 15 minutes, to shave his face with an electric shaver; and during that time period, many men cannot engage in other activities, or an engage in another activity in a limited or constrained manner.

The Applicant has realized that some men, for example, cannot read a magazine or a newspaper while they shave; because they use one hand to hold the electric shaver, and it can be difficult or inconvenient to hold the magazine or newspaper in the other hand by itself; and it can be difficult or inconvenient to flip a page in that magazine or newspaper when one hand is holding the shaver and only the other hand holds the book or magazine.

The Applicant has also realized that some men, for example, cannot enjoy reading online content or browsing the Internet via a laptop computer or a desktop computer while they shave; because they use one hand to hold the electric shaver, and it can be difficult or inconvenient to type on the computer's keyboard with the other hand by itself. Indeed, the male user can read content with his eyes while he shaves; however, trying to type a new URL or website address with one hand only is a task that some people can find to be inconvenient or irregular.

The Applicant has also realized that some men, for example, cannot enjoy eating or consuming certain types of food while shaving, because they use one hand to hold the electric shaver. For example, some people may not enjoy holding an electric shaver in one hand, and concurrently, trying to concurrently cat a large steak that typically requires the user to hold a knife and a fork in two hands; or trying to concurrently eat a large burger or a large sandwich that is more convenient to be held with two hands.

The Applicant has thus realized that many people may benefit from an innovative, self-flying apparatus, that can fly and hover in mid-air, and can autonomously shave the face of a human in a hands-free shaving session; even if such shaving session would yield partial or imperfect results that would still require the human to perform some manual shaving operations.

The Applicant have also realized that some men have only one arm; such as, due to a war injury, or due to a car accident, or due to an amputation. The Applicant has realized that a person who has only one arm, can use that arm to hold an electric shaver and perform shaving; however, he does not have a second arm to concurrently engage in another activity, that typically requires only one arm. For example, if a one-arm person holds an electric shaver and shaves his face, he typically cannot also, concurrently, use a remote control to change the volume or the channel on the television, or use a remote control to modify settings of the air conditioning or heating system, or use a spoon to eat soup or cereal with milk while shaving, or the like.

The Applicant has thus realized that a one-armed person may greatly benefit from a self-flying apparatus that can autonomously fly and hover in mid-air, and autonomously perform full or even partial or minimal hands-free shaving.

The Applicant have also realized that some men have no arms at all, or have arm(s) that cannot be moved at all (e.g., a person is a coma state, or a paralyzed person). Such person may still need or want to shave his face, but cannot hold or operate an electric shaver in his hand; and may typically need a human helper to shave his face.

The Applicant has thus realized that a person with no arms, or a paralyzed or weak person who cannot use his arms or cannot lift an electric shaver (e.g., due to a muscular disease or a bone disease, or due to local bodily pain), may greatly benefit from a self-flying apparatus that can autonomously fly and hover in mid-air, and autonomously perform full or even partial or minimal hands-free shaving.

The Applicant has realized that there is a need for a new, innovative, type of electric shaver, that can autonomously fly and hover in mid-air by itself, similar to a drone; and can gently and carefully shave the face of a person, autonomously, in a hands-free shaving session, while flying and hovering in mid-air; thereby freeing the user to utilize his two hands for engaging in other tasks, such as holding a magazine or newspaper and reading it and flipping pages, or typing with two hands on a keyboard of a computer, or performing others tasks that typically require two hands and not one hand (e.g., knitting a sweater), or performing other tasks that are typically more convenient or more enjoyable when using two hands and not one hand (e.g., holding a larger burger or a large sandwich and eating it).

Some embodiments of the present invention provide a Hands-Free Self-Flying Shaving Apparatus. It includes a drone-like component that is able to autonomously fly and hover in mid-air; a set of video cameras that capture live video of the surrounding of the flying apparatus; a hardware processor that performs computer vision analysis of the live video that is captured by those cameras, in order to guide the flying apparatus in which direction(s) to fly and when to accelerate or decelerate, or when and where to remain hovering in mid-air.

The computer vision analysis of the live video streams enables the processor to guide the flying apparatus, to steer away from the ceiling and from the ground, to steer away from nearby furniture or obstacles, and to carefully approach (e.g., at a low flying speed that is below 0.5 meter per second) the head or the face the human user.

In some embodiments, if two or more humans are recognized by the hardware processor in the video streams, then the computer vision analysis of the live video streams may further perform face recognition or facial recognition, based on one or more pre-stored reference images of a particular user; in order to identify and recognize that particular user, and to guide the flying apparatus to fly specifically to that particular human and not to other human(s) that may be in the same venue.

In some embodiments, the self-flying apparatus further includes a plurality of LIDAR sensors (Light Detection and Ranging sensors), that measure or estimate a distance between the self-flying apparatus and nearby object/s or human/s or obstacles; and data from the LIDAR sensors is further taken account by the hardware processor, and is fused together and augments the computer vision analysis data from the video streams of the cameras, in order to safely steer and navigate the self-flying apparatus away from obstacles and towards the human who is the intended target of the shaving process.

In some embodiments, the self-flying apparatus further includes one or more thermal imagers, that are configured to perform thermal imaging of the surroundings of the self-flying apparatus. The thermal imaging data can be used by the hardware processor of the self-flying apparatus, in order to assist in confirming liveliness or in distinguishing between (i) a live human, and (ii) a painting of a human that is hanging on the wall or that appears on a cover of a magazine. Such information, again, can assist the hardware processor in safely and correctly guiding the self-flying apparatus to fly towards a live human and not towards a painting on the wall that depicts a human.

In some embodiments, the self-flying apparatus includes a central, elongated, generally-vertical, central pole.

The central pole is located generally beneath the propelling blades of the self-flying apparatus, or extends downwardly and vertically relative to such propelling blades. The elongated, vertical, central pole is a mounting anchor and/or a storage or a housing for various components of the apparatus; for example, the live video cameras (or some of them) are mounted or connected to that elongated, vertical, central pole, and they are oriented or directed to different directions; similarly, the thermal imagers (or some of them) are mounted or connected to that elongated, vertical, central pole, and they are oriented or directed to different directions; similarly, the LIDAR sensors or distance-measuring sensors are mounted or connected to that elongated, vertical, central pole, and they are oriented or directed to different directions.

An electric shaver with shaving blades, which can be rotating shaving blades or oscillating shaving blades, is further connected as an integral part of the self-flying apparatus; for example, connected directly to or beneath that elongated, vertical, central pole; or, connected to a robotic arm or a telescopic arm or a robotic telescopic arm that is, in turn, connected directly to or beneath that elongated, vertical, central pole.

The self-flying apparatus is guided by its hardware processor, to autonomously fly towards the head of the target human, and to stop moving and to remain hovering in mid-air when the self-flying apparatus reaches a particular pre-defined distance from the face of the target human. For example, the self-flying apparatus remains hovering and non-moving in mid-air, at a point that is located 40 centimeters horizontally and 45 centimeters vertically from the nose of the target human; at a point that is located between 40 and 50 centimeters horizontally, and between 40 and 60 centimeters vertically, from the nose of the target human; or other suitable hovering point.

At the hovering point, the telescopic robotic arm extends its length or expands, and/or swivels or pivots or rotates relative to the central pole, in order to bring the electric shave towards the face or the beard or the facial hair of the target human, while also keeping the self-flying apparatus at a sufficiently far distance to prevent any accidental damage or risk to the human. Particularly, each of the propelling blades of the self-flying apparatus, remains at all time at a distance of at least 40 centimeters from the target human, and/or at a distance of at least 40 centimeters from any body-part of the target human. The extension or expansion of the robotic telescopic arm, as well as its capability to swivel or pivot or rotate or spin, enables precise movement of the electric shaver towards the face, while the flight blades remain distant from the user and do not endanger the human.

Optionally, the electric shaver is equipped with touch sensors, that indicate to the electric shaver—and through it also to the hardware processor—whether or not the electric shaver is touching the face of the human. For example, the robotic telescopic arm continues to extend and expand, and/or to swivel or pivot or rotate or spin, very slowly (e.g., moving 1 or 2 or 3 centimeters per second); and an indication by the touch sensors that touch has been achieved, causes an immediate stop in the movement/expansion/rotation of the robotic telescopic arm. At that point and at that time, the electric shaver is activated, and performs a local shaving operation for a pre-defined time, such as 5 or 10 seconds. The robotic telescopic arm then moves the electric shaver, by slightly collapsing/shrinking the robotic telescopic arm or reducing its length, then slightly rotating it, then slightly expanding/extending the robotic telescopic arm; to thus relocate the electric shaver to a new face region, such as 1 or 2 centimeters away from the previously-engaged face region.

In some embodiments, the hardware processor continues to performs computer vision analysis of the live video streams captured by the cameras of the self-flying apparatus; and based on such analysis, together with data from the touch sensors of the electric shaver, guides and commands the robotic arm to swivel/pivot/rotate/spin/extend/shrink, in order to cause the electric shaver to shave a first face-region, then another nearby face-region, then another nearby face-region, and so forth. Computer vision analysis enables the hardware processor to determine, that a clean shave or a sufficiently-clean shave has been achieved; and in turn, to deactivate the electric shaver, and to command the telescopic arm to shrink back to its minimum-length position and to thus remove the electric shaver away from the face of the target human, and then, to command the self-flying apparatus to fly away from that human and to safely land on a flat empty surface, such as a nearby table or floor or ground.

In some embodiments, the self-flying apparatus comprises an acoustic microphone to capture human voice or speech; and performs Automatic Speech Recognition; and can identify or recognize uttered voice commands, such as "do not shave my moustache today", or "shave only my right check"; and such recognized voice commands are then enforced by the hardware processor, which guides accordingly the self-flying apparatus and the telescopic arm and the electric shaver.

In some embodiments, the telescopic robotic arm may have multiple links or sub-units, that may allow it to have a non-linear shape, in order to enable the electric shaver to change its orientation or angel towards the human face and/or in order to enable the electric shaver to reach from beneath a particular area (e.g., beneath the chin of the human; around the neck area of the human).

In some embodiments, the self-flying apparatus is pre-programmed or is configured to provide only a partial and/or a raw shaving session, that intentionally shaves only some (e.g., 25 percent, or 50 percent) of the facial areas that needs to be shaved; in order to keep the self-flying apparatus less complex, and/or in order to ensure that human safety is strictly maintained even at the expense of a less-than-perfect shave. For example, in some embodiments, the self-flying apparatus may be pre-programmed or configured to entirely avoid any attempt to shave the moustache area, or the neck area, or beneath the chin or beneath the mouth; and rather, to shave only the two checks, or only one check, or only a facial area that clearly and unambiguously is recognized as a human beard. It is noted and clarified that even such self-flying apparatus, to performs only an initial shave or a partial shave, or even a very partial shave of only 25 percent of the facial-hair area, still has utility and benefits and advantages for many users.

For example, User Adam has no arms at all and sits in a wheelchair, and he would greatly benefit if the self-flying apparatus would provide to him at least a partial or initial shave, even if a human assistant would later need to manually complete the shaving process.

Similarly, User Bob has only one arm, and he would greatly benefit if the self-flying apparatus would provide to him at least a partial or initial hands-free shave, so that User Bob can meanwhile use his one arm/one hand for a few minutes to operate a smartphone or to cat with a spoon; even if User Bob later needs to manually complete the shaving process by himself; as the self-flying apparatus, even if providing a very initial or partial hands-free shave, still managed to free-up some precious minutes that User Bob can utilize to simultaneously engage in another activity.

Similarly, User Carl has two arms and two hands, but he must utilize his laptop computer to write a lengthy document that he must submit or send within 15 minutes, and then he must leave his desk and must join an important business meeting, to which he must appear clean-shaven. User Carl would still benefit if he can use his two hands to type on his computer's keyboard, while the self-flying apparatus performs at least partial or initial shaving that saves to User Carl several precious minutes of manual shaving. For example, User Bob typically needs 10 minutes to manually achieve a full clean shave; User Bob needs 8 minutes to fully type the document with two hands on the keyboard; in total, he would need 18 minutes to perform these two tasks in series; however, User Bob has only 15 minutes available to him until he must join that business meeting clean-shaven after having typed and submitted the document. User Bob would greatly benefit from the self-flying apparatus, as the available time-window of 15 minutes, would be used by User Bob as follows: during the first 8 minutes, User Bob will use his two hands to type the document on his computer's keyboard, while the self-flying apparatus hovers in mid-air and provides at least a partial hands-free shaving to User Bob; this partial, hands-free, eight-minute shaving session was sufficient to reduce the time that is still needed for User Bob to manually complete the shave, from the regular time of 10 minutes, to only 6 minutes; and User Bob can now use 6 minutes, out of the 7 minutes that remained to him after he typed the document, to manually complete his own shave, and to finish both tasks (typing and shaving) within the 15-minute time window that was originally available to him.

Reference is made to FIG. 1A, which is a schematic illustration of a side-view of a self-flying hands-free shaving apparatus 100, in accordance with some demonstrative embodiments of the invention.

Apparatus 100 comprises four main components or sub-systems: (a) a housing/chassis 11; (b) a central pole 14; (c) a telescopic arm; and (d) an electric shaver 23.

The housing/chassis 11 may be implemented as a box-shaped container, formed of plastic or metal or a combination thereof. In some embodiments, housing/chassis 11 may have six side-panels and may be completely closed, similar to a box or a small shoe-box. In other embodiments, the housing/chassis 11 may be box-shaped, but at least some of its side-panels may have holes or apertures or perforations, or may be formed as a mesh or net (e.g., still formed of plastic and/or metal), in order to slightly reduce the weight of the apparatus and/or in order to slightly improve the functionality of one or more of the propelling blades that are attached to the housing/chassis 11. In other embodiments, the housing/chassis 11 may be box-shaped, but may be implemented as only a frame (e.g., 12 edges of a box) of interconnected rods (e.g., formed of plastic and/or metal); and the components that are internal to the housing/chassis 11 may be glued or bonded to such frame or rods, or may be connected via mounting brackets to such frame or rods.

For example, four generally-horizontal propelling blades 141-144 (or generally-horizontal revolving blades; or, horizontally-propelling blades; or, horizontally-revolving blades) may be attached to (or mounted on) a top-side panel of housing/chassis 11, or to a "roof" panel of housing/chassis 11, or to top-side edges of the housing/chassis 11, or to top-side corners of the housing/chassis 11. Each of the generally-horizontal propelling blades 141-144 is configured to propel or rotate or revolve, in a plane that is generally horizontal, or that is generally parallel to the ground. Two such generally-horizontal propelling blades are shown in the side-view illustration, denoted 141 and 142; however, there can be 4 or 6 or 8 or 12 or 16 such generally-horizontal propelling blades, and they may be located above or near top-side corners or edges or panel of the housing/chassis 11.

In some embodiments, optionally, some or all of the generally-horizontal propelling blades may be mounted on diagonal/slanted/tilted rods or mounting rods or mounting brackets, which may slant diagonally, upwardly away from the apparatus and externally relative to the housing of the apparatus; such that the central point of each generally-horizontal propelling blade can be slightly external relative to the horizontal footprint of the housing/chassis 11; as, in some embodiments, positioning of the generally-horizontal propelling blades slightly outwardly relative to the generally footprint or borders of the housing/chassis 11 may improve the flight/elevation capability of the apparatus. The propelling of the generally-horizontal propelling blades 141-144, and the selective processor-controlled modification or setting of their revolution speed or propelling speed, enables the apparatus to fly vertically upwardly, or to fly vertically downwardly, or to remain hovering in mid-air without vertical displacement.

Additionally, four (or other number of) generally-vertical propelling blades 151-154 (or, generally-vertical revolving blades; or, vertically-propelling blades; or, vertically-revolving blades) may be attached to side panels or side edges or top-side corners of housing/chassis 11. Each of the generally-vertical propelling blades 151-154 is configured to propel or rotate or revolve, in a plane that is generally vertical, or in a plane that is generally perpendicular to the ground. For example, four such generally-vertical propelling blades 151-154 may be included in the apparatus: a first generally-vertical propelling blade 151, extending horizontally from a first vertical side-panel of housing/chassis 11; a second generally-vertical propelling blade 152, extending horizontally from a second vertical side-panel of housing/chassis 11; a third generally-vertical propelling blades 153, extending horizontally from a third vertical side-panel of housing/chassis 11; a fourth generally-vertical propelling blade 154, extending horizontally from a fourth vertical side-panel of housing/chassis 11. For demonstrative purposes, and to not over-crowd this drawing, two such generally-vertical propelling blades are shown, denoted 151 and 153, however, there can be 4 or 6 or 8 or 12 or 16 such generally-vertical propelling blades.

In some embodiments, optionally, some or all of the generally-vertical propelling blades 151-154 may be mounted on diagonal/slanted/tilted rods or mounting rods or mounting brackets, which may slant diagonally, upwardly away from the apparatus 100 and externally from the apparatus; such that the central point of each generally-vertical propelling blade can be slightly external relative to the horizontal footprint of the housing/chassis 11; as, in some embodiments, positioning of the generally-vertical propelling blades slightly outwardly relative to the generally footprint or borders of the housing/chassis 11 may improve the flight/elevation capability of the apparatus. The propelling of the generally-vertical propelling blades 151-154, and the selective processor-controlled modification or setting of their revolution speed or propelling speed, enables the apparatus to fly horizontally, to the right or to the left, forward or backward, along a generally-horizonal plane, or to remain hovering in mid-air without horizontal displacement.

Housing/chassis 11 may house therein, or may contain or store or hold therein, one or more of the components of the apparatus; for example, a hardware processor 32, configured to execute code, and configured to process data and to initiate commands to other components of the apparatus; a memory unit 33 or storage unit, to store data collected by video cameras/various sensors of the apparatus; a Computer Vison Analysis unit 34, configured to perform computer vision analysis and/or object recognition and/or video content recognition and analysis; a Flight Navigation and Control (FNC) Unit 35, configured to generate commands to the various propelling blades of the apparatus, in order to cause the apparatus to take off, to land, to remain hovering in mid-air, to fly along the Z axis, to fly along the X axis, to fly along the Y axis, to slightly tilt or slant or to adjust its orientation or to spin around itself, or the like. A battery 31 provides electric power to some or all of the components of apparatus 10.

In accordance with some embodiments, a Shaving Operations Controller (36) generates commands that cause the apparatus 100 to carefully approach via flight a face of a human, to remain hovering in mid-air at a safe distance yet at a useful distance (e.g., 50 to 100 centimeters from the nose of the human), and to initiate and perform autonomous and hands-free shaving operations towards face-regions or facial hair of that human face.

Central pole 14 is connected beneath the housing/chassis 11, and can be an elongated cylinder or box-shaped container, optionally being hollow or partially hollow or semi-hollow or having an internal cavity that can store or hold therein one or more components and/or one or more reservoirs 19 of materials (e.g., a water reservoir to enable wet shaving; an after-shave liquid reservoir; a soothing powder reservoir; or the like). Central pole 14 may be formed of plastic and/or metal. In some embodiments, one or more components that are shown as being stored or held in the housing/chassis 11, such as the processor 32, the memory unit 33, the battery 31, or other units, may actually be held or stored within the central pole 14 instead of being within the housing chassis; or, one or more of such components may be mounted on the external side(s) or the external surface(s) of the central pole 14.

In some embodiments, a component that is shown as being in the housing/chassis, may actually be placed inside or on the central pole; or even, inside or on the telescopic arm discussed herein; or vice versa. In some embodiments, a component that is shown as a single component within a single container or sub-system of the apparatus, can actually be implemented as two or more components, which may optionally reside in two or more sub-systems or regions of the apparatus; for example, instead of having one single memory unit in the housing/chassis 11, some embodiments may have a first memory unit in the housing/chassis 11 and also a second memory unit in the central pole. Similarly, instead of having one single battery in the housing/chassis 11, some embodiments may have a first battery in the housing/chassis 11 (e.g., to provide power to the motor(s) that propel the blades for flying), and/or a second battery in the central pole 14 (e.g., to provide power to the video cameras and sensors that are mounted on the central pole), and/or a third battery in the telescopic arm (e.g., to provide power to components that may be mounted on the external surface of the telescopic arm, or to provide the power needed to extend/retract the telescopic arm), and/or a fourth battery in or near the electric shaver unit (e.g., to provide power to the electric shaver itself for performing shaving operations via its shaving blades). Similarly, a plurality of processors or processing units may be placed across multiple regions or sub-systems of the apparatus.

Apparatus 100 further comprises a plurality of high-definition/high-resolution/high frame-rate video cameras 15; one or more LIDAR sensors 16; one or more thermal imagers 17; and one or more other sensors 18 (e.g., ultrasonic-based distance sensors; accelerometer; compass units; gyroscope; spatial-orientation sensors). These components 15-18 may be mounted on, or connected to, the central pole 14 or its external surface(s), and/or to the housing/chassis 11; and in some embodiments, one or more of those components may even be mounted on the external surfaces of the telescopic arm and/or the electric shaver itself.

Video and data that are captured, collected and/or sensed by those video cameras and sensors, are utilized by the hardware processor 32 and/or by the computer vision analysis unit 34 and/or by the FNC unit 35 and/or by the shaving operations controller 36, and/or by the telescopic arm 22 and its associated motor and controller; in order to enable and/or improve the functionality of those components and/or of other components of the apparatus. The video cameras and/or sensors may optionally be mounted or connected to other parts of the apparatus, and not necessarily to the central pole; for example, they may be connected to, or mounted on or under or near, the housing/chassis 11, and/or the telescopic arm 22, and/or the electric shaver 23.

Telescopic arm 22 includes a plurality of sleeves or cylinders that can enter or collapse into each other, such that telescopic arm 22 can extend and can retract, or can otherwise modify its length by movement of those sleeves or cylinders. The telescopic arm 22 is connected beneath the central pole 14; for example, connected to an Arm Motor-and-Control Unit 21, which can be generally sphere-shaped or semi-sphere shaped, and which may rotate/swivel/pivot/spin in order to cause rotation/swiveling/pivoting/spinning (respectively) of the telescopic arm 22.

The Arm Motor-and-Control Unit 21 operates based on commands that it receives from processor 32, which generates such commands based on computer vision analysis of live video streams from the video cameras and/or based on processing results of data sensed or collected by the various sensors of the apparatus.

In some embodiments, all processing is performed locally and offline, within the self-flying apparatus itself and during flight; without the need to upload or transmit any video or data from the apparatus to any external/remote server or device; and without the need to receive commands or processing results from any external/remote server or device. In some embodiments, the self-flying apparatus is intentionally lacking any wireless transmitter/receiver/transceiver, neither Wi-Fi nor Bluetooth nor Cellular; for improved security and privacy.

At the thinner or smaller end of the telescopic arm 22, an electric shaver 23 is connected or affixed; having one or more shaving blades 24 (e.g., rotating shaving blades, or oscillating shaving blades). Optionally, one or more touch sensors 25 or pressure sensors or contact sensors are located at the front-side panel or the shaving panel of the electric shaver 23; and the signals or output from such sensors may further assist the processor 32 and/or the shaving operations controller 36 in generating or modifying commands. Optionally, one or two or more additional video cameras 26 may be mounted on the electric shaver 23 itself, such as along its elongated housing and not necessarily on its shaving panel or its front-side panel; and such additional video camera(s) 26 may operate as assistive short-range cameras, that focus specifically on face-regions in order to assist the processor 32 to determine if a face-region is hairy or smooth, or is already-shaved or not-yet-shaved, or the like.

Figure 1B:
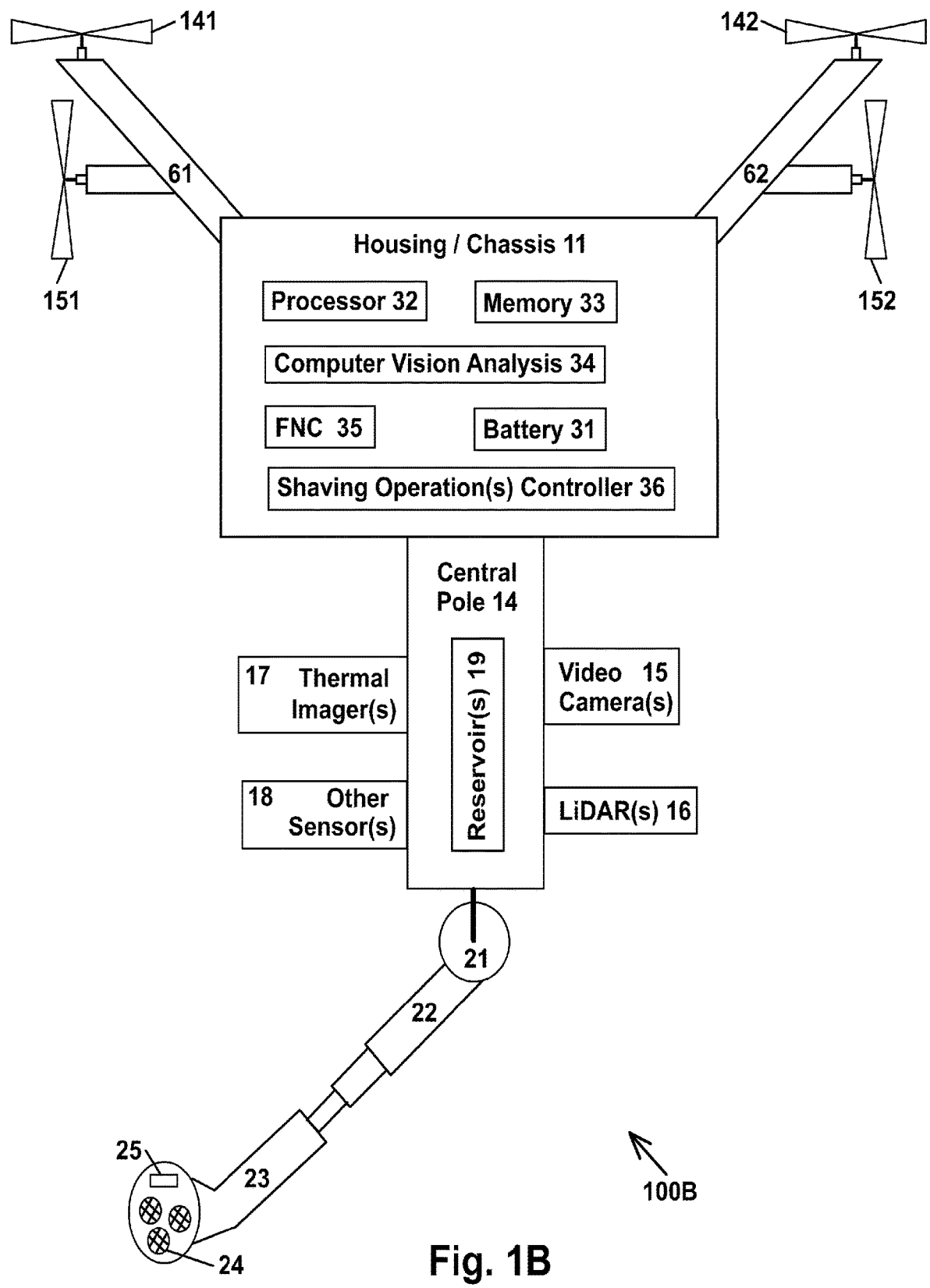
FIG. 1B is a schematic illustration of a side-view of a self-flying hands-free shaving apparatus, in accordance with some demonstrative embodiments of the invention.

Reference is made to FIG. 1B, which is a schematic illustration of a side-view of a self-flying hands-free shaving apparatus 100B, in accordance with some demonstrative embodiments of the invention.

Apparatus 100B of FIG. 1B is generally similar to apparatus 100A of FIG. 1A; however, in apparatus 100B, each of the propelling blades is located diagonally away from the housing/chassis 11. For example, propelling blades 141 and 151 are affixed to a diagonally-slanted mounting rod 61; and similarly and symmetrically, propelling blades 142 and 153 are affixed to a diagonally-slanted mounting rod 62; and such implementation may, in some embodiments, provide improved flight capabilities to the apparatus.

Figure 1C:
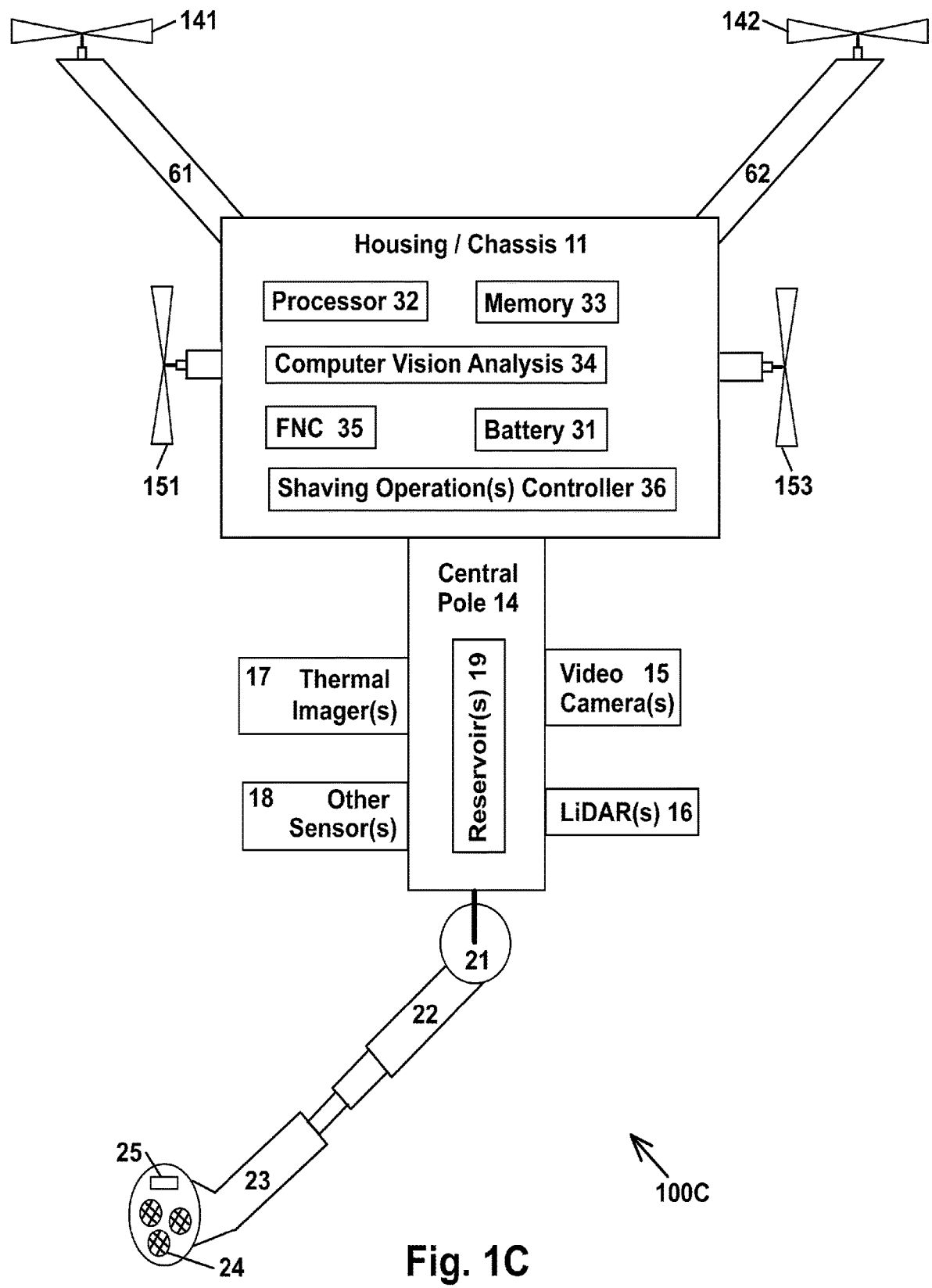
FIG. 1C is a schematic illustration of a side-view of a self-flying hands-free shaving apparatus, in accordance with some demonstrative embodiments of the invention.

Reference is made to FIG. 1C, which is a schematic illustration of a side-view of a self-flying hands-free shaving apparatus 100C, in accordance with some demonstrative embodiments of the invention.

Apparatus 100C of FIG. 1C is generally similar to apparatus 100A of FIG. 1A; however, in apparatus 100C, each of the propelling blades 141-144 is located diagonally away from the housing/chassis 11, whereas each of the propelling blades 151-154 is mounted or affixed directly to (or at) a different external side/external side-panel/external edge of the housing/chassis 11.

Figure 1D:
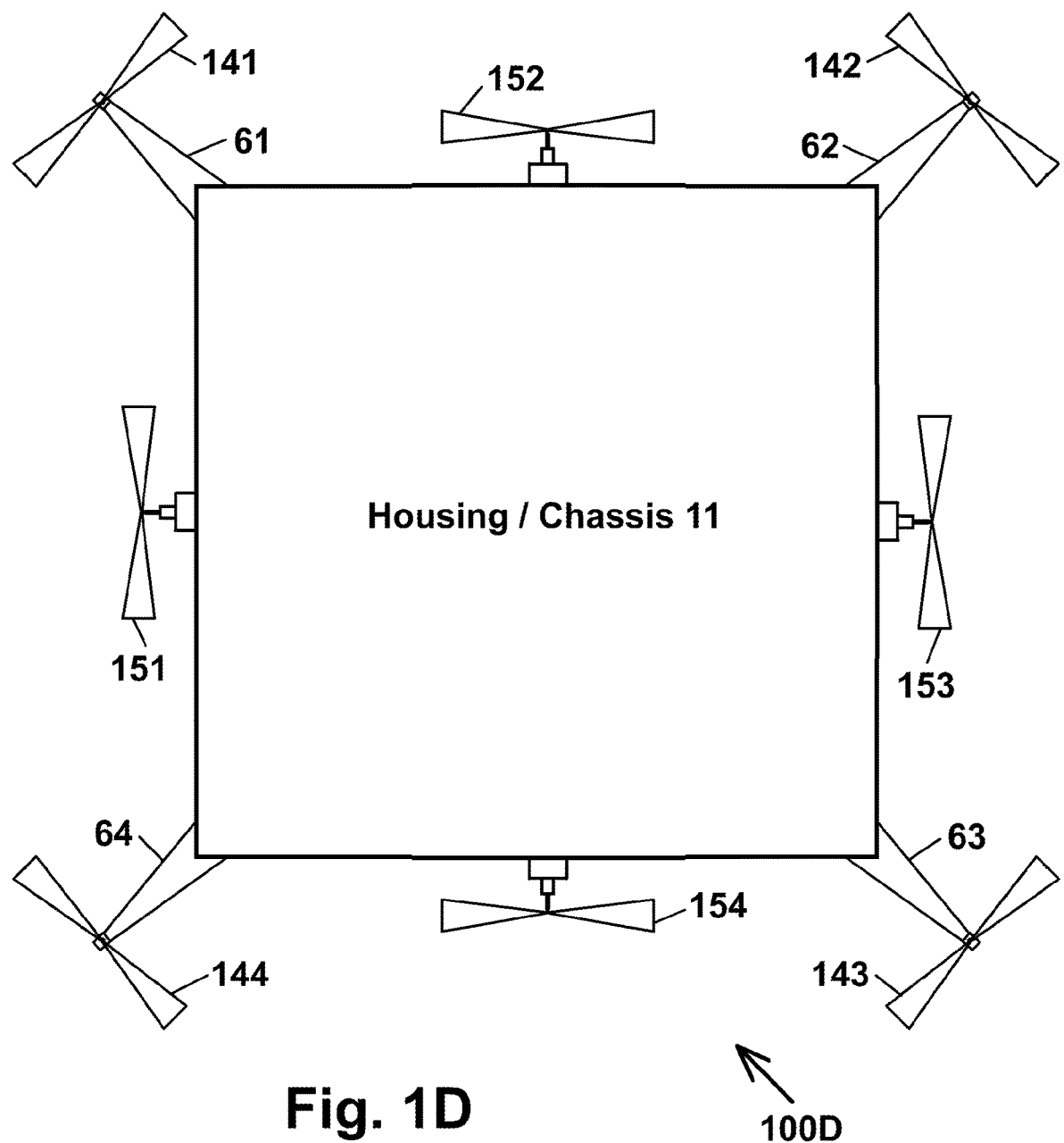
FIG. 1D is an illustration of a top-view of a self-flying hands-free shaving apparatus, in accordance with some demonstrative embodiments of the invention.

Reference is made to FIG. 1D, which is an illustration of a top-view of a self-flying hands-free shaving apparatus 100D, in accordance with some demonstrative embodiments of the invention. There are shown, for example; the generally square or rectangular or box-shaped housing/chassis 11; each of its four corners has a mounting rod that extends upwardly and diagonally away from the center of the housing/chassis 11; mounting rod 61 holding the first generally-horizontal propelling blade 141; mounting rod 62 holding the generally-horizontal propelling blade 142; mounting rod 63 holding the generally-horizontal propelling blade 143; and mounting rod 64 holding the generally-horizontal propelling blade 154. Further shown are the four generally-vertical propelling blades 151-154, each of them being located or mounted on one of the side-panels of the housing/chassis 11.

Figure 1E:
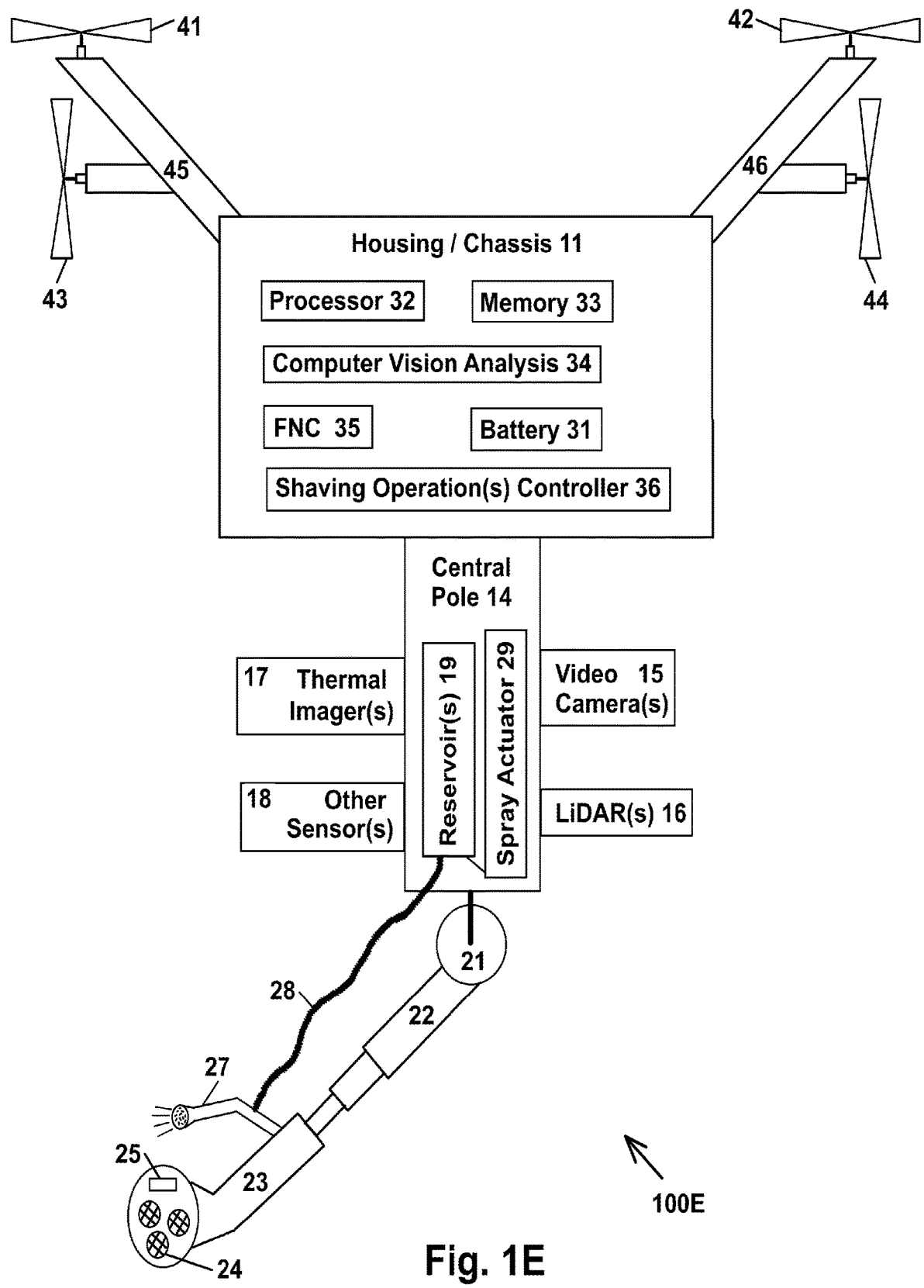
FIG. 1E is a schematic illustration of a side-view of self-flying hands-free shaving apparatus, in accordance with some demonstrative embodiments of the invention.

For example, if the top-side of FIG. 1D is north, then: the generally-vertical propelling blade 151 is connected to the western side-panel of the housing/chassis, and the propelling of that generally-vertical propelling blade 151 generates a generally-horizontal force that pushes the apparatus to the east; similarly, the generally-vertical propelling blade 153 is connected to the eastern side-panel of the housing/chassis, and the propelling of that generally-vertical propelling blade 153 generates a generally-horizontal force that pushes the apparatus to the west; similarly, the generally-vertical propelling blade 152 is connected to the northern side-panel of the housing/chassis, and the propelling of that generally-vertical propelling blade 152 generates a generally-horizontal force that pushes the apparatus to the south; similarly, the generally-vertical propelling blade 154 is connected to the southern side-panel of the housing/chassis, and the propelling of that generally-vertical propelling blade 154 generates a generally-horizontal force that pushes the apparatus to the north;

Reference is made to FIG. 1E, which is a schematic illustration of a side-view of self-flying hands-free shaving apparatus 100E, in accordance with some demonstrative embodiments of the invention. Apparatus 100E of FIG. 1E may be generally similar to any of the previous apparatus examples discussed above (such as 100 or 100B or 100C or 100D); yet it also has a spraying sub-system.

One or more reservoirs or storage chambers, such as reservoir 19, may located within or inside the partially-hollow central pole 14; or may be affixed or connected to an external surface of central pole 14; or may be located elsewhere in the apparatus (e.g., affixed to the electric shaver unit, or affixed to the housing/chassis). Reservoir 19 stores a liquid; or stores a powder. Reservoir 19 is connected via a transport tube 29 to a spraying unit 27 having a spray-head. A spray actuator 29, which may be adjacent to reservoir 19 or may be located elsewhere in the apparatus, may be triggered by the hardware processor 32 to actuate or activate or to perform a spraying mechanism (e.g., by activating a pump, a pushing pump, a suction pump, by mechanically squeezing an elastic air-filled airbag, or the like), such that a particular portion or volume or weight of the content of reservoir 19 is released from it, is transported through the transport tube 29, and is then sprayed-out or outputted via the spraying unit 27 and its spray-head.

In one example, reservoir 19 stores a post-shaving soothing liquid, such as an after-shave liquid, a perfume, or a liquid having (or providing) a particular aroma or odor or smell. Once the hardware processor determines that a shaving process has ended, and/or in response to a vocal command by the user, a portion of such post-shaving soothing liquid is automatically discharged and sprayed towards the face of the user, while the apparatus is still flying and hovering in mid-air nearby.

In another example, reservoir 19 stores a post-shaving soothing powder, such as an after-shave powder or baby powder or talc or talcum powder, or a powder having (or providing) a particular aroma or odor or smell. Once the hardware processor determines that a shaving process has ended, and/or in response to a vocal command by the user, a portion of such post-shaving soothing powder is automatically discharged and sprayed towards the face of the user, while the apparatus is still flying and hovering in mid-air nearby.

In another example, reservoir 19 stores a pre-shaving or in-shaving liquid, such as water, or shaving cream. Once the hardware processor determines that a wet shaving process is desired (e.g., based on a mechanical switch on the central pole 14, that the user can manually toggle in advance between "dry shaving" and "wet shaving"), and/or in response to a vocal command by the user, a portion of such pre-shaving or in-shaving liquid is automatically discharged and sprayed towards the face of the user, while the apparatus is still flying and hovering in mid-air nearby; to provide or to enable or to facilitate a wet shaving session.

In another example, the apparatus may two, or even all three, of the above-mentioned features; for example, by having two or three discrete reservoirs, which are actuated or activated by two or three respective spray actuator units, such that two or three such materials (liquid, powder) can be separately transported via respective transport tubes to their respective spray-heads and spraying units, each one of them operating by itself; and typically, operating in series and not simultaneously. In some embodiments, optionally, voice command from the user may be used to select which of these materials should be discharged/sprayed, or which should not.

Figure 1F:
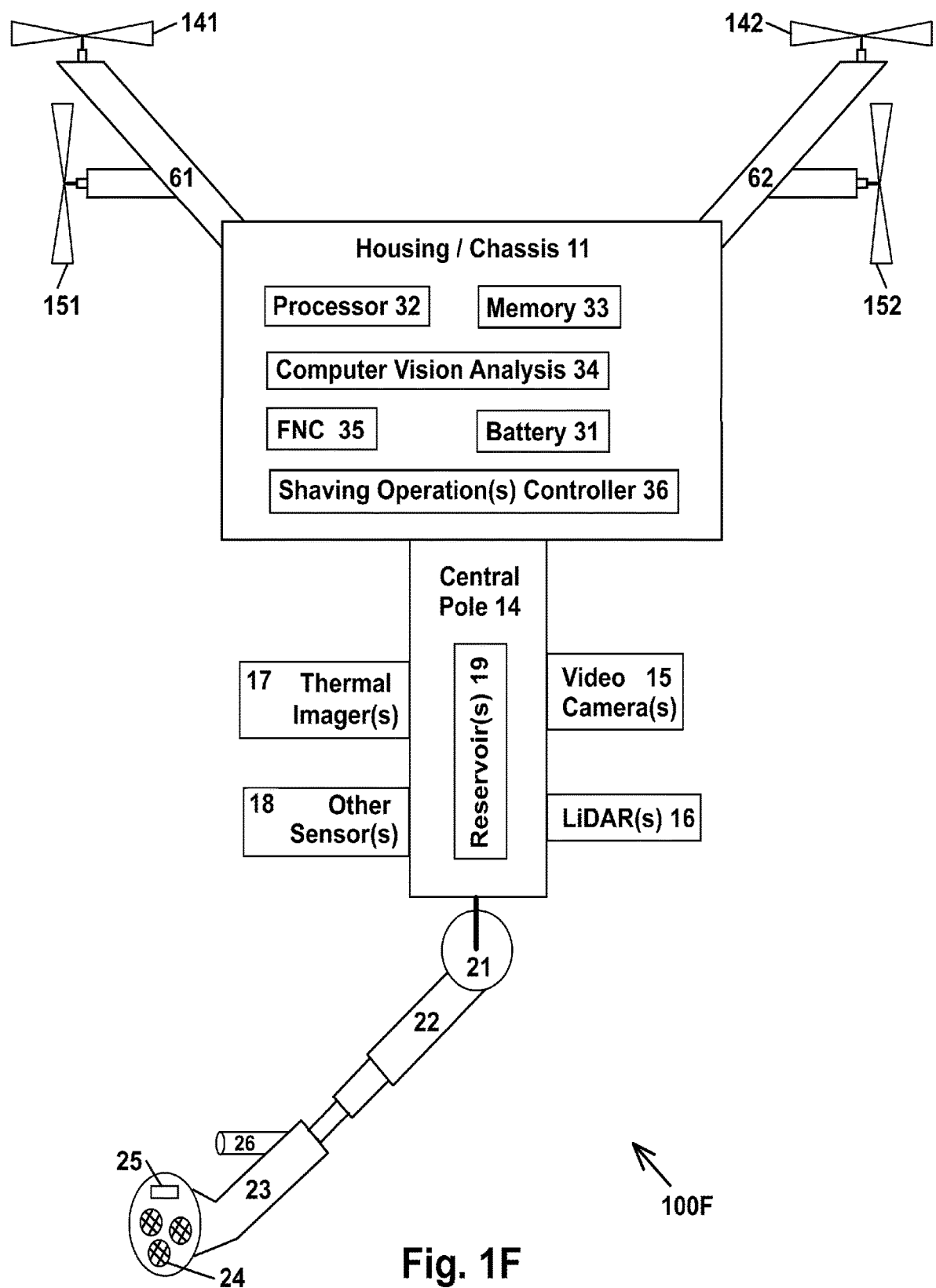
FIG. 1F is a schematic illustration of a side-view of self-flying hands-free shaving apparatus, in accordance with some demonstrative embodiments of the invention.

Reference is made to FIG. 1F, which is a schematic illustration of a side-view of self-flying hands-free shaving apparatus 100F, in accordance with some demonstrative embodiments of the invention. Apparatus 100F of FIG. 1F may be generally similar to any of the previous apparatus examples discussed above (such as 100 or 100B or 100C or 100D or 100E); yet it also has one or more Assistive Camera(s) 26 that are mounted directly on the electric shaver, and which provide short-range and focused video stream(s) that are further processed and analyzed by the processor 32 and/or by the computer vision analysis unit 34 and/or the shaving operation(s) controller 36 to reach accurate decisions with regard to shaving operations, such as: (i) to reach a determination that a currently-treated or recently-treated face-region is smooth, or is sufficiently smooth beyond a pre-defined threshold value, and does not require further shaving; (ii) to reach a determination that a currently-treated or recently-treated face-region is still hairy or is still not sufficiently smooth (beyond a pre-defined threshold value), and still requires shaving or further shaving; (iii) to reach a determination that a nearby, not-currently-treated, face-region is smooth, or is sufficiently smooth beyond a pre-defined threshold value, and does not require further shaving; (iv) to reach a determination that a nearby, not-currently-treated, face-region is still hairy or is still not sufficiently smooth (beyond a pre-defined threshold value), and still requires shaving or further shaving; (v) to recognize or to detect, based on short-range video analysis, that a particular face-region has an injury or an open wound, or has a scar or a mole or a pimple, and to adjust or avoid or skip hands-free shaving operations at that face-region; (vi) to enable, or to assist in, hair-counting in a face-region; (vii) to enable, or to assist in, calculation or estimation of hair-density value of a face-region; and/or for other decision-making purposes by the processor 32 and/or by the computer vision analysis unit 34 and/or by the shaving operation(s) controller 36.

Figure 1G:
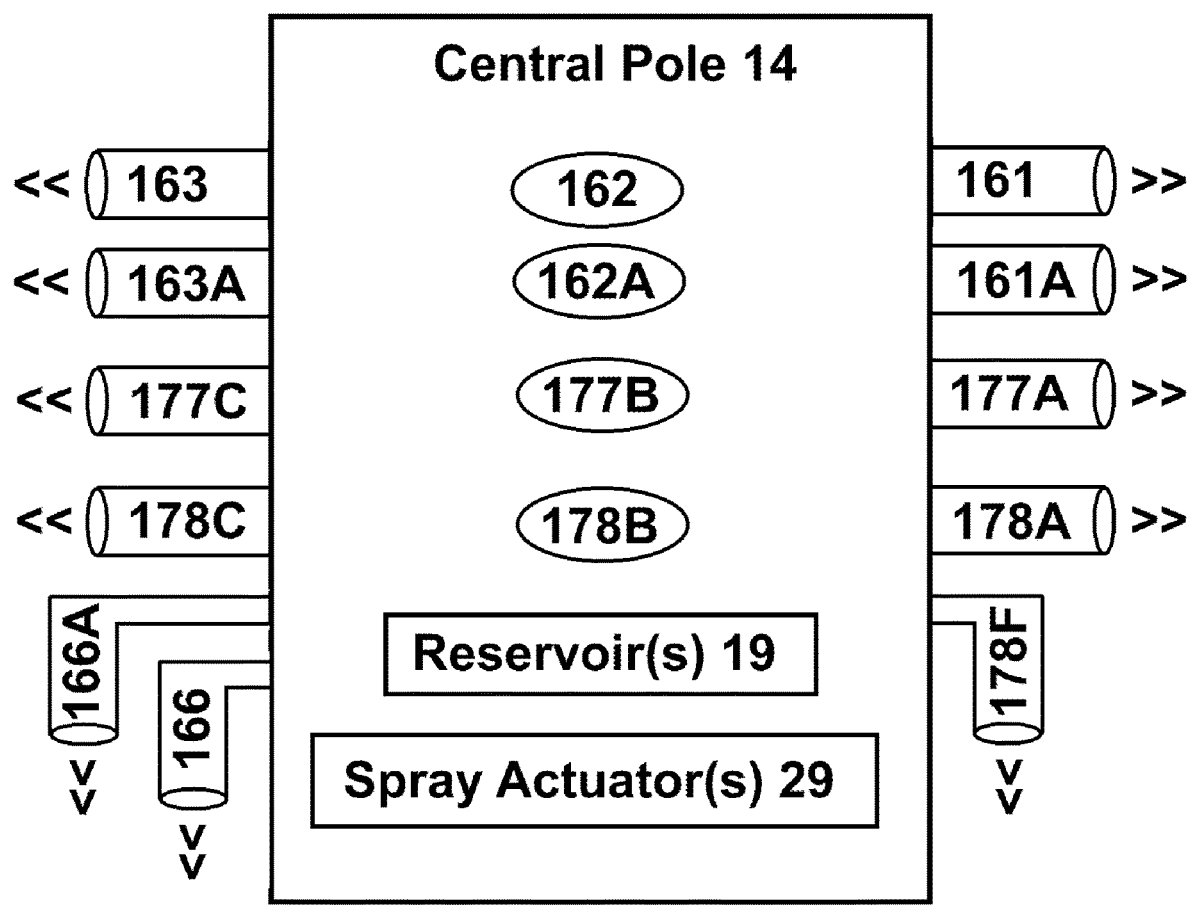
FIG. 1G is a schematic illustration of a right-side view of the central pole (and its components) of a self-flying hands-free shaving apparatus, in accordance with some demonstrative embodiments.
Figure 1H:
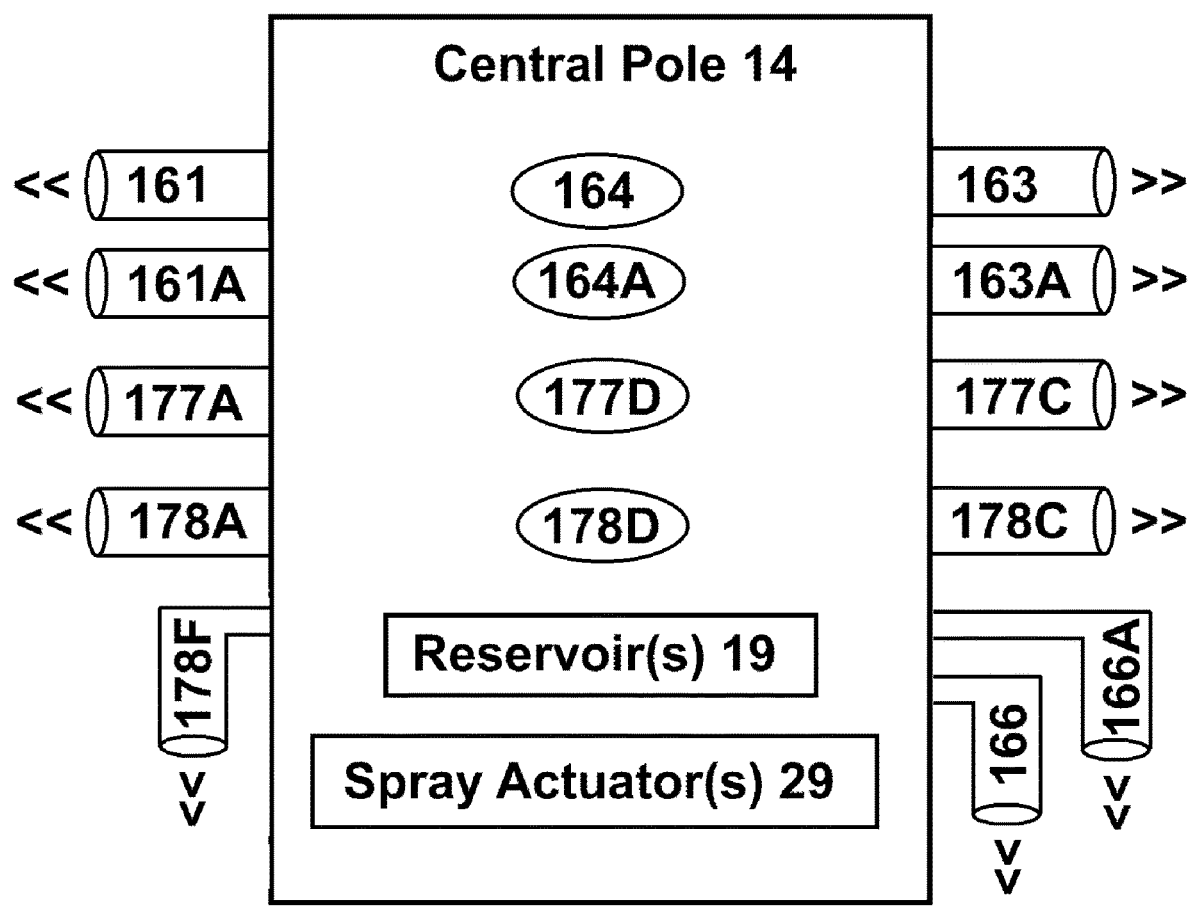
FIG. 1H is a schematic illustration of a left-side view of the central pole (and its components) of a self-flying hands-free shaving apparatus, in accordance with some demonstrative embodiments.

Reference is made to FIG. 1G, which is a schematic illustration of a right-side view of the central pole (and its components) of the self-flying hands-free shaving apparatus, in accordance with some demonstrative embodiments. Reference is also made to FIG. 1H, which is a schematic illustration of a left-side view of the central pole (and its components) of the self-flying hands-free shaving apparatus, in accordance with some demonstrative embodiments.

As demonstrated, a first generally-horizontal video camera 161 is directed towards a first horizontal direction, and is accompanied by an illumination unit 161A. Additionally, a second generally-horizontal video camera 162 is directed towards a second horizontal direction (which is perpendicular to the first horizontal direction), and is accompanied by an illumination unit 162A. Additionally, a third generally-horizontal video camera 163 is directed towards a third horizontal direction (which is perpendicular to the first horizontal direction; and also, is opposite to the first horizontal direction), and is accompanied by an illumination unit 163A. Additionally, a fourth generally-horizontal video camera 164 is directed towards a fourth horizontal direction (which is perpendicular to the third horizontal direction; and also, is opposite to the second horizontal direction), and is accompanied by an illumination unit 164A.

Figure 1I:
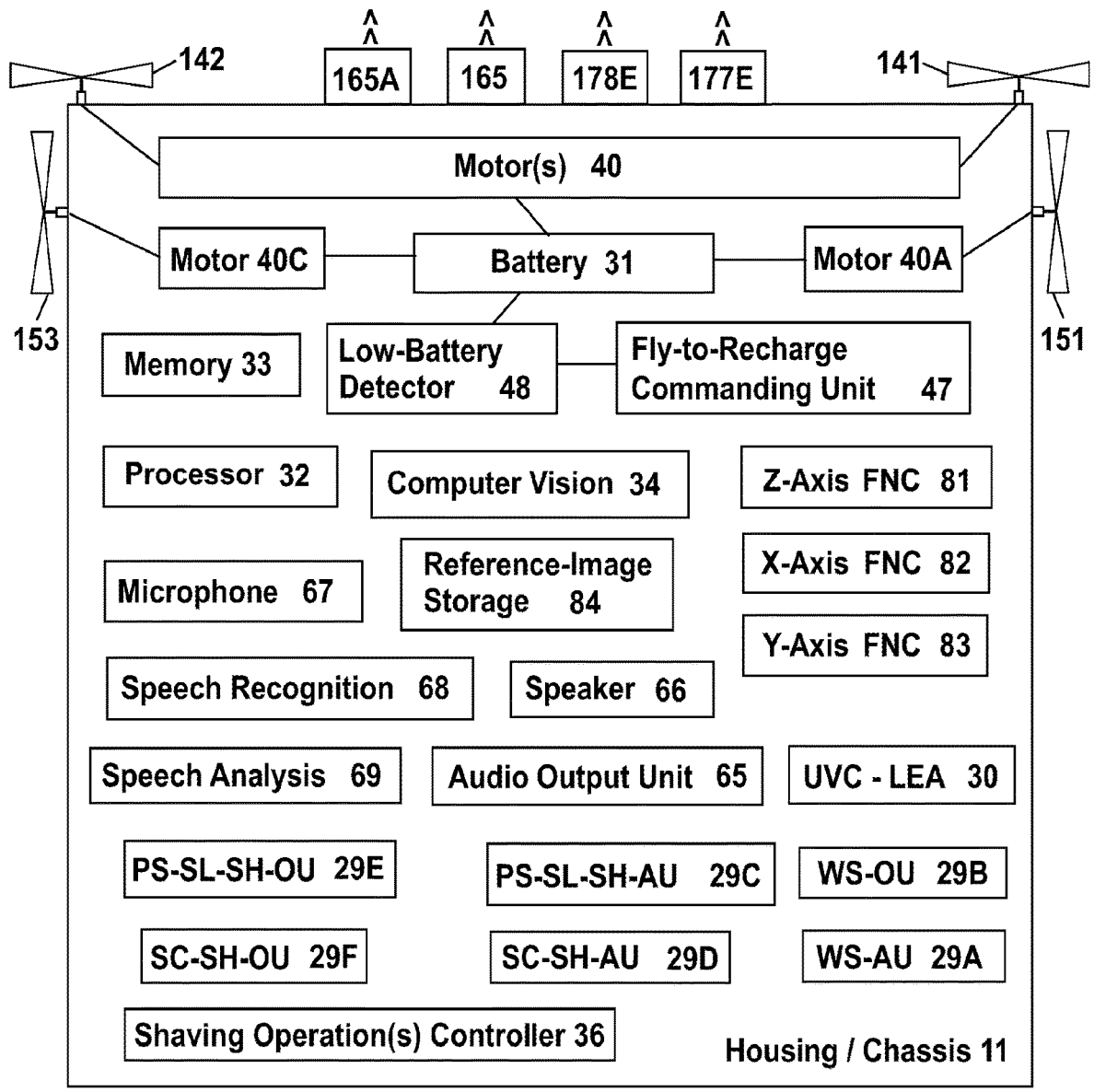
FIG. 1I is a schematic illustration of a right-side view of the housing/chassis sub-system of a self-flying hands-free shaving apparatus, in accordance with some demonstrative embodiments.

Additionally, a downwardly-facing generally-vertical video camera 166 is shown, accompanied by an illumination unit 166A; and both of them are connected to central pole 14 and are directed downwardly. Reference is briefly made to FIG. 1I, which shows an upwardly-facing generally-vertical video camera 165, accompanied by an illumination unit 165A; both of them are directed upwardly; both of them are demonstrated as connected to the top region or the top panel or a top edge of the housing/chassis 11, and not to the central pole 14; since the top region of the housing/chassis has a better, unobstructed, upwardly-facing field-of-view.

Referring again to FIGS. 1G and 1H, as demonstrated, a first generally-horizontal thermal imager 177A is directed towards a first horizontal direction. Additionally, a second generally-horizontal thermal imager 177B is directed towards a second horizontal direction (which is perpendicular to the first horizontal direction). Additionally, a third generally-horizontal thermal imager 177C is directed towards a third horizontal direction (which is perpendicular to the first horizontal direction; and also, is opposite to the first horizontal direction). Additionally, a fourth generally-horizontal thermal imager 177D is directed towards a fourth horizontal direction (which is perpendicular to the third horizontal direction; and also, is opposite to the second horizontal direction).

Additionally, a downwardly-facing generally-vertical thermal imager 177F is shown, connected to central pole 14 and directed downwardly. Reference is briefly made to FIG. 1I, which shows an upwardly-facing generally-vertical thermal imager 177E, directed upwardly; which is demonstrated as connected to the top region or the top panel or a top edge of the housing/chassis 11, and not to the central pole 14; since the top region of the housing/chassis has a better, unobstructed, upwardly-facing field-of-view.

Referring again to FIGS. 1G and 1H, as demonstrated, a first generally-horizontal LIDAR sensor 178A is directed towards a first horizontal direction. Additionally, a second generally-horizontal LIDAR sensor 178B is directed towards a second horizontal direction (which is perpendicular to the first horizontal direction). Additionally, a third generally-horizontal LIDAR sensor 178C is directed towards a third horizontal direction (which is perpendicular to the first horizontal direction; and also, is opposite to the first horizontal direction). Additionally, a fourth generally-horizontal LIDAR sensor 178D is directed towards a fourth horizontal direction (which is perpendicular to the third horizontal direction; and also, is opposite to the second horizontal direction).

Additionally, a downwardly-facing generally-vertical LIDAR sensor 178F is shown, connected to central pole 14 and directed downwardly. Reference is briefly made to FIG. 1I, which shows an upwardly-facing generally-vertical LIDAR sensor 178E, directed upwardly; which is demonstrated as connected to the top region or the top panel or a top edge of the housing/chassis 11, and not to the central pole 14; since the top region of the housing/chassis has a better, unobstructed, upwardly-facing field-of-view.

Reference is made to FIG. 1I, which is a schematic illustration of a right-side view of the housing/chassis 11 sub-system of the self-flying hands-free shaving apparatus, in accordance with some demonstrative embodiments. It is noted that one or more of the components that are shown, for demonstrative purposes, as being part of (or being housed in, or mounted in or on) the housing/chassis 11, may actually be implemented (in some embodiments) as part of the central pole 14.

As demonstrated in FIG. 1I, battery 31 is associated with a low-battery detector 48; and upon detection of a battery power level that is below a pre-defined threshold, a Fly-to-Recharge Commanding Unit 47 may pause or abort an ongoing flight/shaving session, and may direct the apparatus to fly towards (and land upon) its electric charging pad. Further shown are electric motors (40, 40A, 40C) which generate forces that cause revolving of one or more of the propelling blades of the self-flying apparatus. Also shown is the hardware processor 32; the computer vision analysis unit 34; the shaving operation(s) controller 36; an audio speaker 66 associated with an audio output unit 65; an acoustic microphone 67, associated with an Automatic Speech Recognition (ASR) unit 68 and with a speech analysis unit 69; and a reference-image storage 84.

Further shown are sub-units or implementations of the above-mentioned Flight Navigation and Control (FNC) Unit 35, demonstrated as three controllers that are responsible for each axis: Z-axis FNC unit 81, and X-axis FNC unit 82, and Y-axis FNC unit 83. Also shown, at or on the top-side of the housing/chassis 11, are: the upwardly-facing video camera 165, and its associated upwardly-facing illumination unit 165; an upwardly-facing LIDAR sensor 178E; and upwardly-facing thermal imager 177E.

As demonstrated in FIG. 1I, additional components which may be implemented as part of (or, as connected to or mounted on) the housing/chassis 11 are the following optional components: post-shaving soothing liquid spray-head orientation unit 19E, denoted PS-SL-SH-OU 29E; and/or, post-shaving soothing liquid spray-head actuator unit 29C, denoted PS-SL-SH-AU 29C; and/or, shaving cream spray-head actuator unit 29D, denoted SC-SH-AU 29D; and/or shaving cream spray-head orientation unit 29F, denoted SC-SH-OU 29F; and/or water spraying orientation unit 29B, denoted WS-OU 29B; and/or, water spraying actuator unit 29A, denoted WS-AU 29A.

Reference is now made to any of FIGS. 1A through 1I, to describe at a greater detail the functionality and/or structure of the components shown in them, and the interactions among them, to provide a singular, useful, automatic and autonomous, self-flying hands-free shaving apparatus.

In accordance with some embodiments, the self-flying hands-free shaving apparatus includes an electric battery 31, to provide electric power to one or more components of said apparatus. The electric battery is rechargeable; for example, a wire or cable, such as USB cable, can connect the electric battery to a charger (when the apparatus is idle and not flying); or, the electric battery may be charged by placing it (or, placing the entire apparatus) in close proximity or in touching proximity with a wireless charging pad that performs electromagnetic cord-free/cordless charging.

In accordance with some embodiments, the self-flying hands-free shaving apparatus further comprises a rectangular drone-chassis structure or metal frame or sturdy frame or metal chassis, which may be referred to as the housing/chassis 11. In some embodiments, it may include at least four metal (or rigid plastic) rods, that are interconnected as a rectangular structure or frame; or 12 such rods that form a box-shaped structure. The rectangular or boxed-shaped drone-chassis structure or housing/chassis 11 may remain generally perpendicular to the ground when said apparatus takes off and hovers and lands. It may sometimes be slanted at a slight angel, such as 5 or 10 or 15 degrees relative to the ground, when the apparatus tilts or slants in order to change direction or as part of changing altitude or spinning or rotating.

In some embodiments, optionally, the apparatus has an X-shaped structure of two metal rods, that interconnect four lower-side/bottom-side corners of said housing/chassis or of the rectangular drone-chassis structure frame. The two metal rods intersect at a central point of said X-shaped structure of two metal rods; and that central point functions as a connection point or a connection region to the elongated central pole 14, which is connected beneath or underneath such central point of the X-shaped structure of two metal rods. In some embodiments, the central pole 14 may be connected beneath a bottom-side/lower-side panel or edge of the housing/chassis 11.

The self-flying hands-free shaving apparatus comprises a hardware processor 32, configured to execute code; such as, a Central Processing Unit (CPU), a Digital Signal Processor (DSP), an Integrated Circuit (IC), a Graphics Processing Unit (GPU), a logic unit, a controller, or a combination of two or more of the above.

The self-flying hands-free shaving apparatus comprises a memory unit 33, configured to store code and configured to store data; for example, volatile memory, non-volatile memory, Random Access Memory (RAM), Flash memory, a miniature Solid-State Drive (SSD), or a combination of two or more of the above. In some embodiments, for example, the memory unit may include a Flash memory unit, similar to a miniature "thumb drive" or "disk on key", with storage capacity of 512 gigabytes or 1 terabyte; such memory unit may be useful for storing high-resolution/high frame-rate video streams that the self-flying hands-free shaving apparatus captures via multiple video cameras.

The self-flying hands-free shaving apparatus comprises four propelling blades (denoted 141, 142, 143, 144), or for sets of horizontally propelling blades. Each set of said four sets of horizontally propelling blades comprises one or more blades that are configured to propel (or spin, or rotate or revolve rapidly) within a first plane that is generally horizonal and is generally perpendicular to the ground. Each set of said four sets of horizontally propelling blades includes a blade that is capable of spinning or revolving at a rate of 8,000 to 9,000 revolutions per minute (RPM).

The four sets of horizontally propelling blades are connected, respectively, above or over four corners of the rectangular drone-chassis structure or the housing/chassis 11, such as, directly above or over the top four corners, or diagonally and externally relative to the housing/chassis 11 if diagonal/slanted mounting rods 61-63 are included; and these blades are configured to propel and to lift up the entire apparatus. In some embodiments, optionally, 6 or 8 or 12 or 16 sets of such horizontally propelling blades (or sets of blades) may be used and may be included; for example, if a particular implementation of the apparatus is too heavy for only four blades to carry, or if such greater number of blades would make the lift-up or the flight maneuvers more reliable and/or effective.

The four sets of horizontally propelling blades (141-144) are configured to propel—based on instructions or signals received from the hardware processor 32—in a particular rotation speed or revolution speed or RPM rate that is one of three pre-configured rotation speeds comprising: (i) a high rotation speed that causes said apparatus to fly vertically and upwardly, (ii) a medium rotation speed that causes said apparatus to hover vertically without moving vertically upwardly and without moving vertically downwardly, (iii) a low rotation speed that causes said apparatus to fly vertically and downwardly.

The apparatus comprises a first set of one or more electric motors 40, configured to selectively and separately rotate each of said four sets of horizontally propelling blades 141-144 at a particular rotation speed, based on instructions received from said hardware processor 32. The one or more electric motors may include, for example: a single electric motor that can provide sufficient propelling force to all the horizontally propelling blades; or, a plurality of such electric motors that can provide sufficient propelling force to all the horizontally propelling blades; or, a separate electric motor for each of the plurality of propelling blades.

In some embodiments, processor-controlled horizontal rotation speed (or revolution rate) of the four sets of horizontally propelling blades 141-142, selectively causes the self-flying hands-free shaving apparatus to perform one of three operations that include: (i) flying vertically and upwardly along a Z axis that is generally perpendicular to the ground, (ii) hovering vertically without moving upwardly and without moving vertically downwardly, (iii) flying vertically and downwardly along the Z axis that is generally perpendicular to the ground.

The apparatus comprises four vertically propelling blades, or four sets of vertically propelling blades, denoted 151-154, which comprise: (A) a first set of one or more vertically-propelling blades 151, that is connected to a first vertical side-panel of the housing/chassis 11 and faces outwardly away from the housing/chassis 11; and (B) a second set of one or more vertically-propelling blades 152, that is connected to a second vertical side-panel of the housing/chassis 11 and faces outwardly away from the housing/chassis 11; and (C) a third set of one or more vertically-propelling blades 153, that is connected to a third vertical side-panel of the housing/chassis 11 and faces outwardly away from the housing/chassis 11; and (D) a fourth set of one or more vertically-propelling blades 154, that is connected to a fourth vertical side-panel of the housing/chassis 11 and faces outwardly away from the housing/chassis 11.

The first set of one or more vertically-propelling blades 151 is configured to propel within a first vertical plane that is generally perpendicular to the ground. The second set of one or more vertically-propelling blades 152 is configured to propel within a second vertical plane that is generally perpendicular to the ground. The third set of one or more vertically-propelling blades 153, is configured to propel within a third vertical plane that is generally perpendicular to the ground. The fourth set of one or more vertically-propelling blades 154 is configured to propel within a fourth vertical plane that is generally perpendicular to the ground. With regard to the above-mentioned four sets (151, 152, 153, 154) of one or more vertically-propelling blades, it is noted that: the first vertical plane is generally parallel to the third vertical plane; the second vertical plane is generally parallel to the fourth vertical plane; the first vertical plane is generally parallel to the second vertical plane.

In accordance with some embodiments, vertical propelling of the first set of one or more vertically-propelling blades 151, generates a first force that pushes the apparatus horizontally in a first horizontal direction. Vertical propelling of the second set of one or more vertically-propelling blades 152, generates a second force that pushes the apparatus horizontally in a second direction that is generally perpendicular to the first direction. Vertical propelling of the third set of one or more vertically-propelling blades 153, generates a third force that pushes the apparatus horizontally in a third direction that is generally perpendicular to the second direction and that is generally opposite to the first horizontal direction. Vertical propelling of the fourth set of one or more vertically-propelling blades 154, generates a fourth force that pushes the apparatus horizontally in a fourth direction that is generally perpendicular to the third direction and that is generally opposite to the second horizontal direction.

The self-flying hands-free shaving apparatus comprises also: (A) a first vertical-movement electric motor 40A, configured to selectively and separately rotate the first set of one or more vertically-propelling blades 151, based on instructions from the hardware processor 32; and also, (B) a second vertical-movement electric motor, configured to selectively and separately rotate the second set of one or more vertically-propelling blades 152, based on instructions from the hardware processor 32; and also, (C) a third vertical-movement electric motor 40C, configured to selectively and separately rotate the third set of one or more vertically-propelling blades 153, based on instructions from the hardware processor 32; and also, (D) a fourth vertical-movement electric motor, configured to selectively and separately rotate the fourth set of one or more vertically-propelling blades 154, based on instructions from the hardware processor 32.

The self-flying hands-free shaving apparatus further comprises: an elongated, generally-vertical, central pole 14, that is connected generally vertically beneath a central point or central region of the housing/chassis 11, or beneath a central point of an X-shaped set of two metal/plastic/rigid rods that are located at the lower side of the housing/chassis 11 or that form the bottom side of the housing/chassis 11; and the central pole 14 extends downwardly and vertically from that central point or central region, along a vertical axis that is generally vertical and is generally perpendicular to the ground.

The self-flying hands-free shaving apparatus further comprises a plurality of video cameras, as discussed above and/or herein. Each such video camera of the self-flying hands-free shaving apparatus may be, for example, a high-resolution imager or video imaging unit that is capable of capturing video at Full High Definition 1080p resolution or at 4K resolution or at 8K resolution, and at a frame-rate of 24 or 30 or 60 or 120 frames-per-second; such video cameras or imagers may allow the hardware processor 32 and/or the Computer Vision Analysis Unit 34 to perform accurate and high-quality processing and computer vision analysis of the captured video, as fine details can be detected and recognized with such high resolution, and the increased frame-rate may similarly allow rapid response of the processor to an environment that may be dynamically changing.

In some embodiments, the apparatus includes the following four video cameras, that are mounted on (or connected to, or affixed to) the vertical central pole 14; for example: (A) a first video camera 161 that is oriented horizontally and captures video having a first field-of-view; and (B) a second video camera 162 that is oriented horizontally at a 90-degree angle relative to orientation direction of the first video camera 161, and that captures video having a second field-of-view; and (C) a third video camera 163 that is oriented horizontally at a 90-degree angle relative to orientation direction of the second video camera 162, and that captures video having a third field-of-view; and (D) a fourth video camera 164 that is oriented horizontally at a 90-degree angle relative to orientation direction of the third video camera 163, and that captures video having a fourth field-of-view. It is noted that in some of the drawings, the following symbol ">>" (which can be rotated by 90 or 180 or 270 degrees) indicates a direction to which a particular camera (or other sensor) is oriented or directed.

In accordance with some embodiments, the first field-of-view of the first video camera 161, and the second field-of-view of the second video camera 162, are partially overlapping; and similarly, the second field-of-view of the second video camera 162, and the third field-of-view of the third video camera 163, are partially overlapping; and similarly, the third field-of-view of the third video camera 163, and the fourth field-of-view of the fourth video camera 164, are partially overlapping; and similarly, the fourth field-of-view of the fourth video camera 164, and the first field-of-view of the first video camera 161, are partially overlapping. The overlapping fields-of-view of the four cameras may ensure that there does not remain any spatial region around the apparatus, that is not clearly covered by at least one of these four video cameras; thereby preventing a situation in which the hardware processor fails to identify an obstacle because it does not appear in any field-of-view of any video camera.

The self-flying hands-free shaving apparatus further comprises: an upwardly-oriented video camera 165, that is oriented vertically and upwardly, and captures video having a fifth field-of-view that is generally perpendicular to the first and second and third and fourth fields-of-view.

In some embodiments, the fifth field-of-view of that upwardly-oriented video camera 165, is partially overlapping with the first field-of-view of the first video camera 161; and also, the fifth field-of-view of that upwardly-oriented video camera 165, is partially overlapping with the second field-of-view of the second video camera 162; and also, the fifth field-of-view of that upwardly-oriented video camera 165, is partially overlapping with the third field-of-view of the third video camera 163; and also, the fifth field-of-view of that upwardly-oriented video camera 165, is partially overlapping with the fourth field-of-view of the fourth video camera 164.

The self-flying hands-free shaving apparatus further comprises: a downwardly-oriented video camera 166, that is oriented vertically and downwardly, and captures video having a sixth field-of-view that is generally perpendicular to the first and second and third and fourth fields-of-view. The fifth field-of-view of the upwardly-oriented video camera 165, is generally opposite to the sixth field-of-view of the downwardly-oriented video camera 166.

In some embodiments, the sixth field-of-view of that downwardly-oriented video camera 165, is partially overlapping with the first field-of-view of the first video camera 161; and also, the sixth field-of-view of that downwardly-oriented video camera 165, is partially overlapping with the second field-of-view of the second video camera 162; and also, the sixth field-of-view of that downwardly-oriented video camera 165, is partially overlapping with the third field-of-view of the third video camera 163; and also, the sixth field-of-view of that downwardly-oriented video camera 165, is partially overlapping with the fourth field-of-view of the fourth video camera 164.

The self-flying hands-free shaving apparatus 100 further comprises: a computer vision analysis unit 34, implemented using said hardware processor 32 and said memory unit 33, and/or via one or more other processors or CPUs or DSPs or GPUs that can be part of the apparatus. The computer vision analysis unit 34 is configured or programmed to perform real-time computer vision analysis of: (i) live video captured by the first video camera 161, and (ii) live video captured by the second video camera 162, and (iii) live video captured by the third video camera 163, and (iv) live video captured by the fourth video camera 164, and (v) live video captured by the upwardly-oriented video camera 165, and (vi) live video captured by the downwardly-oriented video camera 166.

The computer vision analysis unit 34 is configured or programmed to generate signals or insights or analysis results, that include, for example: (a) a signal indicating that a non-moving obstacle (e.g., a wall, a table, a floor, a ceiling) is located at a particular direction relative to the apparatus (e.g., at the direction to which the second video camera 162 is oriented); or, (b) a signal indicating that a moving item (human, animal, object) is located at a particular direction relative to the apparatus (e.g., at the direction to which the third video camera 163 is oriented), such as by comparing the in-picture/in-frame location of a recognized item across multiple frames of the same camera, or recognizing that item transitioning from the video captured by one camera to appearing in a video captured by another camera; or, (c) a signal indicating that a human was detected, with its direction; and/or other analysis results or insights.

The self-flying hands-free shaving apparatus further comprises: a reference-image storage unit 84 that is configured to store a reference-image of a face of a particular human that is intended to be shaved by said apparatus. The reference image, or several such reference images, may be stored therein and may be provided to that storage unit 84 in a variety of ways; for example, by requesting the user, in advance, to take a photograph of himself or of his face, and to send that photograph over a wired communication link and/or over a wireless communication link to a wired transceiver and/or wireless transceiver that may be part of the apparatus, such as over a Wi-Fi communication link, or over a Bluetooth communication link, or over a USB cable; or, by having the apparatus perform an initial onboarding/registration/initialization process, in the first-ever usage session of the apparatus, in which the user is requested to hold the apparatus in his hands, and to look at one particular camera out of the multiple camera (e.g., a camera indicated by a red dot or a yellow marker), and to push a button or otherwise actuate that particular camera to take one image (or several images) of the user, which are then stored as the user's reference images.

In accordance with some embodiments, the computer vision analysis unit 34 is configured to recognize and to detect, in live video streams that it analyzes, at least: (i) the face of said particular human, and also (ii) one or more humans that are in a vicinity of said particular human and that are not said particular human, and also (iii) the ground, and also (iv) one or more inanimate objects that are in a vicinity of the apparatus and that said apparatus is configured to avoid flying into.

In some embodiments, the computer vision analysis unit 34 is configured to dynamically determine, based on computer vision analysis of video streams, at least: (a) an X-axis horizontal displacement that is required for said apparatus to fly along the X-axis in order to be able to shave the face of said particular human, and also (b) a Y-axis horizontal displacement that is required for said apparatus to move along the Y-axis in order to be able to shave the face of said particular human, and also (c) a Z-axis horizontal displacement that is required for said apparatus to move along the Z-axis in order to be able to shave the face of said particular human. The insights generated by the computer vision analysis enable the hardware processor to send selective blade-propelling commands, to the plurality of propelling blades of the apparatus, in order to correctly navigate the apparatus away from the ground, away from the ceiling, away from obstacles or over obstacles, away from animals or over animals, away from other humans who are not the target human intended to be shaved, and towards the face of that particular human that is intended to be shaved. The decisions or determinations by the computer vision analysis unit 34 and/or the processor 32, are further utilized and/or implemented by the FNC units (81, 82, 83).

It is noted that in some embodiments, in order to slightly simplify the operation of the apparatus, it is possible to implement the apparatus without using any reference image of any user, and without requiring the apparatus to specifically shave a particular user; for example, by providing the apparatus as an apparatus that can fly towards, and shave, any human that the apparatus detects nearby, and/or all the humans that the apparatus detects nearby; and optionally, by including with the apparatus a written and/or audible message that tells the user, that the best way to utilize the apparatus is to ensure that the human intended to be shaved is the only human and/or the only living organism in the room; thus removing the requirement to perform face recognition in order to identify a particular user and/or in order to distinguish among multiple humans that may be in the vicinity of the apparatus. Such implementation, that lacks the reference image feature and the recognition of a particular human face out of several humans in the room, can also be more suitable for a user (apparatus owner) who has privacy concerns, and does not wish the apparatus to keep its image as a reference image. It is also noteworthy that some users may anyway prefer to utilize the apparatus when they are entirely alone in the room or in the house; or when other humans are in other rooms and not in the same room; for example, a male user who wants to shave in the bathroom while his wife is eating in the kitchen.

In some embodiments, computer vision analysis results or detections or recognitions or insights, that are dynamically generated by the computer vision analysis unit 34 based on real-time video analysis, are utilized by the hardware processor 32 to selectively and separately control each one of: the first set of one or more vertically-propelling blades 151, and the second set of one or more vertically-propelling blades 152, and the third set of one or more vertically-propelling blades 153, and the fourth set of one or more vertically-propelling blades 154, and the four sets 141-144 of horizontally propelling blades.

The hardware processor 32, based on the computer vision analysis results by the computer vision analysis unit 34, is programmed or configured to cause the apparatus—in cooperation with the FNC units 81-83—to autonomously fly to a vicinity of said particular user, and to cause said apparatus to remain hovering at a particular pre-defined distance (e.g., at least 40 centimeters; or at least 50 centimeters; or at a distance D that is in a range of 40 to 75 centimeters) from said particular user, or from a body organ or body part (e.g., the nose; the right ear; the left ear), and to continuously hover in mid-air while remaining at said particular distance (or distance range) from said particular user.

The apparatus further comprises: an electric shaver 23, comprising one or more shaving blades 24, such as one or more electrically spinning shaving blades or one or more electrically oscillating shaving blades.

The electric shaver 23 is connected to a telescopic arm 22 or a robotic telescopic arm or a robotic arm, that is located downwardly relative to the elongated, generally-vertical, central pole 14. The telescopic arm 22 is capable of swiveling or pivoting or rotating or spinning or revolving around that central pole, as well as extending and retracting, via an Arm Motor-and-Control Unit 21 that is connected beneath the elongated, generally-vertical, central pole 14.

The hardware processor 32, based on the computer vision analysis results, is configured to cause the Arm Motor-and-Control Unit 21, to selectively swivel/spin/pivot/rotate, and/or to selectively extend or retract, said telescopic arm 22, in order to enable said telescopic arm 22 to be at a particular spatial point or spatial region that causes the electric shaver 23 to touch the face of said particular human and to autonomously perform a shaving operation on the face of said particular human.

In some embodiments, the electric shaver 23 has a front side, through which the shaving blades perform shaving operations. For example, one or two or four precise-shaving assistive video cameras 26 are fixed or affixed or connected to the electric shaver 23 at its sides or side-panels, such as: (a) a first precise-shaving assistive video camera 26, that is fixedly attached at a first side of said electric shaver 23, and that is oriented to capture live video of a first region which is generally in front and to the right of said front side of the electric shaver 23; (b) a second precise-shaving assistive video camera 26, that is fixedly attached at a second side of said electric shaver 23, and that is oriented to capture live video of a second region which is generally in front and beneath said front side of the electric shaver 23; (c) a third precise-shaving assistive video camera 26, that is fixedly attached at a third side of said electric shaver 23, and that is oriented to capture live video of a third region which is generally in front and to the left of said front side of the electric shaver 23; and (d) a fourth precise-shaving assistive video camera 26, that is fixedly attached at a fourth side of said electric shaver 23, and that is oriented to capture live video of a fourth region which is generally in front and above said front side of the electric shaver 23.

The computer vision analysis unit 34 is configured to perform computer vision analysis of video streams that are captured by the first and second and third and fourth precise-shaving assistive video cameras 26; and is further configured to generate determination(s) with regard to: (i) which facial regions of said particular human still require shaving operations, and/or (ii) which facial regions of said particular human do not require further (or any) shaving operations; and/or (iii) whether a particular face-region has a scar/mole/wound/open wound/pimple such that autonomous shaving of that particular face-region should be avoided or skipped.

In some embodiments, the precise-shaving assistive video cameras 26 of the electric shaver 23, are configured to automatically focus on a target that is located approximately 3 to 20 centimeters away from them; in order to enable them to capture high-quality and high-detail live video of the face of the human when the electric shaver unit is in close proximity to it and/or immediately before commencing actual shaving operations and/or during (concurrently with) an ongoing shaving operation and/or immediately after ending or pausing a shaving operation; to enable the computer vision unit to analyze the particular face region that are about to be shaved and/or that are currently being shaved and/or that has just been shaved. In some embodiments, in contrast, the six live video cameras that are utilized for guiding and navigating and flying the apparatus, are configured to automatically focus on objects that are located at least 20 centimeters away from each such camera; in order to enable accurate and safe navigation/flying/hovering/spatial movement of the entire apparatus. In some embodiments, optionally, those six live video cameras, or one or some of them, may still auto-focus on the face or the facial hair of the human, and may still assist in capturing and providing live video of the human face or of particular face-regions, before/during/after a shaving operation.

It is noted that in some embodiments, processor 32 and/or computer vision analysis unit 34 may be programmed or trained to recognize a non-shave-able face-region, or a face-regions that should preferably by avoided or skipped by the autonomous hands-free shaving process of the apparatus, by using a dataset of images or video segments that depict a mole/a scar/an open wound/an open injury/a blood clot/a blood flow/a pimple; based on a large dataset of thousands or millions of such items or objects or conditions, or based on insights generated by an AI/ML/DL/NN engine or classifier or predictor.

In some embodiments, the front side of the electric shaver 23 has a tactile sensor 25 or touch-sensor or touch-detection sensor or pressure sensor or pressure sensor or contact-detection sensor, configured to detect whether or not the tactile sensor 25 is touching a target, and configured to generate a touch-detection signal that indicates that the tactile sensor 25 is currently in touch with the target; wherein the tactile sensor 25 comprises a movable or push-able or press-able switch or contact or electric contact that, upon application of a touch pressure thereon, causes an electric circuit to become closed and operational and to output said touch-detection signal.

The hardware processor 32 is configured to take into account the output(s) from the tactile sensor 25, in processing operations that command said apparatus to fly upwardly or to fly downwardly or to fly horizontally at a particular direction or to hover in mid-air. In some embodiments, the hardware processor 32 checks and determines whether or not the following three conditions hold true: (I) The first condition is, that computer vision analysis of live video streams of the first video camera 161 and the second video camera 162 and the third video camera 163 and the fourth video camera 164 and the upwardly-oriented video camera 165 and the downwardly-oriented video camera 166, indicates that said apparatus is in proximity to the face of said particular human, and further indicates that the electric shaver 23 is located in proximity to the face of said particular user. (II) The second condition is, that the touch-detection signal from the tactile sensor 25 indicates that the electric shaver 23 is currently touching the face of said particular user. (III) The third condition is, that computer vision analysis of live video streams of the one or more (or four) precise-shaving assistive video cameras 26, indicates that said apparatus is in proximity to the face of said particular human, and further indicates that the electric shaver 23 is located in proximity to the face of said particular user.

If those three conditions hold true (or, in some embodiments, if one of them; or, if two of them), then the hardware processor 32 determines that an active shaving operation is now being performed, and the hardware processor 32 commands said apparatus to hover in mid-air for a particular time-period of T seconds to enable continuous shaving, wherein T is a pre-defined value in a range of (for example) 5 to 12 seconds; and once said particular time period of T seconds elapses, the hardware processor 32 generates instructions that cause said electric shaver 23 to relocate to a nearby face-region by performing at least one of: (i) commanding the apparatus to fly along the X-axis to obtain an X-axis displacement, (ii) commanding the apparatus to fly along the Y-axis to obtain a Y-axis displacement, (iii) commanding the apparatus to fly along the Z-axis to obtain a Z-axis displacement, (iv) commanding the telescopic arm 22 to perform a swiveling or pivoting operation, (v) commanding the telescopic arm 22 to extend, (vi) commanding the telescopic arm 22 to retract. The telescopic arm may include, or may be associated with, an electric motor that can be commanded by the hardware processor to generate a push force or a pull force, in order to deploy such expanding or retracting of the robotic arm.

In some embodiments, the hardware processor 32, based on the computer vision analysis results, is further configured to distinguish between: (i) a first face-region that is covered with beard hair, and (ii) a second face-region that is free of beard hair.

In some embodiments, the hardware processor 32, based on the computer vision analysis results, is further configured cause said apparatus to fly to a vicinity of the first face-region, and to avoid flying to the vicinity of the second face-region. In some embodiments, the distinguishing among two (or more) types of face regions, such as (i) a fully-shaven/entirely shaven face region, and (ii) a partially-shaven face region, and (iii) an entirely non-shaven face region or a face-region that clearly shows a thick beard or mustache, may be performed based on, for example, comparison to reference images or a dataset of images of pre-classified face regions or faces or humans, or based on an image analysis that utilizes an Artificial Intelligence (AI)/Machine Learning (ML)/Deep Learning (DL)/Neural Network (NN) engine that can be pre-trained on a dataset of thousands or millions of images or videos of pre-classified face regions or faces or humans and can generate and utilize classifiers or predictors or automatic classification modules that can accurate estimate or predict or determine whether a particular, fresh, live image or live video frame or live video segment, at a pre-defined minimum level of certainty (e.g., by at least 80 or 85 or 90 percent confidence interval or confidence level) shows a particular type (out of the three types mentioned above; or, out of two specific types from those three types) of face-region, in order to determine or to modify or to initiate navigation/flying/hovering operations of the apparatus, and/or in order to determine or modify or to initiate operations of the telescopic arm (e.g., extend, retract, swivel/pivot/spin/rotate) and/or of the electric shaver unit (e.g., activate the shaving blades, or deactivate the shaving blades). It is noted that the Applicant has realized that is can be possible to incorporate such an AI/ML/DL/NN engine even within the relatively small-form-factor apparatus that needs to fly and hover in mid-air, without causing the apparatus to have a negatively-impacting increased weight/ increased volume; for example, in March 2023 it was shown the Large Language Model Meta AI known as LLaMA, which is a 65-billion-parameter large language model, can run on a Google Pixel 6 smartphone (that was launched in October 2021) at an effective performance rate (e.g., around 5 tokens per second); and thus, realized the Applicant, a similar integration or incorporation of such AI/ML/DL/NN engine into or within a self-flying apparatus is feasible. Some embodiments may utilize in the self-flying hands-free shaving apparatus a computer vision AI model such as the "Segment Anything Model" (SAM) or the "Segment Anything" (SA) project, from Meta, which was trained on one billion masks and 11 million images, and which can recognize and segment objects or items in images or video frames, including (in some situations) objects that the model had never "seen" or "encountered" during its training/learning process.

In some embodiments, optionally, the computer vision analysis may be based on, or may take into account, one or more pre-provided reference images of the particular human (the particular user) himself, that he may provide to the memory unit of the apparatus via a wired/wireless communication link; such as, one or more reference images that the particular user provides in advance to the memory unit of the apparatus and that the human user classified in advance as "example of my face at a fully clean shaven state", or as "example of my face with a beard and moustache", or as "example of my face during a partially-shaven state or during progress of my manual shaving process".

In some embodiments, the hardware processor 32, based on the computer vision analysis results, is further configured to cause said Arm Motor-and-Control Unit 21 to selectively swivel (or pivot), and to selectively extend or retract, said telescopic arm 22, to enable said telescopic arm 22 to move from (i) being closest to the second face-region that is free of beard hair, to (ii) being closest to the first face-region that is covered with beard hair.

In some embodiments, the hardware processor 32, based on the computer vision analysis results, is further configured to count hairs that appear in live video streams that are captured by one or more of the video cameras of said apparatus; and to estimate a hair-density value for different regions of the face of said particular human; In some embodiments, the hardware processor 32, based on the computer vision analysis results, is further configured to cause said Arm Motor-and-Control Unit 21 to selectively swivel (or pivot), and to selectively extend or retract, said telescopic arm 22, to enable said telescopic arm 22 to move from (i) a first particular face-region that has a first value of hair density (e.g., not more than 3 hairs or hair-edges per square centimeter), to (ii) a second particular face-region that has a second, greater, value of hair density (e.g., at least 3 hairs or hair-edges per square centimeter). The hair counting may be based on live video from any of the cameras of the apparatus, and/or by fusing data or images or video frames from multiple such cameras of the apparatus, or by correlating or fusing hair-counts generated separately based on video or video frames or images from each camera separately.

In some embodiments, the hardware processor 32 is configured to cause movement of the electric shaver 23, from the first particular face-region to the second particular face-region, only if the second hair density is at least N times (e.g., at least 1.5 or 2.0 or 2.5 or 3 times) the first hair density, to prevent back-and-forth movement of the shaver 23 between two face-regions having sufficiently similar hair density, and to reduce motion of the telescopic arm 22, and to reduce flying movements of said apparatus. For example, the hardware processor may be configured to prevent movement of the electric shaver from a face-region having 3 hairs per square centimeter to a nearby face-region having 4 hairs per square centimeter; as these two values can be pre-defined as not sufficiently distant from each other to justify movement of the shaver/the telescopic arm/the entire self-flying apparatus, and/or since the small difference between the two values may be attributed to image noise or video artifacts or to imperfections in the hair-counting algorithm.

In some embodiments, the apparatus further comprises: a set of one or more thermal imagers (denoted 17; denoted 177A to 177F) or infrared cameras or IR cameras (e.g., configured to detect/measure the infrared energy that is emitted by humans or objects, and to convert that data into estimated face or surface temperature of the human/object being measured), mounted on said elongated, generally-vertical, central pole 14. The thermal imagers are configured to perform thermal imaging of a surrounding of apparatus. The hardware processor 32 is configured: (a) to perform liveliness determination/detection/estimation, based on a combination of (a1) analysis of thermal images captured by the set of one or more thermal imagers and (a2) computer vision analysis of live video streams from multiple video cameras of said apparatus, and (b) to determine whether a face that is captured in one or more of the live video streams corresponds to (b1) a living human or to (b2) a non-living painting or photograph. A liveliness determination result that is generated by the hardware processor 32, is then further utilized by said hardware processor 32 to selectively guide said apparatus, for example, towards a first target that said hardware processor 32 determined to be a living human, and/or away from a second target that said hardware processor 32 determined to be a non-living painting or photograph.

In some embodiments, the apparatus further comprises: one or more LIDAR or LiDAR sensors 16 (Light Detection and Ranging remote sensing units), or a set of six LIDAR or LiDAR sensors (denoted 178A to 178F), that are mounted on said elongated, generally-vertical, central pole 14. For example, the set of six LIDAR sensors may comprise: (a) an upwardly-oriented LIDAR sensor, configured to measure a first vertical distance towards a ceiling; (b) a downwardly-oriented LIDAR sensor, configured to measure a second vertical distance towards the ground; (c) a first horizontally-oriented LIDAR sensor, configured to measure a first horizontal distance towards one or objects along an X-axis at a first horizontal direction; (d) a second horizontally-oriented LIDAR sensor, configured to measure a second horizontal distance towards one or objects along a Y-axis at a second horizontal direction that is generally perpendicular to said first horizontal direction; (e) a third horizontally-oriented LIDAR sensor, configured to measure a third horizontal distance towards one or objects along said X-axis at a third horizontal direction that is generally perpendicular to said second horizontal direction; (f) a fourth horizontally-oriented LIDAR sensor, configured to measure a fourth horizontal distance towards one or objects along said Y-axis at a fourth horizontal direction that is generally perpendicular to said second horizontal direction.

In some embodiments, real-time live LIDAR-sensed data, from each LIDAR sensor of the set of six LIDAR sensors (178A to 178F), is fed into the hardware processor 32, and is utilized by the hardware processor 32 to adjust movement and autonomous flying of said apparatus, based on one or more pre-defined rules that define at least: (a) a first minimum distance that said apparatus should keep from the ground, and (b) a second minimum distance that said apparatus should keep from the ceiling, and (c) a third minimum distance that said apparatus should keep from any human, and (d) a fourth minimum distance that said apparatus should keep from any non-human object. In some embodiments, output generated by any of the LIDAR sensors of the apparatus, may be utilized by the hardware processor for (or, as part of) any suitable computation or analysis; for example, as part of computer vision analysis (e.g., enabling to distinguish between a video-frame that shows a child face from a distance of 2 meters, and a video-frame that shows an adult face from a distance of 6 meters; the two faces may occupy the same or similar area in pixels within each video frame, yet the LIDAR information may assist in determining the distance of each target from the apparatus and thus distinguishing between the real-life size of the two faces/targets), and/or as part of the analysis that determines whether a particular image-portion or video-frame portion depicts a shaved face-region or a non-shaved face-region or another type of object that looks visually similar yet is located at a greater distance from the apparatus), and/or for purposes of navigating or commanding the self-flying apparatus to fly/to hover/to land, and/or for purposes of commanding the telescopic arm to extend/retract/swivel/pivot/spin/rotate, and/or for other purposes.

In some embodiments, the apparatus may comprise, instead of using LIDAR sensors or in addition to them: one or more non-LIDAR sensors that are configured to measure or estimate distance of an object/human/target, based on ultrasonic waves/sound waves, and not based on laser beams; for example, a set of six non-LIDAR ultrasonic-based distance sensors are mounted on said elongated, generally-vertical, central pole 14. For example, the set of six ultrasonic-based distance sensors may comprise: (a) an upwardly-oriented ultrasonic-based distance sensor, configured to measure a first vertical distance towards a ceiling; (b) a downwardly-oriented ultrasonic-based distance sensor, configured to measure a second vertical distance towards the ground; (c) a first horizontally-oriented ultrasonic-based distance sensor, configured to measure a first horizontal distance towards one or objects along an X-axis at a first horizontal direction; (d) a second horizontally-oriented ultrasonic-based distance sensor, configured to measure a second horizontal distance towards one or objects along a Y-axis at a second horizontal direction that is generally perpendicular to said first horizontal direction; (e) a third horizontally-oriented ultrasonic-based distance sensor, configured to measure a third horizontal distance towards one or objects along said X-axis at a third horizontal direction that is generally perpendicular to said second horizontal direction; (f) a fourth horizontally-oriented ultrasonic-based distance sensor, configured to measure a fourth horizontal distance towards one or objects along said Y-axis at a fourth horizontal direction that is generally perpendicular to said second horizontal direction.

In some embodiments, real-time live ultrasonic-sensed data, from each ultrasonic-based distance sensor of the set of six ultrasonic-based distance sensors, is fed into the hardware processor 32, and is utilized by the hardware processor 32 to adjust movement and autonomous flying of said apparatus, based on one or more pre-defined rules that define at least: (a) a first minimum distance that said apparatus should keep from the ground, and (b) a second minimum distance that said apparatus should keep from the ceiling, and (c) a third minimum distance that said apparatus should keep from any human, and (d) a fourth minimum distance that said apparatus should keep from any non-human object. In some embodiments, output generated by any of the ultrasonic-based distance sensors of the apparatus, may be utilized by the hardware processor for (or, as part of) any suitable computation or analysis; for example, as part of computer vision analysis (e.g., enabling to distinguish between a video-frame that shows a child face from a distance of 2 meters, and a video-frame that shows an adult face from a distance of 6 meters; the two faces may occupy the same or similar area in pixels within each video frame, yet the ultrasonic-based distance information may assist in determining the distance of each target from the apparatus and thus distinguishing between the real-life size of the two faces/targets), and/or as part of the analysis that determines whether a particular image-portion or video-frame portion depicts a shaved face-region or a non-shaved face-region or another type of object that looks visually similar yet is located at a greater distance from the apparatus), and/or for purposes of navigating or commanding the self-flying apparatus to fly/to hover/to land, and/or for purposes of commanding the telescopic arm to extend/retract/swivel/pivot/spin/rotate, and/or for other purposes.

In some embodiments, the apparatus comprises: (A) a Z-axis flight navigation and control (FNC) unit (81), configured to cause said apparatus to fly upwardly or downwardly along a Z-axis or to hover in a vertically-fixed elevation level; based on data that the hardware processor 32 generates and which takes into account at least: (i) computer-vision analysis results of live video streams from cameras of said apparatus, and (ii) LIDAR-sensed data from each LIDAR sensor of the set of six LIDAR sensors, and (iii) thermal imagery data sensed by the set of one or more thermal imagers 17. In some embodiments, the apparatus also comprises: (B) an X-axis flight navigation and control (FNC) unit (82), configured to cause said apparatus to fly forward or backward along a horizontal X axis or to maintain a fixed position along said horizontal X axis; based on data that the hardware processor 32 generates and which takes into account at least: (i) computer-vision analysis results of live video streams from cameras of said apparatus, and (ii) LIDAR-sensed data from each LIDAR sensor of the set of six LIDAR sensors, and (iii) thermal imagery data sensed by the set of one or more thermal imagers 17. In some embodiments, the apparatus also comprises: (C) a Y-axis flight navigation and control (FNC) unit (83), configured to cause said apparatus to fly forward or backward along a horizontal Y axis or to maintain a fixed position along said horizontal Y axis; based on data that the hardware processor 32 generates and which takes into account at least: (i) computer-vision analysis results of live video streams from cameras of said apparatus, and (ii) LIDAR-sensed data from each LIDAR sensor of the set of six LIDAR sensors, and (iii) thermal imagery data sensed by the set of one or more thermal imagers 17. In some embodiments, said Z-axis is generally perpendicular to the ground; said Y-axis is generally horizontal and is generally parallel to the ground; said X-axis is generally horizontal and is generally parallel to the ground; said Y-axis is generally perpendicular to said X-axis.

It is noted that in some embodiments, one or more functionalities that are described as possibly being performed by a LIDAR sensor, can be implemented, instead of the LIDAR sensor, by using a non-LIDAR distance sensor, such as an ultrasonic based distance sensor or a sound-wave based distance sensor; or, by utilizing both a LIDAR sensor and a non-LIDAR distance sensor/ultrasonic-based distance sensor.

In some embodiments, the apparatus further comprises, as one of the reservoirs 19: a post-shaving soothing liquid storage compartment, configured to store therein a particular post-shaving soothing liquid that is selected from the group consisting of: a liquid perfume, a liquid after-shave, a liquid having a particular scent or aroma or odor or smell. The apparatus includes, as an implementation of spray-head 27, a post-shaving soothing liquid spray-head unit, that is connected via a post-shaving soothing liquid transport tube (which is an implementation of the transport tube 28) to said post-shaving soothing liquid storage compartment. The post-shaving soothing liquid spray-head unit, upon being actuated, is configured to pump out and to spray a portion of said particular post-shaving soothing liquid. In some embodiments, the apparatus further comprises: a post-shaving soothing liquid spray-head orientation unit 29E, denoted PS-SL-SH-OU 29E (which is shown as part of the housing/chassis 11, but may instead be implemented as part of the central pole 14), configured to determine a spatial direction to which said post-shaving soothing liquid spray-head unit should be oriented, in order for said post-shaving soothing liquid spray-head unit to be capable of spraying said particular post-shaving soothing liquid towards said face of said particular human. Based on a determination of said spatial orientation by the spray-head orientation unit 29E, the hardware processor 32 commands at least one of the propelling blades of the apparatus to modify its propelling velocity or its revolution rate, and causes said apparatus to revolve or to spin or to rotate while hovering in mid-air and/or to or to move or to slant or to obtain a displacement via flight, and causes said post-shaving soothing liquid spray-head unit to be generally oriented towards said face of said particular human. In some embodiments, the apparatus further comprises: a post-shaving soothing liquid spray-head actuator unit 29C, denoted PS-SL-SH-AU 29C (which is shown as part of the housing/chassis 11, but may instead be implemented as part of the central pole 14), configured to actuate the post-shaving soothing liquid spray-head unit to spray out at least one portion of said particular post-shaving soothing liquid, towards the face of said particular human, upon a determination by said hardware processor 32 that an autonomous shaving process is complete, based on computer vision analysis of live video streams that depict the face of said particular human and that indicates that no more shaving operations are required and/or can be performed (e.g., due to moles/scars/open wounds, or due to the apparatus battery running low on power).

In some embodiments, the apparatus further comprises: audio output unit 65 having (or associated with) audio speaker 66 (both of them are shown as part of the housing/chassis 11, but may instead be implemented as part of the central pole 14); wherein the audio output unit 65 and the audio speaker 66 are integral parts of said apparatus. The audio output unit 65 is configured to generate an audible pre-recorded Post-Shaving Soothing Liquid Spray Alert message, that indicates verbally that a post-shaving soothing liquid spraying process is about to be performed, at a time-point that is T seconds prior to actuation of said spray-head unit (186) (e.g., a verbal alert message of "After Shave will be sprayed in three seconds, you may wish to close your eyes for the next ten seconds"); wherein T is (for example) a pre-defined value in a range of 1 to 5 seconds. In some embodiments, said post-shaving soothing liquid storage compartment is an elongated internal storage compartment that is entirely within said elongated, generally-vertical, central pole 14, and can be implemented as a specific example of reservoir(s) 19, or implemented as one of a plurality of such internal reservoir(s) 19.

In some embodiments, reservoir 19, or each of reservoirs 19 if a plurality of them are used and are co-located adjacently, can optionally be refilled and/or replaced; for example, the central pole 14 may have an opening or a door or a lid, enabling a user to remove and/or replace each such reservoir with a replenished reservoir, and/or enabling a user to add more liquid (or powder) to the relevant reservoir which, in turn, also has its own removable lid or cover. Replacement or refilling of such reservoir(s) 19 can be performed manually by the user, while the apparatus is idle and not shaving and not flying.

In some embodiments, the apparatus further comprises, as an implementation of reservoir(s) 19, a powder storage compartment; which is configured to store therein a particular powder that is selected from the group consisting of: baby powder, talc powder, talcum powder, post-shaving powder, a power having a particular scent or aroma or smell or odor. A powder transport tube is used, as an implementation of transport tube 18; it may traverse through said powder storage compartment, or may be connected to it. The powder transport tube has a first opening and a second opening. An elastic silicon airbag is used (e.g., implemented as an example of Spray Actuator(s) 29), and has a single opening, which is connected to the first opening of the powder transport tube. A powder ejector nozzle or spray-head (e.g., implemented as an example of spray-head 27) is located or connected at or near the second opening of the powder transport tube. In response to a squeezing force that is applied on the elastic silicon airbag by a nearby squeezing unit (e.g., an implementation of Spray Actuator(s) 29), said elastic silicon airbag reduces its volume and blows air outwardly away from the elastic silicon airbag through the first opening of the powder transport tube (transport tube 28), and causes the air to pass through a region of said powder storage compartment (reservoir 19) and to pick up and carry a portion of said particular powder, and causes said air with the carried powder to be transported towards the second opening of the powder transport tube (transport tube 28) and through the powder ejector nozzle (spray-head 27), outwardly away from the powder ejector nozzle.

A powder spray actuator unit (which may be implemented as an example of Spray Actuator(s) 29, or as a unit within central pole 14 and/or within the housing/chassis 11) is configured to generate a temporary mechanical squeezing force towards said powder transport tube (196), in response to a command from the hardware processor 32 to perform a powder spray operation. The hardware processor 32 is configured to determine that the autonomous shaving process is complete, based on computer vision analysis of live video streams that depict the face of said particular human and that indicates that no more shaving operations are required and/or can be performed (e.g., due to moles/scars/open wounds, or due to the apparatus battery running low on power). The hardware processor 32 is also configured to determine that said apparatus is pre-programmed or pre-configured to initiate an autonomous powder spray process upon completion of an autonomous shaving process; e.g., based on a user-toggled mechanical switch that allows the user to indicate in advance whether or not powder spraying or desired. The audio output unit 65 is configured to generate an audible pre-recorded Powder Spray Alert message, that indicates verbally that a powder spraying (or powder blowing) process is about to be performed, at a time-point that is N seconds prior to the actuation of powder spraying, wherein N is a pre-defined value in, for example, in a range of 3 seconds to 6 seconds (e.g., a verbal alert message of "Soothing Powder will be sprayed in three seconds, you may wish to close your eyes for the next ten seconds"). In some embodiments, the powder storage compartment is entirely within said elongated, generally-vertical, central pole 14, and can be implemented as a specific example of reservoir(s) 19, or implemented as one of a plurality of such internal reservoir(s) 19.

In some embodiments, the apparatus further comprises: a shaving cream storage compartment, which may be implemented as an example of reservoir(s) 19. It is configured to store therein a particular shaving cream that is selected from the group consisting of: an aerosol shaving cream, a gel-based shaving cream, a soap-based shaving cream, a foamed shaving cream. The apparatus includes a shaving cream spray-head unit, which is an example of spray-head 27; that is connected via a shaving cream transport tube (an example of transport tube 28) to said shaving cream storage compartment (reservoir 19). The shaving cream spray-head unit, upon being actuated, is configured to pump out and to spray a portion of said particular shaving cream.

A shaving cream spray-head orientation unit 29F, denoted SC-SH-OU 29F, is shown as part of the housing/chassis 11, but may instead be implemented as part of the central pole 14. It is configured to determine a spatial direction to which said shaving cream spray-head unit should be oriented or generally directed, in order for said shaving cream spray-head unit to be capable of spraying said particular shaving cream towards said face of said particular human. Based on a determination of said spatial orientation by the shaving cream spray-head orientation unit 29F, the hardware processor 32 commands at least one set of the propelling blades of the apparatus to modify its propelling velocity or revolution rate, and causes said apparatus to revolve or to spin around or to rotate while hovering in mid-air, and/or to fly to a nearby spatial location, and causes said shaving cream spray-head unit to be oriented or generally directed towards said face of said particular human.

In some embodiments, the apparatus comprises: a shaving cream spray-head actuator unit 29D, denoted SC-SH-AU 29D, which is shown as part of the housing/chassis 11, but may instead be implemented as part of the central pole 14. It is configured to actuate the shaving cream spray-head unit (e.g., an example of spray-head 27) to spray out at least one portion of said particular shaving cream, towards the face of said particular human, upon a determination by said hardware processor 32 that an autonomous shaving process is ready to commence, and prior to commencement of shaving of said face of said particular human, based on computer vision analysis of live video streams that depict the face of said particular human and that indicate that shaving operations are required to commence; and also, in some embodiments, at pre-defined time intervals, such as every 20 seconds or every 30 seconds during the autonomous shaving session. The audio output unit 65 is configured to generate an audible pre-recorded Shaving Cream Spray Alert message, that indicates verbally that a shaving cream spraying process is about to be performed, at a time-point that is M seconds prior to the first actuation of said shaving cream spray-head unit; wherein M is a pre-defined value, for example, in a range of 3 seconds to 6 seconds (e.g., a verbal alert message of "Shaving Cream will be sprayed in three seconds, you may wish to close your eyes for the next six seconds"). In some embodiments, said shaving cream storage compartment is an elongated internal storage compartment that is entirely within said elongated, generally-vertical, central pole 14, and can be implemented as a specific example of reservoir(s) 19, or implemented as one of a plurality of such internal reservoir(s) 19.

In some embodiments, the self-flying apparatus further comprises: (a) an acoustic microphone 67, to capture audio from a surrounding of said apparatus; and (b) an Automatic Speech Recognition (ASR) unit 68, to perform an Automatic Speech Recognition (ASR) process on audio captured by said acoustic microphone 67, and to generate therefrom a textual transcript. A speech analysis unit 69 is also part of the self-flying apparatus, and is configured to perform textual analysis and/or contextual analysis on said textual transcript, and to recognize a particular shaving-related command that was uttered by a user and that is represented in said textual transcript.

In some embodiments, for example, the speech analysis unit 69 may be is specifically configured to search for, and to recognize, at least one of the following, or some or all of the following: (A) a first verbal utterance indicating a user-command to avoid shaving of a particular face-region (e.g., "do not shave my moustache"); and/or (B) a second verbal utterance indicating a user-command to repeat shaving of an already-shaved particular face-region (e.g., "shave again my chin"); and/or (C) a verbal utterance indicating a user-command to pause or to stop the hands-free shaving process (e.g., "I need to go to work, please stop the shaving process"); and/or a verbal utterance indicating a user-command that can otherwise provide information that can be utilized by the processor 32 of the apparatus with regard to starting or stopping or modifying a shaving operation (e.g., "I have an open wound on my chin": or "I have a skin rash on my chin, please skip shaving my chin today"). In demonstrative example, the hardware processor 32 is configured: (A) to command the apparatus (and its relevant components) to avoid shaving a particular face-region, if the first verbal utterance was recognized by the speech analysis unit 69; and/or, (B) to command the apparatus (and its relevant components) to repeat, for at least M seconds, autonomous shaving of said already-shaved particular face region, if said second verbal utterance was recognized by the speech analysis unit 69; wherein M is a pre-defined value in a range of (for example) 5 to 15 seconds.

In some embodiments, the apparatus further comprises a water reservoir (e.g., implemented as one of the reservoirs 19) to store therein water, or pre-cooled water, or pre-warmed water. In some embodiments, the water reservoir is entirely enclosed within said elongated, generally-vertical, central pole 14. A water spraying unit is connected via a water-transport tube (e.g., transport tube 28) to said water reservoir. The water spraying unit, upon being actuated, is configured: (a) to pump out a particular volume of water via said water-transport tube from said water reservoir, and (b) to spray out said particular volume of water at an outwardly direction away from said apparatus.

In some embodiments, the apparatus includes a water spraying orientation unit 29B, denoted WS-OU 29B, which is shown as part of the housing/chassis 11, but may instead be implemented as part of the central pole 14. It is configured to determine a spatial direction to which said water spraying unit (e.g., implemented as spray-head 27) should be oriented or directed, in order for said water spraying unit to be capable of spraying water towards said face of said particular human.

Based on a determination of said spatial orientation by the water spraying orientation unit 29B, the hardware processor 32 commands at least one of the propelling blades of the apparatus to modify its propelling velocity or its revolution rate, and causes said apparatus to revolve or to spin or to rotate while hovering in mid-air and/or to or to move or to slant or to obtain a displacement via flight; and causes the self-flying apparatus to revolve or to move while hovering in mid-air or while flying; and causes the water spraying unit (e.g., spray-head 27) to be oriented towards said face of said particular human.

In some embodiments, the self-flying apparatus further comprises: a water spraying actuator unit 29A, denoted WS-AU 29A, which is shown as part of the housing/chassis 11, but may instead be implemented as part of the central pole 14. It is configured to actuate the water spraying unit to spray out water towards the face of said particular human, at pre-defined time intervals of T seconds, during a shaving process that is concurrently performed by the electric shaver 23, and to enable a wet shaving process in which said electric shaver 23 performs wet shaving of the face of said particular human while water is sprayed thereon at particular time intervals; wherein T is a pre-defined value in a range of (for example) 5 to 20 seconds.

In some embodiments, optionally, the apparatus may be pre-programmed by the user, such as by flipping or toggling a mechanical switch in advance (e.g., prior to the apparatus taking off and flying), to manually select between a dry shave and a wet shave; and the status of that switch may indicate to the hardware processor, based on suitable electric circuitry or logic gates, which type of shave is desired and should be performed, and whether or not to spray water during the shaving process. A similar manual switch may be used by the user, in advance, to toggle or to select between a shaving session that will be accompanied by automatic spraying of a post-saving soothing liquid (or soothing powder), or that lacks such automatic spraying.

In some embodiments, the electric battery 31 is a rechargeable electric battery that supports cable-free electromagnetic charging via a wireless charging pad. In some embodiments, the self-flying apparatus further comprises: a low-battery detector unit 48, configured to continuously monitor a remaining power level of the electric battery, and configured to detect that the remaining power level is below a pre-defined threshold value of N percent, wherein N is a pre-defined value in a range of (for example) 5 to 10 percent.

The self-flying apparatus further includes a Fly-to-Recharge Commanding Unit 47, configured to receive from the low-battery detector unit 48 a low-battery signal indicating that the low-battery detector unit 48 has detected that the remaining power level of the electric battery 31 is below said pre-defined threshold value; and further configured, in response to said low-battery signal, to command the self-flying apparatus (and its relevant components) to pause or to abort an ongoing autonomous hands-free shaving process, and to autonomously fly towards said wireless charging pad; which can be found or located by the self-flying apparatus based on computer vision analysis of the live video from multiple cameras of the self-flying apparatus; and/or based on a beacon signal that the wireless charging pad may transmit continuously or at pre-defined time intervals, such as every 1 second, and which the self-flying apparatus can receive via a wireless receiver. The Fly-to-Recharge Commanding Unit 47 is configured to operate in coordination with the hardware processor 32 which, in turn, performs analysis of live video stream captured by video cameras of said apparatus and determines a flight direction that said apparatus should take in order to firstly reach above said wireless charging pad, and to then land on top of said wireless charging pad and remain parking there until the power level of the battery 31 replenishes or reaches a pre-defined target power level (e.g., at least 50 percent).

Figure 1J:
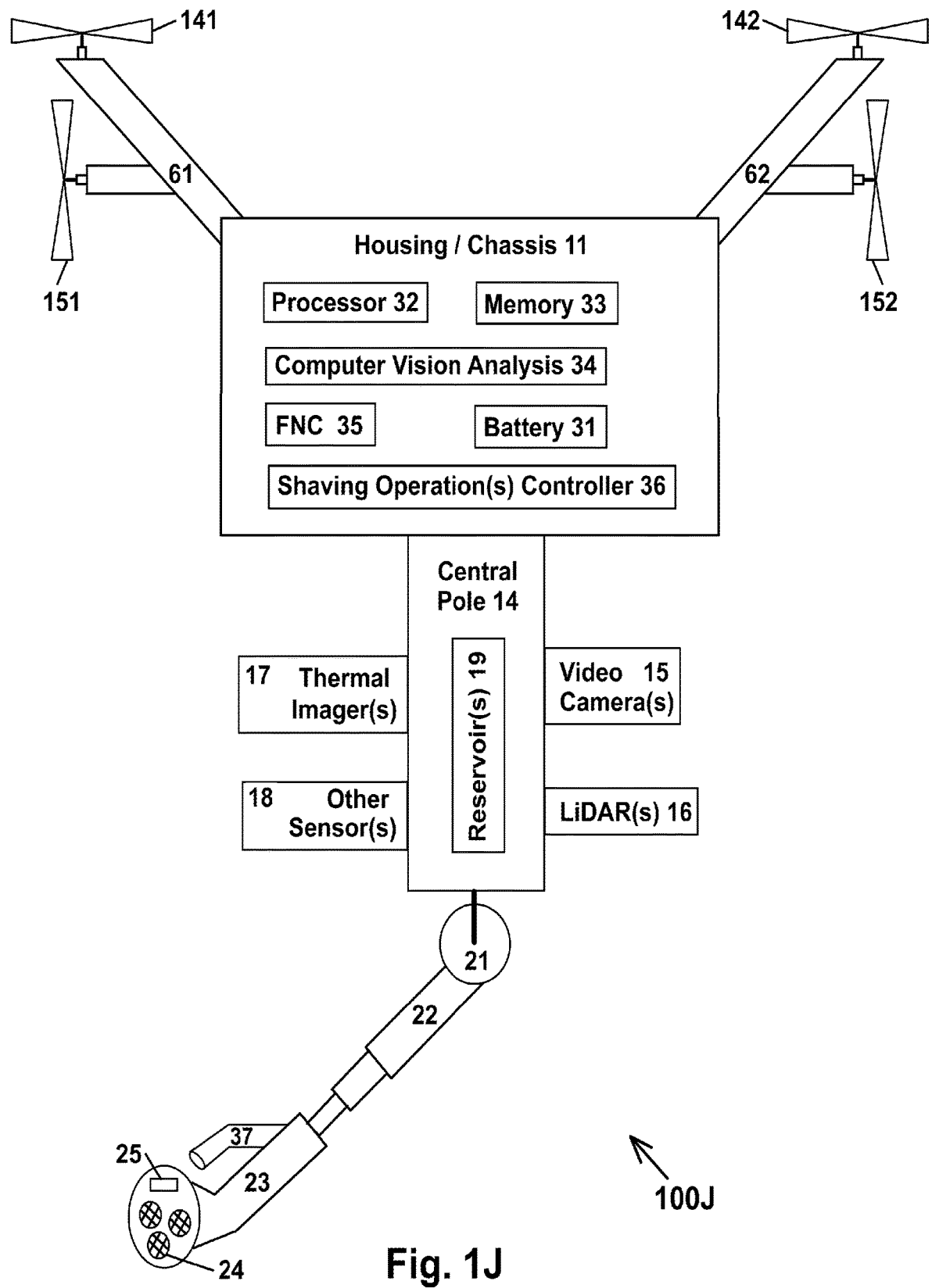
FIG. 1J is a schematic illustration of a side-view of self-flying hands-free shaving apparatus, in accordance with some demonstrative embodiments of the invention.

Reference is made to FIG. 1J, which is a schematic illustration of a side-view of self-flying hands-free shaving apparatus 100J, in accordance with some demonstrative embodiments of the invention. Apparatus 100J of FIG. 1F may be generally similar to any of the previous apparatus examples discussed above (such as 100 or 100B or 100C or 100D or 100E or 100F); yet it also has an Ultra-Violet C (UVC) light emitter 37, configured to autonomously perform sanitizing of the shaving blades; for example, configured to generate and emit UVC light having a germicidal wavelength in a range of 240 to 280 nanometer. The UVC light emitter 37 is an integral part of the self-flying apparatus, and is oriented to emit said UVC light towards at least one of: an outwardly-facing side of the electric shaver 23, and/or the one or more shaving blades 24. In some embodiments, a UVC light emitter activator 30, denoted UVC LEA 30 (which is shown as part of the housing/chassis 11, but may instead be implemented as part of the central pole 14 or as part of the electric shaver 23 itself), is configured to initiate a sanitization process. For example, it may receive a "shaving-ended" signal from said hardware processor 32, which indicates that an autonomous shaving process has ended; and may then wait a pre-defined time period of T1 seconds, wherein T1 is a pre-defined value in a range of (for example) 30 to 120 seconds; and then it activates the UVC light emitter 37 to emit UVC light for a period of T2 seconds for disinfecting or sanitizing the electric shaver 23 or its shaving blades 24; wherein T2 is a pre-defined value in a range of (for example) 15 to 45 seconds. In some embodiments, the UVC LEA 30 is configured to activate the UVC light emitter 37 at particular time-intervals (e.g., every two hours), or at a particular time of the day (e.g., at 3 AM every day), conditioned upon a determination (by the processor 32) that the self-flying apparatus is idle/is parked/is not flying at that time. Other conditions or rules may be programmed with regard to the activation or the actuation of the UVC light emission for disinfecting/sanitizing purposes.

In some embodiments, and as mentioned above as well, the self-flying apparatus comprises: a first illumination unit 161A, that is located adjacent to the first video camera 161, and that is oriented horizontally at a same horizonal direction at which the first video camera 161 is oriented; a second illumination unit 162A, that is located adjacent to the second video camera 161, and that is oriented horizontally at a same horizonal direction at which the second video camera 162 is oriented; a third illumination unit 163A, that is located adjacent to the third video camera 163, and that is oriented horizontally at a same horizonal direction at which the third video camera 163 is oriented; a fourth illumination unit 164A, that is located adjacent to the fourth video camera 164, and that is oriented horizontally at a same horizonal direction at which the fourth video camera 161 is oriented; an upwardly-oriented illumination unit 165A, that is located adjacent to the upwardly-oriented video camera 165, and that is oriented vertically and upwardly; a downwardly-oriented illumination unit 166A, that is located adjacent to the downwardly-oriented video camera 166, and that is oriented vertically and downwardly.

In some embodiments, each illumination unit is set to be "on" (activated), as a default state, during all the time that the video camera with which it is associated is active and is capturing live video, and/or during all the time that the self-flying apparatus is flying and/or hovering and/or is performing shaving operations and/or is not parked on a surface. In other embodiments, optionally, an illumination unit may turn itself "off" or deactivate its illumination, in response to a deactivation command from the hardware processor; such as, if the hardware processor 32 detects or determines that a particular video camera is capturing and generating the same, fixed, non-changing, video stream for at least T seconds (e.g., for at least 4 consecutive seconds), such as if the self-flying apparatus is currently hovering steadily in mid-air and performs an active shaving process of the human face at a particular face-region, and therefore it is not required to continuously capture an illuminated video of the ceiling/the ground, and therefore the upwardly-facing/downwardly-facing illumination units may temporarily be turned off.

In some embodiments, optionally, each illumination unit may be associated with a light-level detector/estimator/sensor (e.g., a light sensor that generates an output signal indicating the intensity of light by measuring the radiant energy that exists in a very narrow range of frequencies of visible light or other; or that measures luminous intensity in Candela, or that measures Lux, or that measures luminous flux in Lumen); and that illumination unit may be configured (or commanded) to activate itself and to illuminate only if the associated light-level sensor indicates that it senses a light-level that is below a pre-defined threshold level. Similarly, the illumination unit may be configured (or commanded) to deactivate itself, if the associated light-level sensor indicates that it senses a light-level that is equal to or greater than said pre-defined threshold level. Such configuration may, for example, save energy consumption from the battery 31, by selectively and temporarily turning-off one or more of the illumination units; and/or may reduce glaring light that might be inconvenient to some human users.

In some embodiments, optionally, a particular illumination unit is configured to deactivate itself, if a computer vision analysis of live video, that is captured by the live video camera that is associated with that particular illumination unit, indicates that this particular video camera (and also this illumination unit that is associated with it) is directed precisely towards the eyes of the human being shaved or intended to be shaved (or, in some embodiments, towards the eyes of any human in the vicinity of the self-flying apparatus), and causes visually-recognized inconvenience to such human (e.g., causing the human to blink rapidly, or to close his eyes entirely), and such selective deactivation can reduce to human(s) in the vicinity of the apparatus.

In some embodiments, the apparatus may comprise an Autonomous Flying Command Unit, which may be implemented as part of processor 32 and memory unit 31 or FNC units 35/81/82/83; which may command, initiate, stop, pause and/or modify one or more flying/navigation operations of the apparatus; based on analysis of video and/or data collected from any or some or all of the cameras/sensors of the apparatus; by commanding the apparatus, and particularly the motors or control units that are associated with any of its propelling blade units, to fly (or, to avoid flying) vertically up, vertically down, horizontally left, horizontally right, horizontally forward, horizontally backward, horizontally north, horizontally south, horizontally east, horizontally west, horizontally north-east, horizontally north-west, horizontally south-east, horizontally south east, or along a combined vector from combination of two (non-opposite/non-contradicting) directions from the above (e.g., to fly vertically upwardly and also horizontally left), or along a combined vector from combination of three (non-opposite/non-contradicting) directions from the above (e.g., to fly vertically upwardly and also horizontally left and also horizontally forward); or to stop or pause such flying or movement; or to remain hovering in mid-air without spatial displacement; or to perform said action(s) for a particular time-period (e.g., for 0.5 seconds or for 1 second) and/or at a particular speed (e.g., speed of 0.5 or 1 meters per second); or to land on a generally-flat/generally-stable surface of object (e.g., floor, ground, table, chair); or to take off; or the like.

In some embodiments, the entire operation or activation of the apparatus, or the entire initiation of a self-flying hands-free shaving session, may commence by, for example: having the human user push a physical "on" button on the apparatus, or a physical button of "start now the hands-free shaving process"; which, in turn, causes the apparatus to optionally wait for T seconds (e.g., for three seconds) in order to allow the human to safely move away, and then causes the apparatus to take-off and to start the self-flying hands-free shaving session.

In some embodiments, optionally, the apparatus comprises one or more, or some, or all, of the following components: a GPS unit or a location-finding unit; one or more compass units; one or more gyroscope units; one or more accelerometer units; one or more spatial orientation unis; and/or other sensors or units, which may sense or measure or estimate or measure data that can be used by the processor 32 and/or by any other component of the apparatus, in order to assist or to enable or to improve or to fine-tune or to modify the functionality of such component and/or of other component(s) of the apparatus and/or of the entire apparatus.

For example, data from compass unit(s) of the apparatus may assist the apparatus to determine that it is indeed flying northbound as commanded by processor 32. Data from the gyroscope(s) of the apparatus and/or from spatial orientation sensor(s) of the apparatus may enable the processor to determine that the chassis or housing of the apparatus is generally tilted or slanted or non-horizontal or is non-perpendicular to the ground, and may assist the processor to initiate corrective actions or operations to achieve or to resume a non-tilted/non-slanted position of the apparatus. Data from the GPS unit, or lack of data from the GPS unit, may assist the processor to determine whether the apparatus (and the nearby human/s) is located indoor or outdoor, and may thus assist in determining whether or not there is a ceiling which may block upward flight of the apparatus. Data from the accelerator unit(s) may assist in confirming to the processor whether or not a commanded/intended flight operation is indeed performed as commanded/as intended, or if there are deviations or abnormalities, such as due to malfunction or due to wind/s (e.g., if the apparatus is utilized outdoors, or next to an open window indoors), or may enable the processor to determine or to estimate that the apparatus has crashed into an obstacle; or the like.

In some embodiments, the apparatus includes or utilizes a Telescopic Arm Control Unit, which may be part of the Arm Motor-and-Control Unit 21, and/or which may include an electric motor and an associated controller or processor; and it may be responsible for initiating, starting, stopping, pausing and/or modifying operations that cause the telescopic robotic arm to extend, to retract, to swivel/pivot/rotate/spin, to remain non-moving, to shift its movement or its orientation by N centimeters or by M degrees, or the like; wherein N and M have pre-defined values.

Some embodiments may include or may utilize a Hairy/Non-Hairy (or: Hairy/Smooth) face-region classification unit, or an Already-shaven/Non-shaven face-region classification unit, or other computer vision units or modules that may be pre-programmed and/or trained to classify between such two (or three, or four, or multiple) properties of a face-region; based on reference images, based on computer vision analysis, based on AI/ML/DL/NN engine outputs, or the like. Other classification units may be implemented and used; for example, a Beard recognition unit, a Moustache recognition unit, a stray hair recognition unit, an injury/wound recognition unit (e.g., programmed to recognize that a particular face-region is, or includes, a wound or injury), a scar/mole/pimple recognition unit, or the like. Some embodiments may similarly include a Hair-Density Estimation Unit (e.g., per face-region/per image/per video-frame), and/or a Discrete Hair Counting Unit, which may be configured or programmed or trained to recognize/detect/count discrete hairs or hair-edges, or to estimate a hair density value. Such data may then be utilized by the processor 32 and/or by other component(s) of the apparatus, to improve or modify or enable one or more functionalities of such component(s).

As mentioned above, one or more thermal imagers may be included in the self-flying apparatus. For demonstrative purposes, some of the drawings show four thermal imagers, which may be oriented or directed generally horizontally, or generally perpendicularly relative to the elongated central pole; however, other numbers of thermal imagers may be used, optionally also including an upwardly-facing thermal imager and a downwardly-facing thermal imager, and/or other directional thermal imagers. The thermal imagery data from such thermal imagers may then be utilized by the processor 32 and/or by other component(s) of the self-flying apparatus, to improve or modify or enable one or more functionalities of such component(s) or the flight of the apparatus or the shaving operations of the apparatus.

The apparatus may include a Timing Unit and/or a Real-Time Clock (RTC) Unit, which may perform time-related operations; for example, to measure elapsed time, to measure the time that is allocated for a particular operation, to start a time-counting process and to generate a signal when a time-counting process has reached a particular pre-defined value of T seconds, or to otherwise provide timing data or time-based data or elapsed-time data to processor 32 and/or to other components of the apparatus, and such time-related data may be utilized to start or stop or pause or modify one or more operations.

In some embodiments, the apparatus may include or may comprise one or more rods, brackets, holding brackets, mounting brackets, screws, connectors, bonding elements, gluing elements, or other mechanical holding/mounting units; which may hold one or more of the components of the apparatus. For example, a video camera of the apparatus (or a thermal imager; or a LIDAR sensor; or a non-LIDAR distance sensor; or an illumination unit; or a thermal imager; or other component of the apparatus) may be fixedly attached directly to the chassis or the central pole; or may be attached to a mounting bracket or mounting rod, which in turn is attached to the chassis or the central pole. Each such rod/bracket/mounting element/holding element may be specifically placed, slanted, tilted, affixed, connected and/or mounted, at a particular pre-defined orientation/direction/slanting/angle, to enable a particular functionality or field-of-view to that mounted component, and/or to avoid obstruction of field-of-view (as much as possible) by one component towards a camera/imager/sensor, and/or to avoid disruption or collision of functionalities (e.g., ensuring that a mounting bracket does not block the free movement or the desired movement of the telescopic arm; or ensuring that a mounting bracket and the component mounted thereon do not disrupt the propelling of a propelling blade; or the like).

In some embodiments, optionally, one or more components that are shown as being connected or affixed to (or mounted on) a first region or sub-system of the apparatus (e.g., the chassis; the central pole; the telescopic arm; the electric shaver), may actually be implemented as being affixed to (or mounted on) another suitable region or sub-system of the apparatus. For example, in some embodiments, one or more video cameras of the apparatus, which are depicted in some drawings as being connected to the central pole, may be connected (instead, or in addition) to the chassis, or to the telescopic arm, or the shaving unit. Similarly, one or more thermal imagers, or LIDAR sensors, or illumination units, or non-LIDAR sensors, or other components, may be connected or affixed to the chassis or the central pole or the telescopic arm or the electric shaver, even if the drawing/s show a different connection point for demonstrative purposes; as long as such modified place/point of connection does not obstruct a field-of-view of that component, or of another component, and does not disrupt the functionality of other component(s) of the apparatus (e.g., the different connection point should not cause a video camera to be in the way of a propelling blade; and should not cause the propelling blade to obstruct, at all or to a majority thereof, the field-of-view that is captured by that camera).

For demonstrative purposes, some of the drawings may depict transport tube(s) or pipe(s) or conduits, such as transport tube 28, or other wires or rods or brackets or mounting elements; however, such depiction is only demonstrative, and actual implementations may ensure that such tubes or rods or brackets or mounting elements or similar components do not block or disrupt the movement and/or the functionality of one or more other components.

For example, transport tube/s that can transport soothing liquid/after-shave liquid/soothing powder/talc powder/water, can be mounted and secured such that they may be (for example) running along or in parallel to the telescopic arm, and/or such that they do not obstruct or limit or block the movement/extension/retraction/pivoting/swiveling of the telescopic arm. Optionally, in some embodiments, one or more components or storage chambers or storage compartments or reservoirs, may be located internally within the telescopic arm (e.g., instead of being located in the central pole); or may be located or mounted externally on the telescopic arm; or may be located or mounted externally on the central pole (and not internally therein); or may otherwise be placed or located at a particular point or area of the apparatus in order to ensure non-obstructed/non-disrupted functionality of one or more other components of the apparatus.

In some embodiments, all of the processing/analysis/computation operations, are performed internally/integrally within the self-flying apparatus itself; without requiring the self-flying apparatus to communicate, over any wireless/cellular communication link, with any remote server and/or with any remote/external processing unit or computer or any "remote control unit"; and without requiring the self-flying apparatus to upload or transmit data and/or telemetric data and/or video data and/or images to any such remote/external processing unit or computer; thus enabling local, secure, rapid, in-device processing and analysis, and/or improving security since no data/no video is transmitted over any wireless communication link or network to any remote (or nearby) recipient and thus no data/no video is vulnerable for attack or capture by a listener or an attacker; and/or improving vulnerability of the apparatus to cyber-attacks, which are often facilitated via the wireless/cellular connectivity of an electronic device; and/or also reducing the form-factor/weight/volume/energy consumption of the self-flying apparatus, as it does not require to include a wireless/cellular transceiver.

In other embodiments, optionally, one or more processing/analysis/computation operations, may be performed at least partially by: wirelessly transmitting/uploading data/telemetry data/video data from the self-flying apparatus to a nearby/remote computing device or server or processing unit; which in turn performs those processing/analysis/computation operations, and sends back analysis results and/or operational commands to the self-flying apparatus over such wireless communication link/network, such as Wi-Fi and/or cellular link(s); thereby reducing the processing power and/or memory resources required to be deployed at the self-flying apparatus itself; and possibly utilizing a secure communication link (e.g., HTTPS, or SSL-TLS) for encrypted/secure communication.

Some embodiments of the present invention may be implemented to shave—instead of a face of a human—other body-part(s) of a human; for example, legs of a male or female human, armpit(s), arm(s), chest, and/or other body parts; by implementing the appropriate modifications to the self-flying apparatus. For example, the telescopic arm may be longer (e.g., may be able to extend to a maximum length of 100 centimeters), to enable safe and effective access to the legs of a human without being too close to the ground; the computer vision analysis unit and/or the hardware processor may be configured or programmed to perform analysis that searches for and/or that recognizes legs or leg-portions (or armpits, or chest), or that classifies or recognizes such leg-portions (or such other body-parts) as already-shaven or smooth or non-shaven or hairy, or to similarly classify armpits or other body organs as hairy or smooth; the angel of approach to such body parts may be adjusted, for example, the self-flying apparatus may fly and may then hover at approximately the vertical plane in which the human's stomach is located, and the robotic telescopic arm may then extend diagonally and upwardly in order to effectively reach an armpit from below for the purpose of shaving the armpit; or, the human user may be required to lay down on a bed or sofa, enabling him to lie down and relax and/or to read a newspaper or magazine with his two hands, while his fully-extended legs are being shaved by the self-flying apparatus; or allowing the human to sit or lie on a chair or a sofa or a "chaise lounge" or a "lounger" furniture item, and to play a video game with two hands handling the gaming controller, while his legs are being shaved; or the like.

Some embodiments of the present invention may be implemented to shave—instead of a face of a human—one or more body-part(s) of a non-human animals; for example, a body or a body-portion of a dog or a sheep; by implementing the appropriate modifications to the self-flying apparatus. For example, the telescopic arm may be longer (e.g., may be able to extend to a maximum length of 100 centimeters), to enable safe and effective access to the non-human animal without being too close to the ground; the computer vision analysis unit and/or the hardware processor may be configured or programmed to perform analysis that searches for and/or that recognizes one or more body-parts of that particular type of non-human animal, or that classifies or recognizes such body-portions of the non-human animal as already-shaven or smooth or non-shaven or hairy, or to similarly classify body organs as hairy or smooth; the angel of approach to such body-parts of the non-human animal may be adjusted, for example, the self-flying apparatus may fly and may then hover at approximately the vertical plane in which the animal's stomach is located, and the robotic telescopic arm may then extend diagonally (e.g., upwardly, and later downwardly, and optionally later also horizontally) in order to effectively reach the various regions of that body part of the animal for the purpose of shaving it; or, a human owner of the animal may be requested to have the animal lie down as flat as possible while the animal is being shaved by the self-flying apparatus. In some embodiments, the self-flying apparatus may be configured or adjusted or modified, to avoid performing a full-shaving/clean-shaving process on a body of a non-human animal; but rather, to perform only partial or light shaving or hair trimming, in order to partially alleviate heat that the non-human animal may have in hot weather or in the summer, while still keeping its fur or hair generally existing; and may be configured to ensure that the shaving process of the non-human animal does not create and does not leave "entirely bare" patches, and still maintains some fur protection to the animal.

In some embodiments, the entire footprint of the self-flying apparatus may be smaller than 90 by 90 centimeters; or may be smaller than 80 by 80 centimeters; or may be smaller than 70 by 70 centimeters; or may be smaller than 60 by 60 centimeters; or may be smaller than 50 by 50 centimeters; or may be smaller than 40 by 40 centimeters. Such form-factor may enable the apparatus to be efficiently portable by a human and to be generally light-weight, and may even allow a user to take the entire self-flying apparatus with him when going on a trip or on vacation.

In some embodiments, the terms "horizontally-propelling blade" or "generally-horizontal propelling blade" or "generally-horizontal revolving blade" or "horizontally-revolving blade", mean or include: one or more blades that are capable or configured or oriented or mounted to revolve or to propel or to spin within a generally-horizontal circular area or plane that is generally parallel to the ground or the floor; and includes also such blade when it revolving/spinning/propelling state, as well as such blade when it is not yet revolving/spinning/propelling.

In some embodiments, the terms "vertically-propelling blade" or "generally-vertical propelling blade" or "generally-vertical revolving blade" or "vertically-revolving blade", mean or include: one or more blades that are capable or configured or oriented or mounted to revolve or to propel or to spin within a generally-vertical circular area or plane that is generally perpendicular to the ground or the floor; and includes also such blade when it revolving/spinning/propelling state, as well as such blade when it is not yet revolving/spinning/propelling.

The term "propelling" may include, or may mean: revolving, turning, spinning, or rotating.

It is noted that the drawings are not necessarily drawn to scale; and some components are exaggeratedly small or exaggeratedly large, and are not necessarily shown with their real-life proportions. For example, in some embodiments, the telescopic arm may be able to extend to a distance of 50 or 80 or 100 or even 120 or 150 centimeters; whereas, the general footprint of the housing/chassis (e.g., the area of the top-side panel or the bottom-side panel of the housing/chassis) may be 40×40 centimeters or may be 50×50 centimeters. Similarly, for example, the central pole may be longer shorter than its depicted example, and/or may be thinner or thicker than its depicted example. Similarly, the housing/chassis may be thinner that depicted, and may even comprise (in some embodiments) a plate or a tray on which components can be arranged or mounted, or a thin box having a vertical height that is not more than 25 percent of its horizontal length. Other proportions or dimensions may be used.

Some embodiments provide a self-flying hands-free shaving apparatus, which comprises the following components and features: (A) a hardware processor, configured to execute code; a memory unit, configured to store code and configured to store data; an electric battery, to provide electric power to one or more components of said apparatus; (B) a box-shaped housing, having four side-panels and a bottom-side panel and a top-side panel.

In some embodiments, the apparatus comprises: (C) a first horizontally-propelling blade, connected over a first top-side corner of the housing, and configured to propel within a horizontal plane that is generally perpendicular to the ground; a second horizontally-propelling blade, connected over a second top-side corner of the housing, and configured to propel within said horizontal plane that is generally perpendicular to the ground; a third horizontally-propelling blade, connected over a third top-side corner of the housing, and configured to propel within said horizontal plane that is generally perpendicular to the ground; a fourth horizontally-propelling blade, connected over a fourth top-side corner of the housing, and configured to propel within said horizontal plane that is generally perpendicular to the ground.

In some embodiments, the apparatus comprises: (D) one or more electric motors, that are configured to cause, based on flight commands from the hardware processor, rotation of one or more of: the first horizontally-propelling blade, the second horizontally-propelling blade, the third horizontally-propelling blade, and the fourth horizontally-propelling blade.

In some embodiments, the hardware processor is configured to control and to modify a rotation speed of the first horizontally-propelling blade, the second horizontally-propelling blade, the third horizontally-propelling blade, and the fourth horizontally-propelling blade; by selecting a particular blade-rotation speed that is one of at least three pre-configured rotation speeds that comprise: (i) a high rotation speed, that causes said apparatus to fly vertically and upwardly, (ii) a medium rotation speed, that causes said apparatus to hover without moving vertically upwardly and without moving vertically downwardly, (iii) a low rotation speed, that causes said apparatus to fly vertically and downwardly.

In some embodiments, processor-controlled rotation of the first horizontally-propelling blade, the second horizontally-propelling blade, the third horizontally-propelling blade, and the fourth horizontally-propelling blade, causes said apparatus to perform one or more of three flight operations that include: (i) flying vertically and upwardly along a Z axis that is generally perpendicular to the ground, (ii) hovering vertically without moving upwardly and without moving vertically downwardly, (iii) flying vertically and downwardly along the Z axis that is generally perpendicular to the ground.

In some embodiments, the apparatus comprises: (G) a first vertically-propelling blade, that is connected externally to the first side-panel of the housing, and that is configured to propel within a first vertical plane that is generally perpendicular to the ground; a second vertically-propelling blade, that is connected externally to the second side-panel of the housing, and that is configured to propel within a second vertical plane that is generally perpendicular to the ground; a third vertically-propelling blade, that is connected externally to the third side-panel of the housing, and that is configured to propel within a third vertical plane that is generally perpendicular to the ground; a fourth vertically-propelling blade, that is connected externally to the fourth side-panel of the housing, and that is configured to propel within a fourth vertical plane that is generally perpendicular to the ground. The first vertical plane is generally parallel to the third vertical plane; the second vertical plane is generally parallel to the fourth vertical plane; the first vertical plane is generally parallel to the second vertical plane. The one or more electric motors are configured to cause, based on flight commands from the hardware processor, rotation of one or more of: the first vertically-propelling blade, the second vertically-propelling blade, the third vertically-propelling blade, the fourth vertically-propelling blade.

In some embodiments, (H) the hardware processor is configured to cause horizontal flight of said apparatus by selectively causing one of the following components to vertically propel: the first vertically-propelling blade, the second vertically-propelling blade, the third vertically-propelling blade, the fourth vertically-propelling blade. Vertical propelling of the first vertically-propelling blade, generates a first force that pushes said apparatus horizontally in a first horizontal direction. Vertical propelling of the second vertically-propelling blade, generates a second force that pushes said apparatus horizontally in a second direction that is generally perpendicular to the first direction. Vertical propelling of the third vertically-propelling blade, generates a third force that pushes said apparatus horizontally in a third direction that is generally perpendicular to the second direction and that is generally opposite to the first horizontal direction. Vertical propelling of the fourth vertically-propelling blade, generates a fourth force that pushes said apparatus horizontally in a fourth direction that is generally perpendicular to the third direction and that is generally opposite to the second horizontal direction.

In some embodiments, the apparatus comprises: (I) a partially-hollow central pole, that is connected generally vertically beneath a central point of the bottom-side panel of the housing.

In some embodiments, the apparatus comprises: (J) four video cameras, affixed to the central pole; wherein the four video cameras comprise: a first video camera that is oriented horizontally and captures video having a first field-of-view; a second video camera that is oriented horizontally at a 90-degree angle relative to orientation direction of the first video camera 161, and that captures video having a second field-of-view; a third video camera that is oriented horizontally at a 90-degree angle relative to orientation direction of the second video camera, and that captures video having a third field-of-view; a fourth video camera that is oriented horizontally at a 90-degree angle relative to orientation direction of the third video camera, and that captures video having a fourth field-of-view.

In some embodiments, the first field-of-view of the first video camera, and the second field-of-view of the second video camera, are partially overlapping; the second field-of-view of the second video camera, and the third field-of-view of the third video camera, are partially overlapping; the third field-of-view of the third video camera, and the fourth field-of-view of the fourth video camera, are partially overlapping; the fourth field-of-view of the fourth video camera, and the first field-of-view of the first video camera, are partially overlapping; the first field-of-view of the first video camera, is generally opposite to the third field-of-view of the third video camera; the second field-of-view of the second video camera, is generally opposite to the fourth field-of-view of the fourth video camera.

In some embodiments, the apparatus comprises: (K) an upwardly-oriented video camera, that is oriented vertically and upwardly, and captures video having a fifth field-of-view that is generally perpendicular to the first and second and third and fourth fields-of-view; and also, a downwardly-oriented video camera, that is oriented vertically and downwardly, and captures video having a sixth field-of-view that is generally perpendicular to the first and second and third and fourth fields-of-view. The fifth field-of-view of the upwardly-oriented video camera, is generally opposite to the sixth field-of-view of the downwardly-oriented video camera.

In some embodiments, the apparatus comprises: a computer vision analysis unit, configured to perform real-time computer vision analysis of: (i) live video captured by the first video camera, and (ii) live video captured by the second video camera, and (iii) live video captured by the third video camera, and (iv) live video captured by the fourth video camera, and (v) live video captured by the upwardly-oriented video camera, and (vi) live video captured by the downwardly-oriented video camera. In some embodiments, optionally, live video may include recently-captured/recently-recorded video, such as, for example, video that was captured or recorded just P milliseconds before it is processed or analyzed, wherein P is a value in a range of 1 millisecond to 2 seconds; and in some embodiments, the self-flying apparatus may be configured (optionally) to remain hovering steadily while video processing is performed, and to fly or change is spatial location only once the processing or the computer vision analysis of recently-captured video (or frame/s) is completed.

In some embodiments, the apparatus comprises: (M) a reference-image storage unit, configured to store one or more reference-images of a face of a particular human that is intended to be autonomously shaved by said apparatus. In some embodiments, the computer vision analysis unit is configured to recognize and to detect, in one or more live videos that are analyzes, at least: (i) the face of said particular human that is intended to be autonomously shaved by said apparatus, and also (ii) faces of one or more other humans that are present in a vicinity of said apparatus, and also (iii) the ground, and also (iv) one or more inanimate objects that are present in a vicinity of the apparatus and that said apparatus is configured to avoid crashing into.

In some embodiments, (N) the computer vision analysis unit is configured to dynamically determine, based on computer vision analysis of live video streams, at least: (a) an X-axis horizontal displacement that is required for said apparatus to fly along the X-axis in order to be able to shave hair that is on the face of said particular human, and (b) a Y-axis horizontal displacement that is required for said apparatus to move along the Y-axis in order to be able to shave hair that is on the face of said particular human, and (c) a Z-axis horizontal displacement that is required for said apparatus to move along the Z-axis in order to be able to shave hair that is on the face of said particular human.

In some embodiments, (O) computer vision analysis results, that are dynamically generated by the computer vision analysis unit based on real-time video analysis, are utilized by the hardware processor to selectively control rotation speed of at least one of: the first vertically-propelling blade, the second vertically-propelling blade, the third vertically-propelling blade, the fourth vertically-propelling blade, the first horizontally-propelling blade, the second horizontally-propelling blade, the third horizontally-propelling blade, the fourth horizontally-propelling blade.

In some embodiments, (P) the hardware processor, based on computer vision analysis results, is configured to cause said apparatus to autonomously fly to a vicinity of said particular user, and to cause said apparatus to remain hovering at a particular spatial region having a particular distance from said particular user, and to continuously hover in air while remaining at said particular spatial region.

In some embodiments, the apparatus comprises: (Q) a cordless electric shaver, comprising one or more shaving blades; wherein the electric shaver is connected to a telescopic arm that is located downwardly relative to the central pole. The telescopic arm is configured to pivot, as well as to extend and retract, via an Arm Motor-and-Control Unit that is connected beneath the central pole. The Arm Motor-and-Control Unit selectively causes the telescopic arm to extend, to retract, or to pivot. The hardware processor, based on the computer vision analysis results, is configured to cause the Arm Motor-and-Control Unit to selectively pivot, and to selectively extend or retract, the telescopic arm, to enable the telescopic arm to be at a particular spatial area that causes the electric shaver to touch the face of said particular human and to autonomously perform a shaving operation on the face of said particular human. The electric shaver has a front side, through which the shaving blades perform shaving operations of facial hair.

In some embodiments, the apparatus comprises: (S1) a first precise-shaving assistive video camera, that is fixedly attached at a first side of said electric shaver, and that is oriented to capture live video of a first region which is generally in front and to the right of said front side of the electric shaver; (S2) a second precise-shaving assistive video camera, that is fixedly attached at a second side of said electric shaver, and that is oriented to capture live video of a second region which is generally in front and beneath said front side of the electric shaver; (S3) a third precise-shaving assistive video camera, that is fixedly attached at a third side of said electric shaver, and that is oriented to capture live video of a third region which is generally in front and to the left of said front side of the electric shaver; (S4) a fourth precise-shaving assistive video camera, that is fixedly attached at a fourth side of said electric shaver, and that is oriented to capture live video of a fourth region which is generally in front and above said front side of the electric shaver.

In some embodiments, (T) the computer vision analysis unit is configured to perform real-time computer vision analysis of video captured by first precise-shaving assistive video camera and the second precise-shaving assistive video camera and the third precise-shaving assistive video camera and by the fourth precise-shaving assistive video camera; and is further configured to generate determinations with regard to: (i) which facial regions of said particular human require shaving operations, and (ii) which facial regions of said particular human do not require shaving operations.

In some embodiments, the front side of the electric shaver has a tactile sensor, configured to detect whether or not the tactile sensor is touching a target, and configured to generate a touch-detection signal that indicates that the tactile sensor is currently in touch with the target. The tactile sensor comprises a pressure-actuated electric contact that, upon application by a touch-based pressure thereon, causes an electric circuit to close and to output said touch-detection signal. The hardware processor is configured to process output from the tactile sensor, as part of processing operations that the hardware processor performs to command said apparatus to fly upwardly or to fly downwardly or to fly horizontally at a particular horizontal direction or to hover in air.

In some embodiments. (V) if the hardware processor determines that three conditions hold true, wherein the three conditions are: (I) computer vision analysis of live video from the first video camera and the second video camera and the third video camera and the fourth video camera and the upwardly-oriented video camera and the downwardly-oriented video camera, indicates that said apparatus is at a first distance D1 from the face of said particular human, and further indicates that the front-side of the electric shaver is located at a second distance D2 from the face of said particular user, wherein the first distance D1 is within a first pre-defined range of distance values; wherein the second distance D2 is within a second pre-defined range of distance values; (II) the touch-detection signal from the tactile sensor indicates that the electric shaver is currently touching the face of said particular user; (III) computer vision analysis of live video from the first precise-shaving assistive video camera and the second precise-shaving assistive video camera and the third precise-shaving assistive video camera and the fourth precise-shaving assistive video camera, also indicates that said apparatus is at the first distance D1 from the face of said particular human, and also indicates that the front-side of the electric shaver is located at the second distance D2 from the face of said particular user; then, the hardware processor determines that an active shaving operation is being performed, and the hardware processor commands said apparatus to hover in air for a particular time-period of T1 seconds to enable continuous shaving, wherein T1 is a pre-defined value in a range of 5 to 15 seconds; and once said particular time period of T1 seconds elapses, the hardware processor generates commands that cause the electric shaver to relocate to a nearby face-region by performing at least one of: (i) commanding the apparatus to fly along the X-axis to obtain an X-axis displacement, (ii) commanding the apparatus to fly along the Y-axis to obtain a Y-axis displacement, (iii) commanding the apparatus to fly along the Z-axis to obtain a Z-axis displacement, (iv) commanding the telescopic arm to pivot, (v) commanding the telescopic arm to extend, (vi) commanding the telescopic arm to retract.

In some embodiments, the hardware processor, based on the computer vision analysis results, is further configured to distinguish between: (i) a first face-region that is hairy or is covered with beard hair, and (ii) a second face-region that is smooth or is free of beard hair. The hardware processor, based on the computer vision analysis results, is further configured: (a) to cause said apparatus to fly to a vicinity of the first face-region, and to cause the telescopic arm and the electric shaver to approach the first face-region; and (b) to cause said apparatus to avoid flying to the vicinity of the second face-region, and to cause the telescopic arm and the electric shaver to avoid approaching the second face-region.

In some embodiments, the hardware processor, based on the computer vision analysis results, is further configured to cause the Arm Motor-and-Control Unit to selectively pivot, and to selectively extend or retract, the telescopic arm, to enable the telescopic arm to move from (i) being closest to the second face-region that is free of beard hair, to (ii) being closes to the first face-region that is covered with beard hair.

In some embodiments, the hardware processor, based on the computer vision analysis results, is further configured to count hairs that appear in live videos that are captured by one or more of the video cameras of said apparatus; and to estimate a hair-density value for different regions of the face of said particular human. The hardware processor, based on the computer vision analysis results, is further configured to cause said Arm Motor-and-Control Unit to selectively pivot, and to selectively extend or retract, said telescopic arm, to cause said telescopic arm to move from (i) a first particular face-region that has a first hair-density value, to (ii) a second particular face-region that has a second, greater, hair-density value.

In some embodiments, the hardware processor is configured to cause movement of the electric shaver, from the first particular face-region to the second particular face-region, only if the second hair-density value is at least three times the first hair-density value, to prevent back-and-forth movement of the electric shaver between two face-regions having sufficiently similar hair-density values, and to reduce motion of the telescopic arm, and to reduce flying movements of said apparatus.

In some embodiments, the apparatus comprises: a set of one or more thermal imagers, mounted on the central pole or the housing; wherein the one or more thermal imagers are configured to perform thermal imaging of a surrounding of the apparatus. The hardware processor is configured to perform liveliness detection, based on a combination of (i) analysis of thermal images captured by the one or more thermal imagers and (ii) computer vision analysis of live video from video cameras of said apparatus. The hardware processor is configured to determine whether a face that is captured in one or more of the live videos corresponds to (i) a living human or to (ii) a non-living painting or photograph of a human. A liveliness detection result, that is generated by the hardware processor, is then further utilized by the hardware processor to command the apparatus to fly towards a first target that the hardware processor determined to be a living human, and to fly away from a second target that the hardware processor determined to be a non-living painting or photograph of a human.

In some embodiments, the apparatus comprises: a set of six LIDAR sensors, that are mounted on the central pole or the housing; wherein the set of six LIDAR sensors comprise: (a) an upwardly-oriented LIDAR sensor, configured to measure a first vertical distance towards a ceiling; (b) a downwardly-oriented LIDAR sensor, configured to measure a second vertical distance towards the ground; (c) a first horizontally-oriented LIDAR sensor, configured to measure a first horizontal distance towards one or objects along an X-axis at a first horizontal direction; (d) a second horizontally-oriented LIDAR sensor, configured to measure a second horizontal distance towards one or objects along a Y-axis at a second horizontal direction that is generally perpendicular to said first horizontal direction; (e) a third horizontally-oriented LIDAR sensor, configured to measure a third horizontal distance towards one or objects along said X-axis at a third horizontal direction that is generally perpendicular to said second horizontal direction; (f) a fourth horizontally-oriented LIDAR sensor, configured to measure a fourth horizontal distance towards one or objects along said Y-axis at a fourth horizontal direction that is generally perpendicular to said second horizontal direction. Real-time/live LIDAR-sensed data, from each LIDAR sensor of the set of six LIDAR sensors, is fed into the hardware processor, and is utilized by the hardware processor to adjust autonomous flying of said apparatus, based on one or more pre-defined rules that define at least: (i) a first minimum distance that said apparatus should keep from the ground, and (b) a second minimum distance that said apparatus should keep from the ceiling, and (c) a third minimum distance that said apparatus should keep from any human, and (d) a fourth minimum distance that said apparatus should keep from any non-human object. The minimum/ maximum values may be pre-defined values or may be hard-coded, or may be defined as values that must be within a pre-defined range of acceptable values.

In some embodiments, the apparatus comprises: (a) a Z-axis flight navigation and control unit, configured to selectively cause said apparatus to fly upwardly or to fly downwardly along a Z-axis or to hover in a vertically-fixed elevation level, based on data that the hardware processor generates and that takes into account at least: (i) computer-vision analysis results of live video from the video cameras of the apparatus, and (ii) LIDAR-sensed data from the LIDAR sensors of the apparatus, and (iii) thermal imagery data from the one or more thermal imagers of the apparatus.

In some embodiments, the apparatus comprises: (b) an X-axis flight navigation and control unit, configured to cause said apparatus to fly forward or backward along a horizontal X axis or to maintain a fixed position along said horizontal X axis, based on data that the hardware processor generates and that takes into account at least: (i) computer-vision analysis results of live video from the video cameras of the apparatus, and (ii) LIDAR-sensed data from the LIDAR sensors of the apparatus, and (iii) thermal imagery data from the one or more thermal imagers of the apparatus.

In some embodiments, the apparatus comprises: (c) a Y-axis flight navigation and control unit, configured to cause said apparatus to fly forward or backward along a horizontal Y axis or to maintain a fixed position along said horizontal Y axis, based on data that the hardware processor generates and that takes into account at least: (i) computer-vision analysis results of live video from the video cameras of the apparatus, and (ii) LIDAR-sensed data from the LIDAR sensors of the apparatus, and (iii) thermal imagery data from the one or more thermal imagers of the apparatus. Said Z-axis is generally perpendicular to the ground; said Y-axis is generally horizontal and is generally parallel to the ground; said X-axis is generally horizontal and is generally parallel to the ground; said Y-axis is generally perpendicular to said X-axis.

In some embodiments, the apparatus comprises: (a) a post-shaving soothing liquid storage compartment, configured to store therein a particular post-shaving soothing liquid that is selected from the group consisting of: a liquid perfume, a liquid after-shave; (b) a post-shaving soothing liquid spray-head unit, that is connected via a post-shaving soothing liquid transport tube to said post-shaving soothing liquid storage compartment; wherein the post-shaving soothing liquid spray-head unit, upon being actuated, is configured to pump out and to spray a portion of said particular post-shaving soothing liquid; (c) a post-shaving soothing liquid spray-head orientation unit, configured to determine a spatial direction to which said post-shaving soothing liquid spray-head unit should be oriented, in order for said post-shaving soothing liquid spray-head unit to be capable of spraying said particular post-shaving soothing liquid towards said face of said particular human; wherein, based on a determination of said spatial orientation by the spray-head orientation unit, the hardware processor commands at least one set of the horizontally-propelling blades to modify its horizontal propelling velocity, and causes said apparatus to revolve while hovering in air, and causes said post-shaving soothing liquid spray-head unit to be oriented towards the face of said particular human; (d) a post-shaving soothing liquid spray-head actuator unit, configured to actuate the post-shaving soothing liquid spray-head unit to spray out at least one portion of said particular post-shaving soothing liquid, towards the face of said particular human, upon a determination by said hardware processor that an autonomous shaving process is complete; wherein said determination is reached based on computer vision analysis of live video that depicts the face of said particular human and that indicates that no more shaving operations are required to make said face smooth or hair-free; (c) an audio output unit associated with an audio speaker, wherein the audio output unit is an integral part of said apparatus, wherein the audio output unit is configured to generate an audible pre-recorded Post-Shaving Soothing Liquid Spray Alert message, that indicates verbally that a post-shaving soothing liquid spraying process is about to be performed, at a time-point that is T2 seconds prior to actuation of said spray-head unit; wherein T2 is a pre-defined value in a range of 1 to 5 seconds.

In some embodiments, the post-shaving soothing liquid storage compartment is an internal storage compartment that is enclosed entirely within the central pole of the apparatus; wherein the post-shaving soothing liquid storage compartment is one of: (i) a removable and replaceable compartment that can be removed and replaced when the apparatus is parked; (ii) a refillable compartment that can be refilled when the apparatus is parked.

In some embodiments, the apparatus comprises: (a) a powder storage compartment, configured to store therein a particular powder that is selected from the group consisting of: baby powder, talc; (b) a powder transport tube, which traverses through said powder storage compartment; wherein the powder transport tube has a first opening and a second opening; (c) an elastic silicon airbag (or blowing unit) having a single opening, wherein the single opening of the elastic silicon airbag is connected to the first opening of the powder transport tube; (d) a powder ejector (or powder discharge) nozzle (or outlet), which is located or connected at the second opening of the powder transport tube; wherein, in response to a squeezing force that is applied thereon by a squeezing unit, the elastic silicon airbag temporarily squeezes and blows air outwardly from the elastic silicon airbag and into the first opening of the powder transport tube, and causes said air to pass through a region of said powder storage compartment and to pick up and carry a portion of said particular powder, and further causes said air to transport said portion of the particular powder towards and through the second opening of the powder transport tube and then through the powder ejector nozzle outwardly away from the powder ejector nozzle towards the face of said particular human; (e) a powder spray actuator unit, configured to generate a temporary squeezing force towards said elastic silicon airbag, in response to a command from the hardware processor to perform a powder spray operation; wherein the hardware processor is configured to determine that the autonomous shaving process is complete, based on computer vision analysis of live video from the video cameras of the apparatus that depict the face of said particular human and that indicate that no more shaving operations are required; wherein the hardware processor is configured to determine that said apparatus is pre-programmed or pre-configured to initiate an autonomous powder spray process upon completion of an autonomous shaving process, based on a position of a mechanical toggle switch that said human can toggle in advance when the apparatus is parked; (f) wherein said audio output unit is configured to generate an audible pre-recorded Powder Spray Alert message, that indicates verbally that a powder spraying process is about to be performed, at a time-point that is T3 seconds prior to actuation of said powder spray actuator unit, wherein T3 is a pre-defined value in a range of 1 second to 5 seconds.

In some embodiments, said powder storage compartment is an internal storage compartment that is enclosed entirely within the central pole of the apparatus; wherein the powder storage compartment is one of: (i) a removable and replaceable powder storage compartment that can be removed and replaced when the apparatus is parked; (ii) a refillable powder storage compartment that can be refilled when the apparatus is parked.

In some embodiments, the apparatus comprises: (a) a shaving cream storage compartment, configured to store therein a particular shaving cream that is selected from the group consisting of: an aerosol shaving cream, a gel-based shaving cream, a soap-based shaving cream, a foamed shaving cream; (b) a shaving cream spray-head unit, that is connected via a shaving cream transport tube to said shaving cream storage compartment; wherein the shaving cream spray-head unit, upon being actuated, is configured to pump out and to spray a portion of said particular shaving cream towards the face of said particular human; (c) a shaving cream spray-head orientation unit, configured to determine a spatial direction to which said shaving cream spray-head unit should be oriented, in order for said shaving cream spray-head unit to be capable of spraying said particular shaving cream towards said face of said particular human; wherein, based on a determination of said spatial orientation by the shaving cream spray-head orientation unit, the hardware processor commands at least one set of the propelling blades of the apparatus to modify its propelling velocity, and causes said apparatus to revolve while hovering in air, and causes said shaving cream spray-head unit to be oriented towards said face of said particular human; (d) a shaving cream spray-head actuator unit, configured to actuate the shaving cream spray-head unit to spray out at least one portion of said particular shaving cream, towards the face of said particular human, upon a determination by the hardware processor that an autonomous shaving process is ready to commence, and prior to commencement of the autonomous shaving process, based on computer vision analysis of live video from the video cameras of the apparatus that depict the face of said particular human and that indicate that shaving operations are required to commence; (e) wherein the audio output unit is configured to generate an audible pre-recorded Shaving Cream Spray Alert message, that indicates verbally that a shaving cream spraying process is about to be performed, at a time-point that is T4 seconds prior to actuation of said shaving cream spray-head unit; wherein T4 is a pre-defined value in a range of 1 second to 5 seconds.

In some embodiments, said shaving cream storage compartment is an internal storage compartment that is enclosed entirely within the central pole of the apparatus; wherein the shaving cream storage compartment is one of: (i) a removable and replaceable shaving cream storage compartment that can be removed and replaced when the apparatus is parked; (ii) a refillable shaving cream storage compartment that can be refilled when the apparatus is parked.

In some embodiments, the apparatus comprises: (a) an acoustic microphone, configured to capture audio from a surrounding of said apparatus; (b) an Automatic Speech Recognition (ASR) unit, configured to perform an Automatic Speech Recognition (ASR) process on audio captured by the acoustic microphone, and to generate therefrom a textual transcript. In some embodiments, the apparatus comprises: (c) a speech analysis unit, configured to perform textual analysis and contextual analysis on said textual transcript, and to recognize a particular shaving-related command that was uttered and is represented in said textual transcript; wherein the speech analysis unit is specifically configured to search for, and to recognize, at least: (c1) a first verbal utterance indicating a first user-command to avoid shaving of a particular face-region; and (c2) a first verbal utterance indicating a second user-command to repeat shaving of an already-shaved particular face-region. In some embodiments. (d) the hardware processor is configured: (d1) to command the apparatus to avoid shaving said particular face-region, if said first verbal utterance was recognized by the speech analysis unit; (d2) to command the apparatus to repeat, for at least T5 seconds, autonomous shaving of said already-shaved particular face region, if said second verbal utterance was recognized by the speech analysis unit; wherein T5 is a pre-defined value in a range of 3 to 15 seconds.

In some embodiments, the apparatus comprises: (a) a water reservoir to store therein water; wherein the water reservoir is an internal storage compartment that is enclosed entirely within the central pole of the apparatus; wherein the water reservoir is one of: (i) a removable and replaceable water reservoir that can be removed and replaced when the apparatus is parked; (ii) a refillable water reservoir that can be refilled when the apparatus is parked. In some embodiments, the apparatus comprises: (b) a water spraying unit, that is connected via a water-transport tube to said water reservoir; wherein the water spraying unit, upon being actuated, is configured (i) to pump out a particular volume of water via said water-transport tube from said water reservoir, and (ii) to spray out said particular volume of water at an outwardly direction away from said apparatus. In some embodiments, the apparatus comprises: (c) a water spraying orientation unit, configured to determine a spatial direction to which said water spraying unit should be oriented, in order for said water spraying unit to be capable of spraying water towards the face of said particular human; wherein, based on a determination of said spatial orientation by the water spraying orientation unit, the hardware processor commands at least one of the propelling blades of the apparatus to modify its propelling velocity, and causes the apparatus to revolve while hovering in air, and causes the water spraying unit to be oriented towards the face of said particular human. In some embodiments, the apparatus comprises: (d) a water spraying actuator unit, configured to actuate the water spraying unit to spray out water towards the face of said particular human, at pre-defined time intervals of T6 seconds, during a shaving process that is performed by the electric shaver, and configured to cause a wet shaving process in which said electric shaver performs wet shaving of the face of said particular human while water is sprayed thereon; wherein T6 is a pre-defined value in a range of 3 to 15 seconds.

In some embodiments, the electric battery is a rechargeable electric battery that supports cable-free electromagnetic charging via a wireless charging pad. In some embodiments, the apparatus comprises: (a) a low-battery detector unit, configured to continuously monitor a remaining power level of the electric battery, and configured to detect that the remaining power level of the electric battery is below a threshold value of N percent, wherein N is a pre-defined value in a range of 5 to 15. In some embodiments, the apparatus comprises: (b) a Fly-to-Recharge Commanding Unit, configured (i) to receive from the low-battery detector unit a low-battery signal indicating that the remaining power level of the electric battery is below said pre-defined threshold value, and (ii) in response to said low-battery signal, to command said apparatus to abort an ongoing autonomous shaving process and to autonomously fly to said wireless charging pad and to park on the wireless charging pad for recharging the electric battery. In some embodiments, the Fly-to-Recharge Commanding Unit is configured to operate in coordination with the hardware processor which, in turn, performs analysis of live video captured by the video cameras of the apparatus and determines a flight direction that said apparatus should take in order to firstly reach above said wireless charging pad and then to land on top of said wireless charging pad.

In some embodiments, the apparatus comprises: (a) an Ultra-Violet C (UVC) light emitter, configured to emit UVC light having a germicidal wavelength in a range of 240 to 280 nanometer; wherein the UVC light emitter is an integral part of said apparatus, and is oriented to emit said UVC light towards at least one of: (i) an outwardly-facing side of the electric shaver, (ii) the one or more shaving blades of the electric shaver. In some embodiments, the apparatus comprises: (b) a UVC light emitter activator, that is configured to activate the UVC light emitter to emit UVC light for a period of T7 seconds, for disinfecting the electric shaver or the one or more shaving blades; wherein T7 is a pre-defined value in a range of 30 to 60 seconds; wherein the UVC light emitter activator is configured to activate the UVC light emitter if at least one of the following conditions hold true: (b1) the hardware processor generated a signal indicating that an autonomous shaving process has ended at least T8 minutes ago, wherein T8 is a pre-defined value in a range of 1 minute to 5 minutes; (b1) the apparatus is parked, and the UVC light emitter of the apparatus has not been activated in the past T9 hours, wherein T9 is a pre-defined value in the range of 1 to 12 hours.

In some embodiments, the apparatus comprises: (a) a first illumination unit, that is located adjacent to the first video camera, and that is oriented horizontally at a same horizonal direction at which the first video camera is oriented; (b) a second illumination unit, that is located adjacent to the second video camera, and that is oriented horizontally at a same horizonal direction at which the second video camera is oriented; (c) a third illumination unit, that is located adjacent to the third video camera, and that is oriented horizontally at a same horizonal direction at which the third video camera is oriented; (d) a fourth illumination unit, that is located adjacent to the fourth video camera, and that is oriented horizontally at a same horizonal direction at which the fourth video camera is oriented; (e) an upwardly-oriented illumination unit, that is located adjacent to the upwardly-oriented video camera, and that is oriented vertically and upwardly; (f) a downwardly-oriented illumination unit, that is located adjacent to the downwardly-oriented video camera, and that is oriented vertically and downwardly.

In some embodiments, the hardware processor is configured to command the first illumination unit to temporarily deactivate itself, if the hardware processor determines, based on computer vision analysis of live video captured by one or more video cameras of the apparatus, that the first illumination unit is currently directed towards human eyes; the hardware processor is configured to command the second illumination unit to temporarily deactivate itself, if the hardware processor determines, based on computer vision analysis of live video captured by one or more video cameras of the apparatus, that the second illumination unit is currently directed towards human eyes; the hardware processor is configured to command the third illumination unit to temporarily deactivate itself, if the hardware processor determines, based on computer vision analysis of live video captured by one or more video cameras of the apparatus, that the third illumination unit is currently directed towards human eyes; the hardware processor is configured to command the fourth illumination unit to temporarily deactivate itself, if the hardware processor determines, based on computer vision analysis of live video captured by one or more video cameras of the apparatus, that the fourth illumination unit is currently directed towards human eyes; the hardware processor is configured to command the upwardly-oriented illumination unit to temporarily deactivate itself, if the hardware processor determines, based on computer vision analysis of live video captured by one or more video cameras of the apparatus, that the upwardly-oriented illumination unit is currently directed towards human eyes; the hardware processor is configured to command the downwardly-oriented illumination unit to temporarily deactivate itself, if the hardware processor determines, based on computer vision analysis of live video captured by one or more video cameras of the apparatus, that the downwardly-oriented illumination unit is currently directed towards human eyes.

Some embodiments provide a self-flying hands-free shaving apparatus that includes: a drone or quad-copter component, configured to autonomously fly and hover in air; multiple video cameras that capture live video of the surroundings; and a processor that performs real-time computer vision analysis of live video, to guide the apparatus at which directions to fly and where to remain hovering. The self-flying apparatus remains hovering approximately 50 to 100 centimeters from a human face. A telescopic arm extends from the hovering apparatus, and pivots or rotates to bring an affixed electric shaver towards a face-region of a human, for shaving it. Tactile sensors detect touch, and assist in confirming to the processor that shaving is indeed performed. Data sensed by LIDAR sensors and thermal imagers assists the processor in commanding the self-flying apparatus and its telescopic arm, and augments the data obtained by computer vision analysis of the live video from the multiple video cameras. Optionally, the self-flying apparatus also sprays water for a wet shave, or discharges soothing powder or talc, or sprays an after-shave liquid. Optionally, it recognizes and obeys voice-commands regarding particular shaving operations.

In some embodiments, the self-flying apparatus may be modified or configured to perform other and/or additional operations, while flying near a human, towards such human. For example, the self-flying apparatus may be implemented as a self-flying hands-free massager apparatus, configured to perform or to provide a massage or a rub or a muscle relaxation treatment to a body or a body-organ or a body-organ of a human (e.g., to massage the shoulders/back/upper back/lower back/arm/leg/foot of a human), by having an electric massager unit or a "massage gun" unit attached to the telescopic arm instead of (or, in addition to) the electric shaver, and by having the processor and the computer vision analysis unit configured to search for, and recognize, said body part(s) in the captured live video streams; and by innovatively including tactile sensor(s) or pressure sensor(s) at the touch-area of such electric massager unit, to provide real-time feedback to the self-flying hands-free massager apparatus that a massage operation is currently being performed successfully. In some embodiments, the electric massage unit may be included in such self-flying apparatus instead of the electric shaver; or, in addition to the electric shaver in order to provide a massage session to the user (or to another user) prior to or after performing a shaving session. In some embodiments, the massage unit may have one or more video cameras or short-range video cameras, mounted on it or near it, to provide a closer video feed of the body parts that are being massaged or that are about to be massaged by the self-flying apparatus.

In another example, the self-flying apparatus may be implemented as a self-flying hands-free makeup applying apparatus or cosmetics applying apparatus, configured to apply or rub or brush or paint makeup materials or cosmetics materials (e.g., lipstick, blush powder, foundation powder, mascara, or the like) onto a face of a human or onto other body parts or body organs of a human, For example, instead of the electric shaver, a lipstick unit may be attached to the telescopic arm; and the self-flying apparatus may approach the human and may carefully and precisely apply the lipstick to the lips of the human. One or more video cameras or short-range video cameras may be mounted on the lipstick unit, to provide a closer video feed of the body parts that are being treated with the lipstick. Additionally or alternatively, instead of the electric shaver, and/or instead of (or in addition to) the lipstick unit, a cosmetic brush may be attached to the telescopic arm; and the self-flying apparatus may approach the human and may carefully and precisely apply or brush a powder, which may be collected firstly by the cosmetic brush from a powder container of the apparatus; and one or more video cameras or short-range video cameras may be mounted on or near the cosmetic brush unit, to provide a closer video feed of the body parts that are being treated with the cosmetic brush. In some embodiments, a toolset of two or more cosmetic tools may be included in one self-flying apparatus, which may be configured to use such multiple tools, in series or in a selective manner (e.g., in response to a recognized verbal command of "please apply lipstick to my lips" or "please apply foundation powder to my chin"). In some embodiments, the self-flying apparatus may automatically select a particular tool, such as "red lipstick" or "purple lipstick", based on a verbal command from the user, that is captured by the acoustic microphone of the self-flying apparatus, and that is converted from speech to text and then recognized; and my rotate or spin or move or relocate the set of tools, such that a particular tool (e.g., the red lipstick) would be protruding and ready to be applied, and that other tool(s) (such as the purple lipstick and a powder brush) would be retracted or concealed or not protruding towards the human's face. It is noted that a high-resolution video camera, such as a 4K or 8K video camera, or several such cameras located near the cosmetic tool, and the utilization of a relatively thin cosmetic tool (e.g., a thin or lipstick edge, or a thin powder brush), may enable the self-flying apparatus to carefully and precisely apply makeup onto lips or checks or chin or other body-parts; for example, a thin lipstick pencil that moves slowly and precisely, and an 8K video camera, can be used to apply a lipstick line to or around the lips of the user, particularly if the user is also guided to remain generally still and non-moving.

In another example, the self-flying apparatus may be implemented as a self-flying hands-free manicure/pedicure apparatus, configured to apply or paint nail polish or nail paint onto fingernails or toenails of a human. For example, instead of the electric shaver, a nail polish brush or a nail painting brush may be attached to the telescopic arm; it may be configured to dip its brushing hairs into a nearby container or reservoir of nail polish or nail paint (or, in some embodiments, the painting brush may be connected to a transport tube that slowly and timely drips a pre-defined number of drops downwardly towards the painting end of the brush); and then the self-flying apparatus moves the telescopic arm carefully towards a fingernail or toenail, and the telescopic arm slowly and carefully and precisely causes the painting brush (which may be very thin, such as 2 or 3 millimeters wide) over the fingernail/toenail to paint it, with several such brushing moves per fingernail/per toenail. In some embodiments, optionally, the telescopic arm is also equipped with an air blowing unit, configured to blow air towards the fingernail/toenail shortly after it was fully painted with the brush, in order to hasten its drying process. In some embodiments, optionally, the telescopic arm is also equipped with an nail filing unit or nail filer or nail filing stick, configured to gently and precisely file the edge of the toenail/fingernail prior to the paint-brushing process and/or after the paint-brushing process and/or after the optional air blowing process.

In another example, the self-flying apparatus may be implemented as a self-flying hands-free cooling apparatus, configured to produce and blow cold air or cooled air or uncooled (regular temperature) air, towards a face or a body-part of a human user. For example, instead of the electric shaver, the telescopic arm may be equipped with a small fan; such that the user may sit outdoor or indoor, and use his two hands to play a video game or to read a newspaper, while the self-flying hands-free cooling apparatus is hovering nearby and blows air via the fan towards the human's face, or legs, or shoulders, or neck, or other body part(s). In some embodiments, the fan may be accompanied by a miniature air-cooling unit, capable of cooling (even slightly) the air that is blown, or capable of reducing the temperature of such blown air by at least 1 or 2 or 3 or 5 or N degrees Celsius; for example, via a small-size/small-capacity air cooling unit or heat exchanger unit; or, in some implementations, by ensuring that the self-flying hands-free cooling apparatus is pre-filled with a frozen pack of gel or a frozen gel-pack or a frozen gel-pack, or even with a pack of ice-cubes in a plastic bag, which can provide coolness to nearby air and can thus reduce (even slightly) the temperature of air that is blown towards the user's face or body (even for a short period of time, of 1 or 2 or 5 minutes); and in some embodiments, such frozen gel-pack or ice-pack does not drip water at all, or drips some water into a collection reservoir; or drips some melting water at a location that is not over the body of the user, such as 30 or 50 centimeters away from the user's body (since the telescopic arm extends diagonally away from the housing/chassis of the apparatus) and the user does not mind (in some situations, such as when the user sits in his back yard) that some small amount of water is dripping nearby (and is slightly watering his lawn on a hot day, as an added benefit). In some embodiments, the self-flying hands-free cooling apparatus may perform two actions concurrently, such as, it may hover in circle around the user who sits in his lawn, and can plow cooled air towards the user's face from different directions as the apparatus circles around it, and at the same time, a slight amount of the ice is gradually melting and provides slight irrigation to the lawn or nearby grass or plants, thus providing a dual-purpose self-flying apparatus that is both cooling the human and irrigating the lawn.

In another example, the self-flying apparatus may be implemented as a self-flying hands-free heating apparatus, configured to produce and blow hot air or heated air towards a face or a body-part of a human user. For example, instead of the electric shaver, the telescopic arm may be equipped with a battery-operated heating unit or heating pad, similar to a miniature heat blower or a cordless hair dryer, or similar to a miniature electric wire or coil that can be found in some toasters and can heat up itself and its surrounding; and optionally, a small fan that blows air from the surrounding of such heating unit towards the face of the user; such that the user may sit outdoor or indoor, and may use his two hands to play a video game or to read a newspaper, while the self-flying hands-free heating apparatus is hovering nearby and blows hot air via the fan, or only radiates some heat towards the human (without any fan). In some embodiments, the self-flying hands-free heating apparatus does not need to include an electric heating unit; but rather, may include a pre-heated gel-pack or a pre-heated gel-pad or a pre-heated sleeve (e.g., that contains buckwheat or other granules or particles, or a liquid or a gel), and such pack or pad can be heated-up in advance by the user by placing it for 2 or 3 or 4 minutes in a microwave oven and then inserting it into a relevant compartment or holding bracket of the self-flying hands-free heating apparatus; and such pre-heated gel-pack or gel-pad or sleeve may provide slight heating to its surrounding, which in turn enables a miniature nearby fan to blow such heated or slightly-heated air towards the human's face or body. Such heat may suffice for at least several minutes, and may enable the user to enjoy hands-free heating, in his home or in his backyard or lawn, from the warm air that is radiated from the self-flying hands-free heating apparatus or that is blown towards the human from the self-flying hands-free heating apparatus.

In another example, the self-flying apparatus may be implemented as a self-flying hands-free hair-blowing/hair-drying apparatus, configured to produce and blow air or cooled air or hot air or uncooled (regular temperature) air, towards a hair (e.g., non-facial) on the head (and not on the face) of a human user. For example, instead of the electric shaver, the telescopic arm may be equipped with a portable/wireless/cordless/battery-operated/rechargeable hair blower or hair dryer; such as, having its own 5,000 mAh rechargeable battery, and/or capable of producing hot air and blowing it with power of approximately 400 Watts, and/or blowing hot air at a temperature of at least 120 or 130 or 140 degrees Fahrenheit; such that the user may sit outdoor or indoor, and may use his or her two hands to play a video game or to read a magazine, while the self-flying hands-free hair-blowing/hair-drying apparatus is hovering nearby and blows air or hot air or heated air via towards the human's hair. The processor and the computer vision analysis unit may be configured to search and find, particularly, non-facial hair (e.g., braid, ponytail, hair on the top or back of the head), and to cause the apparatus to fly towards it and approach it, such that the telescopic arm can swivel or pivot towards it and enable the blowing of hot hair towards it.

The system(s) and/or devices of some embodiments may comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or units, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by utilizing a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", "estimating", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated or collected data, and one or more values as stored in a look-up table or a legend table or a list of reference value(s) or a database of reference values or a ranges of reference-values; a comparison or matching or searching process which searches for matches and/or identical results and/or similar results and/or sufficiently-similar results (e.g., within a pre-defined threshold level of similarity; such as, within 5 percent above or below a pre-defined threshold value), among multiple values or limits that are stored in a database or look-up table or that are defined by comparison rules or matching rules; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/ or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A self-flying hands-free shaving apparatus, comprising:
(A) a hardware processor, configured to execute code;
a memory unit, configured to store code and configured to store data;
an electric battery, to provide electric power to one or more components of said apparatus;
(B) a box-shaped housing, having four side-panels and a bottom-side panel and a top-side panel;
(C) a first horizontally-propelling blade (141), connected over a first top-side corner of the housing, and configured to propel within a horizontal plane that is generally perpendicular to the ground;
a second horizontally-propelling blade (142), connected over a second top-side corner of the housing, and configured to propel within said horizontal plane that is generally perpendicular to the ground;
a third horizontally-propelling blade (143), connected over a third top-side corner of the housing, and configured to propel within said horizontal plane that is generally perpendicular to the ground;
a fourth horizontally-propelling blade (144), connected over a fourth top-side corner of the housing, and configured to propel within said horizontal plane that is generally perpendicular to the ground;
(D) one or more electric motors, that are configured to cause, based on vertical-flight commands from the hardware processor, rotation of one or more of: the first horizontally-propelling blade (141), the second horizontally-propelling blade (142), the third horizontally-propelling blade (143), and the fourth horizontally-propelling blade (144);
(E) wherein the hardware processor is configured to control and to modify a rotation speed of the first horizontally-propelling blade (141), the second horizontally-propelling blade (142), the third horizontally-propelling blade (143), and the fourth horizontally-propelling blade (144),
by selecting a particular blade-rotation speed that is one of at least three pre-configured rotation speeds that comprise:
(i) a high rotation speed, that causes said apparatus to fly vertically and upwardly,
(ii) a medium rotation speed, that causes said apparatus to hover without moving vertically upwardly and without moving vertically downwardly,
(iii) a low rotation speed, that causes said apparatus to fly vertically and downwardly;
(F) wherein processor-controlled rotation of the first horizontally-propelling blade (141), the second horizontally-propelling blade (142), the third horizontally-propelling blade (143), and the fourth horizontally-propelling blade (144),
causes said apparatus to perform one or more of three flight operations that include:
(i) flying vertically and upwardly along a Z axis that is generally perpendicular to the ground,
(ii) hovering vertically without moving upwardly and without moving vertically downwardly,
(iii) flying vertically and downwardly along the Z axis that is generally perpendicular to the ground;
(G) a first vertically-propelling blade (151), that is connected externally to the first side-panel of the housing, and that is configured to propel within a first vertical plane that is generally perpendicular to the ground;
a second vertically-propelling blade (152), that is connected externally to the second side-panel of the housing, and that is configured to propel within a second vertical plane that is generally perpendicular to the ground;
a third vertically-propelling blade (153), that is connected externally to the third side-panel of the housing, and that is configured to propel within a third vertical plane that is generally perpendicular to the ground;
a fourth vertically-propelling blade (154), that is connected externally to the fourth side-panel of the housing, and that is configured to propel within a fourth vertical plane that is generally perpendicular to the ground;
wherein the first vertical plane is generally parallel to the third vertical plane;
wherein the second vertical plane is generally parallel to the fourth vertical plane;
wherein the first vertical plane is generally parallel to the second vertical plane;
wherein the one or more electric motors are configured to cause, based on horizontal-flight commands from the hardware processor, rotation of one or more of: the first vertically-propelling blade (151), the second vertically-propelling blade (152), the third vertically-propelling blade (153), the fourth vertically-propelling blade (154);
(H) wherein the hardware processor is configured to cause horizontal flight of said apparatus by selectively causing one of the following components to vertically propel: the first vertically-propelling blade (151), the second vertically-propelling blade (152), the third vertically-propelling blade (153), the fourth vertically-propelling blade (154);
wherein vertical propelling of the first vertically-propelling blade (151), generates a first force that pushes said apparatus horizontally in a first horizontal direction;
wherein vertical propelling of the second vertically-propelling blade (152), generates a second force that pushes said apparatus horizontally in a second direction that is generally perpendicular to the first direction;
wherein vertical propelling of the third vertically-propelling blade (153), generates a third force that pushes said apparatus horizontally in a third direction that is generally perpendicular to the second direction and that is generally opposite to the first horizontal direction;
wherein vertical propelling of the fourth vertically-propelling blade (154), generates a fourth force that pushes said apparatus horizontally in a fourth direction that is generally perpendicular to the third direction and that is generally opposite to the second horizontal direction;
(I) a partially-hollow central pole, that is connected generally vertically beneath a central point of the bottom-side panel of the housing;

(J) four video cameras, affixed to the central pole,
wherein the four video cameras comprise:
a first video camera that is oriented horizontally and captures video having a first field-of-view;
a second video camera that is oriented horizontally at a 90-degree angle relative to orientation direction of the first video camera, 164, and that captures video having a second field-of-view;
a third video camera that is oriented horizontally at a 90-degree angle relative to orientation direction of the second video camera, and that captures video having a third field-of-view;
a fourth video camera that is oriented horizontally at a 90-degree angle relative to orientation direction of the third video camera, and that captures video having a fourth field-of-view;
wherein the first field-of-view of the first video camera, and the second field-of-view of the second video camera, are partially overlapping;
wherein the second field-of-view of the second video camera, and the third field-of-view of the third video camera, are partially overlapping;
wherein the third field-of-view of the third video camera, and the fourth field-of-view of the fourth video camera, are partially overlapping;
wherein the fourth field-of-view of the fourth video camera, and the first field-of-view of the first video camera, are partially overlapping;
wherein the first field-of-view of the first video camera, is generally opposite to the third field-of-view of the third video camera;
wherein the second field-of-view of the second video camera, is generally opposite to the fourth field-of-view of the fourth video camera;
(K) an upwardly-oriented video camera, that is oriented vertically and upwardly, and captures video having a fifth field-of-view that is generally perpendicular to the first and second and third and fourth fields-of-view;
a downwardly-oriented video camera, that is oriented vertically and downwardly, and captures video having a sixth field-of-view that is generally perpendicular to the first and second and third and fourth fields-of-view;
wherein the fifth field-of-view of the upwardly-oriented video camera, is generally opposite to the sixth field-of-view of the downwardly-oriented video camera;
(L) a computer vision analysis unit,
configured to perform real-time computer vision analysis of:
(i) live video captured by the first video camera, and
(ii) live video captured by the second video camera, and
(iii) live video captured by the third video camera, and
(iv) live video captured by the fourth video camera, and
(v) live video captured by the upwardly-oriented video camera, and
(vi) live video captured by the downwardly-oriented video camera;
(M) a reference-image storage unit, configured to store one or more reference-images of a face of a particular human that is intended to be autonomously shaved by said apparatus;
wherein the computer vision analysis unit is configured to recognize and to detect, in one or more live videos that are analyzed, at least: (i) the face of said particular human that is intended to be autonomously shaved by said apparatus, and also (ii) faces of one or more other humans that are present in a vicinity of said apparatus, and also (iii) the ground, and also (iv) one or more inanimate objects that are present in a vicinity of the apparatus and that said apparatus is configured to avoid crashing into;
(N) wherein the computer vision analysis unit is configured to dynamically determine, based on computer vision analysis of live video streams, at least:
(a) an X-axis horizontal displacement that is required for said apparatus to fly along the X-axis in order to be able to shave hair that is on the face of said particular human, and
(b) a Y-axis horizontal displacement that is required for said apparatus to move along the Y-axis in order to be able to shave hair that is on the face of said particular human, and
(c) a Z-axis horizontal displacement that is required for said apparatus to move along the Z-axis in order to be able to shave hair that is on the face of said particular human;
(O) wherein computer vision analysis results, that are dynamically generated by the computer vision analysis unit based on real-time video analysis, are utilized by the hardware processor to selectively control rotation speed of at least one of:
the first vertically-propelling blade, the second vertically-propelling blade,
the third vertically-propelling blade, the fourth vertically-propelling blade,
the first horizontally-propelling blade, the second horizontally-propelling blade,
the third horizontally-propelling blade, the fourth horizontally-propelling blade,
(P) wherein the hardware processor, based on computer vision analysis results, is configured to cause said apparatus to autonomously fly to a vicinity of said particular user, and to cause said apparatus to remain hovering at a particular spatial region having a particular distance from said particular user, and to continuously hover in air while remaining at said particular spatial region;
(Q) an electric shaver, comprising one or more shaving blades;
wherein the electric shaver is connected to an arm that is located downwardly relative to the central pole;
wherein the arm is configured to pivot, as well as to extend and retract, via an Arm Motor-and-Control Unit that is connected beneath the central pole;
wherein the Arm Motor-and-Control Unit selectively causes the arm to extend, to retract, or to pivot;
(R) wherein the hardware processor, based on the computer vision analysis results, is configured to cause the Arm Motor-and-Control Unit to selectively pivot, and to selectively extend or retract, the arm, to enable the arm to be at a particular spatial area that causes the electric shaver to touch the face of said particular human and to autonomously perform a shaving operation on the face of said particular human;
wherein the electric shaver has a front side, through which the shaving blades perform shaving operations of facial hair;
(S) a first precise-shaving assistive video camera, that is fixedly attached at a first side of said electric shaver, and that is oriented to capture live video of a first region which is generally in front and to the right of said front side of the electric shaver;

a second precise-shaving assistive video camera, that is fixedly attached at a second side of said electric shaver, and that is oriented to capture live video of a second region which is generally in front and beneath said front side of the electric shaver;

a third precise-shaving assistive video camera, that is fixedly attached at a third side of said electric shaver, and that is oriented to capture live video of a third region which is generally in front and to the left of said front side of the electric shaver;

a fourth precise-shaving assistive video camera, that is fixedly attached at a fourth side of said electric shaver, and that is oriented to capture live video of a fourth region which is generally in front and above said front side of the electric shaver;

(T) wherein the computer vision analysis unit is configured to perform real-time computer vision analysis of video captured by first precise-shaving assistive video camera and the second precise-shaving assistive video camera and the third precise-shaving assistive video camera and by the fourth precise-shaving assistive video camera, and is further configured to generate determinations with regard to: (i) which regions of the face of said particular human require shaving operations, and (ii) which regions of the face of said particular human do not require shaving operations;

(U) wherein the front side of the electric shaver has a tactile sensor, configured to detect whether or not the tactile sensor is touching a target, and configured to generate a touch-detection signal that indicates that the tactile sensor is currently in touch with the target;

wherein the tactile sensor comprises a pressure-actuated electric contact that, upon application by a touch-based pressure thereon, causes an electric circuit to close and to output said touch-detection signal;

wherein the hardware processor is configured to process output from the tactile sensor, as part of processing operations that the hardware processor performs to command said apparatus to fly upwardly or to fly downwardly or to fly horizontally at a particular horizontal direction or to hover in air;

(V) wherein, if the hardware processor determines that three conditions hold true, wherein the three conditions are:

(I) computer vision analysis of live video from the first video camera and the second video camera and the third video camera and the fourth video camera and the upwardly-oriented video camera and the downwardly-oriented video camera, indicates that said apparatus is at a first distance D1 from the face of said particular human, and further indicates that the front-side of the electric shaver is located at a second distance D2 from the face of said particular user, wherein the first distance D1 is within a first pre-defined range of distance values;

wherein the second distance D2 is within a second pre-defined range of distance values, (II) the touch-detection signal from the tactile sensor indicates that the electric shaver is currently touching the face of said particular user, (III) computer vision analysis of live video from the first precise-shaving assistive video camera and the second precise-shaving assistive video camera and the third precise-shaving assistive video camera and the fourth precise-shaving assistive video camera, also indicates that said apparatus is at the first distance D1 from the face of said particular human, and also indicates that the front-side of the electric shaver is located at the second distance D2 from the face of said particular user, then, the hardware processor determines that an active shaving operation is being performed, and the hardware processor commands said apparatus to hover in air for a particular time-period of T1 seconds to enable continuous shaving, wherein T1 is a pre-defined value in a range of 5 to 15 seconds;

and once said particular time period of T1 seconds elapses, the hardware processor generates commands that cause the electric shaver to relocate to a nearby face-region by performing at least one of:

(i) commanding the apparatus to fly along the X-axis to obtain an X-axis displacement, (ii) commanding the apparatus to fly along the Y-axis to obtain a Y-axis displacement, (iii) commanding the apparatus to fly along the Z-axis to obtain a Z-axis displacement, (iv) commanding the arm to pivot, (v) commanding the arm to extend, (vi) commanding the arm to retract.

2. The apparatus of claim 1, wherein the hardware processor, based on the computer vision analysis results, is further configured to distinguish between: (i) a first face-region that is hairy or is covered with beard hair, and (ii) a second face-region that is smooth or is free of beard hair;

wherein the hardware processor, based on the computer vision analysis results, is further configured: (a) to cause said apparatus to fly to a vicinity of the first face-region, and to cause the arm and the electric shaver to approach the first face-region; and (b) to cause said apparatus to avoid flying to the vicinity of the second face-region, and to cause the arm and the electric shaver to avoid approaching the second face-region.

3. The apparatus of claim 2, wherein the hardware processor, based on the computer vision analysis results, is further configured to cause the Arm Motor-and-Control Unit to selectively pivot, and to selectively extend or retract, the arm, to enable the arm to move from (i) being closest to the second face-region that is free of beard hair, to (ii) being closes to the first face-region that is covered with beard hair.

4. The apparatus of claim 3, wherein the hardware processor, based on the computer vision analysis results, is further configured to count hairs that appear in live videos that are captured by one or more of the video cameras of said apparatus; and to estimate a hair-density value for different regions of the face of said particular human;

wherein the hardware processor, based on the computer vision analysis results, is further configured to cause said Arm Motor-and-Control Unit to selectively pivot, and to selectively extend or retract, said arm, to cause said arm to move from (i) a first particular face-region that has a first hair-density value, to (ii) a second particular face-region that has a second, greater, hair-density value.

5. The apparatus of claim 4, wherein the hardware processor is configured to cause movement of the electric shaver, from the first particular face-region to the second particular face-region, only if the second hair-density value is at least three times the first hair-density value, to prevent back-and-forth movement of the electric shaver between two face-regions having sufficiently similar hair-density values, and to reduce motion of the arm, and to reduce flying movements of said apparatus.

6. The apparatus of claim 5, further comprising:
a set of one or more thermal imagers, mounted on the central pole or the housing;
wherein the one or more thermal imagers are configured to perform thermal imaging of a surrounding of the apparatus;
wherein the hardware processor is configured to perform liveliness detection, based on a combination of (i) analysis of thermal images captured by the one or more thermal imagers and (ii) computer vision analysis of live video from video cameras of said apparatus;
wherein the hardware processor is configured to determine whether a face that is captured in one or more of the live videos corresponds to (i) a living human or to (ii) a non-living painting or photograph of a human;
wherein a liveliness detection result, that is generated by the hardware processor, is then further utilized by the hardware processor to command the apparatus to fly towards a first target that the hardware processor determined to be a living human, and to fly away from a second target that the hardware processor determined to be a non-living painting or photograph of a human.

7. The apparatus of claim 6,
further comprising:
a set of six LIDAR sensors, that are mounted on the central pole or the housing;
wherein the set of six LIDAR sensors comprise:
an upwardly-oriented LIDAR sensor, configured to measure a first vertical distance towards a ceiling;
a downwardly-oriented LIDAR sensor, configured to measure a second vertical distance towards the ground;
a first horizontally-oriented LIDAR sensor, configured to measure a first horizontal distance towards one or objects along an X-axis at a first horizontal direction;
a second horizontally-oriented LIDAR sensor, configured to measure a second horizontal distance towards one or objects along a Y-axis at a second horizontal direction that is generally perpendicular to said first horizontal direction;
a third horizontally-oriented LIDAR sensor, configured to measure a third horizontal distance towards one or objects along said X-axis at a third horizontal direction that is generally perpendicular to said second horizontal direction;
a fourth horizontally-oriented LIDAR sensor, configured to measure a fourth horizontal distance towards one or objects along said Y-axis at a fourth horizontal direction that is generally perpendicular to said second horizontal direction;
wherein real-time live LIDAR-sensed data, from each LIDAR sensor of the set of six LIDAR sensors, is fed into the hardware processor, and is utilized by the hardware processor to adjust autonomous flying of said apparatus,
based on one or more pre-defined rules that define at least:
(i) a first minimum distance that said apparatus should keep from the ground, and
(b) a second minimum distance that said apparatus should keep from the ceiling, and
(c) a third minimum distance that said apparatus should keep from any human, and
(d) a fourth minimum distance that said apparatus should keep from any non-human object.

8. The apparatus of claim 7,
further comprising:
(a) a Z-axis flight navigation and control unit,
configured to selectively cause said apparatus to fly upwardly or to fly downwardly along a Z-axis or to hover in a vertically-fixed elevation level,
based on data that the hardware processor generates and that takes into account at least:
(i) computer-vision analysis results of live video from the video cameras of the apparatus, and
(ii) LIDAR-sensed data from the LIDAR sensors of the apparatus, and
(iii) thermal imagery data from the one or more thermal imagers of the apparatus;
(b) an X-axis flight navigation and control unit,
configured to cause said apparatus to fly forward or backward along a horizontal X axis or to maintain a fixed position along said horizontal X axis,
based on data that the hardware processor generates and that takes into account at least:
(i) computer-vision analysis results of live video from the video cameras of the apparatus, and
(ii) LIDAR-sensed data from the LIDAR sensors of the apparatus, and
(iii) thermal imagery data from the one or more thermal imagers of the apparatus;
(c) a Y-axis flight navigation and control unit,
configured to cause said apparatus to fly forward or backward along a horizontal Y axis or to maintain a fixed position along said horizontal Y axis,
based on data that the hardware processor generates and that takes into account at least:
(i) computer-vision analysis results of live video from the video cameras of the apparatus, and
(ii) LIDAR-sensed data from the LIDAR sensors of the apparatus, and
(iii) thermal imagery data from the one or more thermal imagers of the apparatus;
wherein said Z-axis is generally perpendicular to the ground,
wherein said Y-axis is generally horizontal and is generally parallel to the ground,
wherein said X-axis is generally horizontal and is generally parallel to the ground,
wherein said Y-axis is generally perpendicular to said X-axis.

9. The apparatus of claim 8, further comprising:
(a) a post-shaving soothing liquid storage compartment,
configured to store therein a particular post-shaving soothing liquid that is selected from the group consisting of: a liquid perfume, a liquid after-shave;
(b) a post-shaving soothing liquid spray-head unit, that is connected via a post-shaving soothing liquid transport tube to said post-shaving soothing liquid storage compartment;
wherein the post-shaving soothing liquid spray-head unit, upon being actuated, is configured to pump out and to spray a portion of said particular post-shaving soothing liquid;
(c) a post-shaving soothing liquid spray-head orientation unit,
configured to determine a spatial direction to which said post-shaving soothing liquid spray-head unit should be oriented, in order for said post-shaving soothing liquid spray-head unit to be capable of spraying said particular post-shaving soothing liquid towards said face of said particular human;

wherein, based on a determination of said spatial orientation by the spray-head orientation unit, the hardware processor commands at least one set of the horizontally-propelling blades to modify its horizontal propelling velocity, and causes said apparatus to revolve while hovering in air, and causes said post-shaving soothing liquid spray-head unit to be oriented towards the face of said particular human;

(d) a post-shaving soothing liquid spray-head actuator unit, configured to actuate the post-shaving soothing liquid spray-head unit to spray out at least one portion of said particular post-shaving soothing liquid, towards the face of said particular human, upon a determination by said hardware processor that an autonomous shaving process is complete; wherein said determination is reached based on computer vision analysis of live video that depicts the face of said particular human and that indicates that no more shaving operations are required to make said face smooth or hair-free;

(e) an audio output unit associated with an audio speaker, wherein the audio output unit is an integral part of said apparatus, wherein the audio output unit is configured to generate an audible pre-recorded Post-Shaving Soothing Liquid Spray Alert message, that indicates verbally that a post-shaving soothing liquid spraying process is about to be performed, at a time-point that is T2 seconds prior to actuation of said post-shaving soothing liquid spray-head unit; wherein T2 is a pre-defined value in a range of 1 to 5 seconds.

10. The apparatus of claim 9, wherein the post-shaving soothing liquid storage compartment is an internal storage compartment that is enclosed entirely within the central pole of the apparatus;

wherein the post-shaving soothing liquid storage compartment is one of: (i) a removable and replaceable compartment that can be removed and replaced when the apparatus is parked; (ii) a refillable compartment that can be refilled when the apparatus is parked.

11. The apparatus of claim 10, further comprising:

(a) a powder storage compartment, configured to store therein a particular powder that is selected from the group consisting of: baby powder, talc;

(b) a powder transport tube, which traverses through said powder storage compartment;

wherein the powder transport tube has a first opening and a second opening;

(c) an elastic silicon airbag having a single opening, wherein the single opening of the elastic silicon airbag is connected to the first opening of the powder transport tube;

(d) a powder ejector nozzle, which is located or connected at the second opening of the powder transport tube;

wherein, in response to a squeezing force that is applied thereon by a squeezing unit, the elastic silicon airbag temporarily squeezes and blows air outwardly from the elastic silicon airbag and into the first opening of the powder transport tube, and causes said air to pass through a region of said powder storage compartment and to pick up and carry a portion of said particular powder, and further causes said air to transport said portion of the particular powder towards and through the second opening of the powder transport tube and then through the powder ejector nozzle outwardly away from the powder ejector nozzle towards the face of said particular human;

(e) a powder spray actuator unit, configured to generate a temporary squeezing force towards said elastic silicon airbag, in response to a command from the hardware processor to perform a powder spray operation;

wherein the hardware processor is configured to determine that the autonomous shaving process is complete, based on computer vision analysis of live video from the video cameras of the apparatus that depict the face of said particular human and that indicate that no more shaving operations are required;

wherein the hardware processor is configured to determine that said apparatus is pre-programmed or pre-configured to initiate an autonomous powder spray process upon completion of the autonomous shaving process, based on a position of a mechanical toggle switch that said human can toggle in advance when the apparatus is parked;

(f) wherein said audio output unit is configured to generate an audible pre-recorded Powder Spray Alert message, that indicates verbally that a powder spraying process is about to be performed, at a time-point that is T3 seconds prior to actuation of said powder spray actuator unit, wherein T3 is a pre-defined value in a range of 1 second to 5 seconds.

12. The apparatus of claim 11, wherein said powder storage compartment is an internal storage compartment that is enclosed entirely within the central pole of the apparatus;

wherein the powder storage compartment is one of: (i) a removable and replaceable powder storage compartment that can be removed and replaced when the apparatus is parked; (ii) a refillable powder storage compartment that can be refilled when the apparatus is parked.

13. The apparatus of claim 12, further comprising:

(a) a shaving cream storage compartment, configured to store therein a particular shaving cream that is selected from the group consisting of: an aerosol shaving cream, a gel-based shaving cream, a soap-based shaving cream, a foamed shaving cream;

(b) a shaving cream spray-head unit, that is connected via a shaving cream transport tube to said shaving cream storage compartment;

wherein the shaving cream spray-head unit, upon being actuated, is configured to pump out and to spray a portion of said particular shaving cream towards the face of said particular human;

(c) a shaving cream spray-head orientation unit, configured to determine a spatial direction to which said shaving cream spray-head unit should be oriented, in order for said shaving cream spray-head unit to be capable of spraying said particular shaving cream towards said face of said particular human;

wherein, based on a determination of said spatial orientation by the shaving cream spray-head orientation unit, the hardware processor commands at least one set of the propelling blades of the apparatus to modify its propelling velocity, and causes said apparatus to revolve while hovering in air, and causes said shaving cream spray-head unit to be oriented towards said face of said particular human;

(d) a shaving cream spray-head actuator unit,
configured to actuate the shaving cream spray-head unit to spray out at least one portion of said particular shaving cream, towards the face of said particular human, upon a determination by the hardware processor that the autonomous shaving process is ready to commence, and prior to commencement of the autonomous shaving process, based on computer vision analysis of live video from the video cameras of the apparatus that depict the face of said particular human and that indicate that shaving operations are required to commence;

(e) wherein the audio output unit is configured to generate an audible pre-recorded Shaving Cream Spray Alert message, that indicates verbally that a shaving cream spraying process is about to be performed, at a time-point that is T4 seconds prior to actuation of said shaving cream spray-head unit; wherein T4 is a pre-defined value in a range of 1 second to 5 seconds.

14. The apparatus of claim 13,
wherein said shaving cream storage compartment is an internal storage compartment that is enclosed entirely within the central pole of the apparatus;
wherein the shaving cream storage compartment is one of: (i) a removable and replaceable shaving cream storage compartment that can be removed and replaced when the apparatus is parked; (ii) a refillable shaving cream storage compartment that can be refilled when the apparatus is parked.

15. The apparatus of claim 14, further comprising:
(a) an acoustic microphone,
configured to capture audio from the surrounding of said apparatus;
(b) an Automatic Speech Recognition (ASR) unit,
configured to perform an Automatic Speech Recognition (ASR) process on audio captured by the acoustic microphone, and to generate therefrom a textual transcript;
(c) a speech analysis unit,
configured to perform textual analysis and contextual analysis on said textual transcript, and to recognize a particular shaving-related command that was uttered and is represented in said textual transcript; wherein the speech analysis unit is specifically configured to search for, and to recognize, at least: (c1) a first verbal utterance indicating a first user-command to avoid shaving of a particular face-region; and (c2) a second verbal utterance indicating a second user-command to repeat shaving of an already-shaved particular face-region;
(d) wherein the hardware processor is configured,
(d1) to command the apparatus to avoid shaving said particular face-region, if said first verbal utterance was recognized by the speech analysis unit;
(d2) to command the apparatus to repeat, for at least T5 seconds, autonomous shaving of said already-shaved particular face region, if said second verbal utterance was recognized by the speech analysis unit; wherein T5 is a pre-defined value in a range of 3 to 15 seconds.

16. The apparatus of claim 15, further comprising:
(a) a water reservoir to store therein water,
wherein the water reservoir is an internal storage compartment that is enclosed entirely within the central pole of the apparatus;
wherein the water reservoir is one of: (i) a removable and replaceable water reservoir that can be removed and replaced when the apparatus is parked; (ii) a refillable water reservoir that can be refilled when the apparatus is parked;

(b) a water spraying unit,
that is connected via a water-transport tube to said water reservoir;
wherein the water spraying unit, upon being actuated, is configured (i) to pump out a particular volume of water via said water-transport tube from said water reservoir, and (ii) to spray out said particular volume of water at an outwardly direction away from said apparatus;

(c) a water spraying orientation unit,
configured to determine a spatial direction to which said water spraying unit should be oriented, in order for said water spraying unit to be capable of spraying water towards the face of said particular human;
wherein, based on a determination of said spatial orientation by the water spraying orientation unit, the hardware processor commands at least one of the propelling blades of the apparatus to modify its propelling velocity, and causes the apparatus to revolve while hovering in air, and causes the water spraying unit to be oriented towards the face of said particular human;

(d) a water spraying actuator unit,
configured to actuate the water spraying unit to spray out water towards the face of said particular human, at pre-defined time intervals of T6 seconds, during the autonomous shaving process that is performed by the electric shaver, and configured to cause a wet autonomous shaving process in which said electric shaver performs wet shaving of the face of said particular human while water is sprayed thereon; wherein T6 is a pre-defined value in a range of 3 to 15 seconds.

17. The apparatus of claim 16,
wherein the electric battery is a rechargeable electric battery that supports cable-free electromagnetic charging via a wireless charging pad;
wherein the apparatus further comprises:
(a) a low-battery detector unit, configured to continuously monitor a remaining power level of the electric battery, and configured to detect that the remaining power level of the electric battery is below a threshold value of N percent, wherein N is a pre-defined value in a range of 5 to 15;
(b) a Fly-to-Recharge Commanding Unit,
configured (i) to receive from the low-battery detector unit a low-battery signal indicating that the remaining power level of the electric battery is below said pre-defined threshold value, and (ii) in response to said low-battery signal, to command said apparatus to abort an ongoing autonomous shaving process and to autonomously fly to said wireless charging pad and to park on the wireless charging pad for recharging the electric battery;
wherein the Fly-to-Recharge Commanding Unit is configured to operate in coordination with the hardware processor which, in turn, performs analysis of live video captured by the video cameras of the apparatus and determines a flight direction that said apparatus

69 should take in order to firstly reach above said wireless charging pad and then to land on top of said wireless charging pad.

18. The apparatus of claim 17, further comprising:
(a) an Ultra-Violet C (UVC) light emitter,
   configured to emit UVC light having a germicidal wavelength in a range of 240 to 280 nanometer;
   wherein the UVC light emitter is an integral part of said apparatus, and is oriented to emit said UVC light towards at least one of: (i) an outwardly-facing side of the electric shaver, (ii) the one or more shaving blades of the electric shaver;
(b) a UVC light emitter activator,
   that is configured to activate the UVC light emitter to emit UVC light for a period of T7 seconds, for disinfecting the electric shaver or the one or more shaving blades; wherein T7 is a pre-defined value in a range of 30 to 60 seconds;
   wherein the UVC light emitter activator is configured to activate the UVC light emitter if at least one of the following conditions hold true:
   (b1) the hardware processor generated a signal indicating that an autonomous shaving process has ended at least T8 minutes ago, wherein T8 is a pre-defined value in a range of 1 minute to 5 minutes;
   (b1) the apparatus is parked, and the UVC light emitter of the apparatus has not been activated in the past T9 hours, wherein T9 is a pre-defined value in the range of 1 to 12 hours.

19. The apparatus of claim 18, further comprising:
(a) a first illumination unit, that is located adjacent to the first video camera, and that is oriented horizontally at a same horizonal direction at which the first video camera is oriented;
(b) a second illumination unit, that is located adjacent to the second video camera, and that is oriented horizontally at a same horizonal direction at which the second video camera is oriented;
(c) a third illumination unit, that is located adjacent to the third video camera, and that is oriented horizontally at a same horizonal direction at which the third video camera is oriented;
(d) a fourth illumination unit, that is located adjacent to the fourth video camera, and that is oriented horizontally at a same horizonal direction at which the fourth video camera is oriented;
(e) an upwardly-oriented illumination unit, that is located adjacent to the upwardly-oriented video camera, and that is oriented vertically and upwardly;

70

(f) a downwardly-oriented illumination unit, that is located adjacent to the downwardly-oriented video camera, and that is oriented vertically and downwardly.

20. The apparatus of claim 19,
wherein the hardware processor is configured to command the first illumination unit to temporarily deactivate itself, if the hardware processor determines, based on computer vision analysis of live video captured by one or more video cameras of the apparatus, that the first illumination unit is currently directed towards human eyes;
wherein the hardware processor is configured to command the second illumination unit to temporarily deactivate itself, if the hardware processor determines, based on computer vision analysis of live video captured by one or more video cameras of the apparatus, that the second illumination unit is currently directed towards human eyes;
wherein the hardware processor is configured to command the third illumination unit to temporarily deactivate itself, if the hardware processor determines, based on computer vision analysis of live video captured by one or more video cameras of the apparatus, that the third illumination unit is currently directed towards human eyes;
wherein the hardware processor is configured to command the fourth illumination unit to temporarily deactivate itself, if the hardware processor determines, based on computer vision analysis of live video captured by one or more video cameras of the apparatus, that the fourth illumination unit is currently directed towards human eyes;
wherein the hardware processor is configured to command the upwardly-oriented illumination unit to temporarily deactivate itself, if the hardware processor determines, based on computer vision analysis of live video captured by one or more video cameras of the apparatus, that the upwardly-oriented illumination unit is currently directed towards human eyes;
wherein the hardware processor is configured to command the downwardly-oriented illumination unit to temporarily deactivate itself, if the hardware processor determines, based on computer vision analysis of live video captured by one or more video cameras of the apparatus, that the downwardly-oriented illumination unit is currently directed towards human eyes.

* * * * *